(12) United States Patent
Zielke et al.

(10) Patent No.: US 7,395,243 B1
(45) Date of Patent: Jul. 1, 2008

(54) TECHNIQUE FOR PRESENTING MATCHED BILLERS TO A CONSUMER

(75) Inventors: William D. Zielke, Suwanee, GA (US);
John J. Frech, Alpharetta, GA (US);
Teri W. Bemis, Marietta, GA (US);
Donald K. Hobday, Jr., Blacklick, OH (US); Mark T. Harris, Westerville, OH (US); Hans D. Dreyer, Gahanna, OH (US); Randal A. McCoy, Suwanee, GA (US)

(73) Assignee: CheckFree Corporation, Norcross, GA (US)

( * ) Notice: Subject to any disclaimer, the term of this patent is extended or adjusted under 35 U.S.C. 154(b) by 1004 days.

(21) Appl. No.: 10/285,662

(22) Filed: Nov. 1, 2002

(51) Int. Cl.
*G06Q 40/00* (2006.01)
(52) U.S. Cl. .......................... 705/40; 705/39
(58) Field of Classification Search .............. 705/2, 705/34, 39, 40, 77
See application file for complete search history.

(56) References Cited

U.S. PATENT DOCUMENTS

| | | | |
|---|---|---|---|
| 3,852,571 A | 12/1974 | Hall et al. |
| 4,701,601 A | 10/1987 | Francini et al. |
| 4,734,564 A | 3/1988 | Boston et al. |
| 4,734,858 A | 3/1988 | Schlafly |
| 4,747,050 A | 5/1988 | Brachtl et al. |
| 4,775,935 A | 10/1988 | Yourick |
| 4,799,156 A | 1/1989 | Shavit et al. |
| 4,812,628 A | 3/1989 | Boston et al. |
| 4,822,985 A | 4/1989 | Boggan et al. |
| 4,823,264 A | 4/1989 | Deming |
| 4,947,028 A | 8/1990 | Gorog |
| 4,961,142 A | 10/1990 | Elliott et al. |
| 4,977,595 A | 12/1990 | Ohta et al. |
| 4,992,940 A | 2/1991 | Dworkin |
| 5,007,084 A | 4/1991 | Materna et al. |
| 5,021,953 A | 6/1991 | Webber et al. |

(Continued)

FOREIGN PATENT DOCUMENTS

EP 0745947 5/1996

(Continued)

OTHER PUBLICATIONS

Open Financial Exchange Bill Presentment, Jun. 12, 1997, 1997 CheckFree Corp., Intuit Inc., Microsoft Corp., pp. 312-356.

(Continued)

*Primary Examiner*—James P. Trammell
*Assistant Examiner*—J. Bradley Wright
(74) *Attorney, Agent, or Firm*—Sutherland Asbill & Brennan LLP

(57) ABSTRACT

A technique for identifying a consumer's electronic billers in which the consumer does not identify billers is provided. The consumer transmits, from a consumer station, a request for a service provider to identify his or her electronic billers. This request includes information identifying the consumer, but excludes any information identifying any biller. In response to the transmitted request, the consumer receives, at the consumer station, a listing of one or more electronic billers of the consumer. That is, these are electronic billers with which the consumer has a relationship. Also, the consumer has not previously requested to the service provider to electronically present bills of any of the electronic billers included in the listing.

23 Claims, 49 Drawing Sheets

U.S. PATENT DOCUMENTS

| | | | |
|---|---|---|---|
| 5,025,373 A | 6/1991 | Keyser, Jr. et al. | |
| 5,206,488 A | 4/1993 | Teicher | |
| 5,220,501 A | 6/1993 | Lawlor et al. | |
| 5,255,182 A | 10/1993 | Adams | |
| 5,283,829 A | 2/1994 | Anderson | 380/24 |
| 5,287,270 A | 2/1994 | Hardy et al. | |
| 5,319,542 A | 6/1994 | King, Jr. et al. | |
| 5,325,290 A | 6/1994 | Cauffman et al. | |
| 5,326,959 A | 7/1994 | Perazza | |
| 5,336,870 A | 8/1994 | Hughes et al. | |
| 5,383,113 A | 1/1995 | Kight et al. | |
| 5,420,405 A | 5/1995 | Chasek | |
| 5,428,684 A | 6/1995 | Akiyama et al. | |
| 5,453,601 A | 9/1995 | Rosen | |
| 5,455,407 A | 10/1995 | Rosen | |
| 5,465,206 A | 11/1995 | Hilt et al. | 364/406 |
| 5,473,143 A | 12/1995 | Vak et al. | 235/380 |
| 5,477,038 A | 12/1995 | Levine et al. | |
| 5,483,445 A | 1/1996 | Pickering | 364/406 |
| 5,500,513 A | 3/1996 | Langhans et al. | |
| 5,504,677 A | 4/1996 | Pollin | |
| 5,557,516 A | 9/1996 | Hogan | |
| 5,557,518 A | 9/1996 | Rosen | |
| 5,590,197 A | 12/1996 | Chen et al. | |
| 5,613,012 A | 3/1997 | Hoffman et al. | |
| 5,649,117 A | 7/1997 | Landry | |
| 5,655,089 A | 8/1997 | Bucci | |
| 5,677,955 A | 10/1997 | Doggett et al. | |
| 5,692,132 A | 11/1997 | Hogan | |
| 5,699,528 A | 12/1997 | Hogan | 395/240 |
| 5,710,887 A | 1/1998 | Chelliah et al. | |
| 5,710,889 A | 1/1998 | Clark et al. | |
| 5,715,314 A | 2/1998 | Payne et al. | |
| 5,717,989 A | 2/1998 | Tozzoli et al. | |
| 5,724,424 A | 3/1998 | Gifford | |
| 5,727,163 A | 3/1998 | Bezos | |
| 5,727,249 A | 3/1998 | Pollin | |
| 5,729,594 A | 3/1998 | Klingman | |
| 5,732,400 A | 3/1998 | Mandler et al. | |
| 5,794,221 A | 8/1998 | Egendorf | |
| 5,832,460 A | 11/1998 | Bednar et al. | 705/27 |
| 5,873,072 A | 2/1999 | Kight et al. | |
| 5,884,288 A | 3/1999 | Chang et al. | 705/40 |
| 5,920,847 A | 7/1999 | Kolling et al. | |
| 5,920,848 A | 7/1999 | Schutzer et al. | |
| 5,943,656 A | 8/1999 | Crooks et al. | 705/30 |
| 5,949,043 A | 9/1999 | Hayshida | |
| 5,956,700 A | 9/1999 | Landry | |
| 5,963,925 A | 10/1999 | Kolling et al. | 705/40 |
| 5,966,698 A | 10/1999 | Pollin | |
| 5,974,146 A | 10/1999 | Randle et al. | 380/24 |
| 5,978,780 A | 11/1999 | Watson | 705/40 |
| 6,003,762 A | 12/1999 | Hayashida | |
| 6,029,150 A | 2/2000 | Kravitz | 705/39 |
| 6,032,133 A | 2/2000 | Hilt et al. | |
| 6,035,285 A | 3/2000 | Schlect et al. | |
| 6,044,362 A | 3/2000 | Neely | 705/34 |
| 6,055,513 A | 4/2000 | Katz et al. | |
| 6,055,567 A | 4/2000 | Ganesan et al. | |
| 6,070,150 A | 5/2000 | Remington et al. | 705/34 |
| 6,078,907 A | 6/2000 | Lamm | |
| 6,085,169 A | 7/2000 | Walker et al. | |
| 6,098,053 A | 8/2000 | Slater | |
| 6,128,603 A | 10/2000 | Dent et al. | 705/40 |
| 6,173,272 B1 | 1/2001 | Thomas et al. | 705/42 |
| 6,188,994 B1 | 2/2001 | Egendorf | |
| 6,208,979 B1 | 3/2001 | Sinclair | |
| 6,263,447 B1 | 7/2001 | French et al. | |
| 6,285,991 B1 | 9/2001 | Powar | 705/76 |
| 6,289,322 B1 | 9/2001 | Kitchen et al. | |
| 6,292,789 B1 | 9/2001 | Schutzer | 705/40 |
| 6,304,857 B1 | 10/2001 | Heindel et al. | 705/34 |
| 6,311,170 B1 | 10/2001 | Embrey | 705/40 |
| 6,317,745 B1 | 11/2001 | Thomas et al. | |
| 6,374,229 B1 | 4/2002 | Lowrey et al. | 705/34 |
| 6,493,685 B1 | 12/2002 | Ensel et al. | |
| 6,711,682 B1 | 3/2004 | Capps | |
| 6,721,716 B1 | 4/2004 | Gross | |
| 6,889,205 B1 | 5/2005 | Lamm | |
| 6,934,691 B1 * | 8/2005 | Simpson et al. | 705/34 |
| 7,158,955 B2 | 1/2007 | Diveley et al. | |
| 2001/0032181 A1 | 10/2001 | Jakstadt et al. | 705/40 |
| 2001/0037295 A1 | 11/2001 | Olsen | 705/40 |
| 2001/0054020 A1 | 12/2001 | Barth et al. | |
| 2001/0056390 A1 | 12/2001 | Varadarajan et al. | |
| 2002/0002536 A1 | 1/2002 | Braco | 705/40 |
| 2002/0007320 A1 | 1/2002 | Hogan et al. | |
| 2002/0013768 A1 * | 1/2002 | Ganesan | 705/40 |
| 2002/0019808 A1 | 2/2002 | Sharma | 705/40 |
| 2002/0023055 A1 | 2/2002 | Antognini et al. | 705/40 |
| 2002/0023059 A1 | 2/2002 | Bari et al. | |
| 2002/0029248 A1 | 3/2002 | Cook et al. | 709/206 |
| 2002/0029249 A1 | 3/2002 | Campbell et al. | |
| 2002/0046168 A1 | 4/2002 | Kitchen | |
| 2002/0059139 A1 | 5/2002 | Evans | |
| 2002/0065772 A1 | 5/2002 | Saliba et al. | 705/40 |
| 2002/0069163 A1 | 6/2002 | Gilbert | 705/40 |
| 2002/0069168 A1 | 6/2002 | Lee et al. | 705/40 |
| 2002/0095387 A1 | 7/2002 | Sosa et al. | |
| 2002/0120628 A1 | 8/2002 | Hitchcock et al. | |
| 2002/0165936 A1 | 11/2002 | Alston et al. | |
| 2003/0004834 A1 | 1/2003 | Yamazaki | |
| 2003/0004867 A1 * | 1/2003 | Kight et el. | 705/39 |
| 2003/0139996 A1 | 7/2003 | D'Antoni et al. | |
| 2003/0145018 A1 | 7/2003 | Hitchcock et al. | |
| 2003/0167277 A1 | 9/2003 | Hejlsberg et al. | |
| 2003/0208441 A1 * | 11/2003 | Poplawski et al. | 705/40 |
| 2004/0064409 A1 | 4/2004 | Kight et al. | |
| 2004/0078329 A1 | 4/2004 | Kight et al. | |
| 2004/0083167 A1 | 4/2004 | Kight et al. | |
| 2004/0083171 A1 | 4/2004 | Kight et al. | |
| 2004/0139005 A1 * | 7/2004 | Ganesan | 705/39 |
| 2004/0143548 A1 * | 7/2004 | Meier et al. | 705/40 |
| 2004/0167853 A1 | 8/2004 | Sharma | |
| 2004/0199574 A1 | 10/2004 | Franco et al. | |
| 2004/0236584 A1 | 11/2004 | Kuebert et al. | |
| 2005/0010523 A1 * | 1/2005 | Myklebust et al. | 705/40 |
| 2005/0033690 A1 * | 2/2005 | Antognini et al. | 705/40 |
| 2005/0209965 A1 * | 9/2005 | Ganesan | 705/40 |
| 2005/0246550 A1 * | 11/2005 | Orbke et al. | 713/182 |

FOREIGN PATENT DOCUMENTS

| | | |
|---|---|---|
| EP | 0542298 | 5/1998 |
| EP | 1043668 | 3/2000 |
| EP | 1049056 | 4/2000 |
| EP | 1136923 | 9/2001 |
| EP | 1361533 | 11/2003 |
| GB | 2102606 | 2/1983 |
| WO | 91016691 | 10/1991 |
| WO | 9905628 | 2/1999 |
| WO | 9910823 | 3/1999 |
| WO | WO-00/48103 | 8/2000 |
| WO | 0152142 | 7/2001 |
| WO | WO-01/71973 | 9/2001 |
| WO | 0186558 | 11/2001 |

OTHER PUBLICATIONS

Business Practices Task Force of NACHA's Council for Electronic Billing and Payment, "An Overview of Electronic Bill Presentment and Payment Operating Models," Electronic Bill Payment/Presentment Business Practices, Apr. 4, 1999.

Disclosure Under 37 C.F.R. Section 1.56.

Coulter, Cuan. "E-Business: Account Aggregation." Dec. 31, 2001, pp. 1-6.

Council for Electronic Billing and Payment of the National Automated Clearing House Association (NACHA). "Electronic Bill Payment/ Presentment Business Practices." Dec. 7, 1999, vol. 2.0.

"CheckFree and Equifax Launch Electronic Billing and Payment—More Than 40 Financial Institutions Rollout Service." PR Newswire, Aug. 25, 1999, p. 1.

"European Search Report," European patent App. No. 04006976, European Patent Office, Mar. 2, 2005.

"European Search Report," European Patent App. No. 04009973, European Patent Office, Sep. 8, 2004.

"European Search Report," European Patent App. No. 04009974, European Patent Office, Oct. 22, 2004.

"European Search Report, "European Patent App. No. 04009975, European Patent Office, Oct. 28, 2004.

"European Search Report," European Patent App. No. 04009976, European Patent Office, Nov. 24, 2004.

"European Search Report," European Patent App. No. 04010334, European Patent Office, Feb. 2, 2005.

"European Search Report," European Patent App. No. 04010336, European Patent Office, Feb. 28, 2005.

"Eview Security Overview." AmeriComm website, 2005 pp. 1-2, AmeriComm, Chesapeake, VA. <http://americomm.net/EBPP_ESP.asp?topic=security>.

Fay, D. "An Architecture for Distributed Applications on the Internet: Overview of Mircorsoft's .NET Platform." Proceedings of the International parallel and Distributed Processing Symposium, Apr. 22, 2003, pp. 90-96.

"Frequently Asked Questions." Zip Merchant—The Commerce Tools Website, Apr. 14, 2005, pp. 1-5, Zip Merchant, the eCommerce Powerhouse. <http://www.zipmerchant.com/products/TransactSecure/FAQ/cfm>.

Gralla, Preston. "How the Internet Works." Que, Sep. 7, 2001, 6th ed., pp. 148-151.

"Harris Bill Payment & Presentment Enrollment Help." CheckFree website, 2002, pp. 1-5, CheckFree Corporation, Norcross, GA. <http://www.thevalidnetwork.com>.

"Interactive Financial Exchange." Business Method Specification, IFX Forum, Inc., Jun. 2, 2002, pp. 8-1-8-21.

Osberg, Sharon. "Wells Fargo, Standards-based Electronic Bill Presentment and Payment (EBPP)." Sun Microsystems, Nov. 1999.

* cited by examiner

Payee Information

900 — Payee Name [ ] — 501

Account Number
○ I have an account number with this payee.
Account Number: [ ] — 505

○ I do not have an account number with this payee.
Check Memo: [ ] (optional)
(This information appears on checks sent to this payee)

Payee Address 1 [ ]
Payee Address 2 [ ] (optional)
Payee State [ Select a State ▼ ]  } 507
Payee Zip Code [ ] [ ] (xxxxx)-xxxx
(Type exactly as it appears on your bill)
Payee Phone [ ] (xxx-xxx-xxxx)
— 509

Optional Payee Information

Payee Category
○ [ Select a Category ▼ ]
○ Add Category: [ ]

Account Description [ ]

Figure 5
(Prior Art)

Messaging

What sort of bills do you get on a monthly basis? — 3105

Phone
Gas
Electricity

Mortgage
Visa
MC
Debit Card
Oil Card

3110

Submit — 3115

3100

Initial Wizard Screen
(Optional)

Figure 31

(Multiple)
Industry & Geography

Which of these billers do you have?

Electric
☐ AEP
☐ Ohio Power

Department Store Card
☐ Saks
☐ Lazarus
☐ Nordstrom

Submit — 3203

Alternate Screen #2

Figure 32B (Single)
Industry Only

Let's look at your Department Store Card.
Which of These?

☑ Nordstrom
☑ Sears
☐ J.C. Penney

Submit — 3203

Wizard Screen #2

Figure 32A

Geography Only

Here are possible billers for you:

☐ AGL
☐ Cobb EMC
☐ Cox Cable
☐ Rich's
☐ Washington Mutual

Submit — 3302

No Prior Question To Subscriber

Screen #1

Figure 33A

Geography & Industry

Here are possible billers for you:

Cable
☐ Cox Cable

Electric/Gas
☐ AGL
☐ Cobb EMC

Mortgage
☐ Washington Mutual

Department Store
☐ Rich's

Submit — 3303

Alternate Screen 1

We have set up the following Payees:
- Countrywide Mortgage
- GMAC
- MBNA Visa

We have partially set up the following Payee (select to complete)

☐ AEP

We have identified possible candidates (select to set up):

Telco
☐ Sprint
☐ Ameritech

Gas
☐ Columbia Gas

Oil
☐ BP
☐ Shell

Department Store
☐ Saks
☐ Nordstrom
☐ Lazarus
☐ J C Penney

Cable
☐ AOL-time-Warner
☐ Cox

Submit — 3401

Payee Information

| Payee Name | AEP |

900

| Account Number | ○ I have an account number with this payee. |

Account Number: [           ] ─3505

○ I do not have an account number with this payee.

Check Memo: [           ] (optional)
(This information appears on checks sent to this payee)

| Payee Address 1 | 1234 Joan Rd. |
| Payee Address 2 | Dublin | (optional) |
| Payee State | Ohio ▼ |
| Payee Zip Code | 12345 | 6789 | (xxxxx)-xxxx<br>(Type exactly as it appears on your bill) |
| Payee Phone | 555-555-1234 | (xxx-xxx-xxxx) |

Optional Payee Information

| Payee Category | ○ Select a Category ▼ |

○ Add Category: [           ]

3500

| Account Description | [           ] |

Figure 35

TECHNIQUE FOR PRESENTING MATCHED BILLERS TO A CONSUMER

RELATED APPLICATIONS

This application is related to U.S. patent application Ser. No. 10/285,706, filed Nov. 1, 2002 and entitled "MATCHING CONSUMERS WITH BILLERS HAVING BILLS AVAILABLE FOR ELECTRONIC PRESENTMENT"; U.S. patent application Ser. No. 10/285,707, filed Nov. 1, 2002 and entitled "EASY USER ACTIVATION OF ELECTRONIC COMMERCE SERVICES"; U.S. patent application Ser. No. 10/285,691, filed Nov. 1, 2002 and entitled "A TECHNIQUE FOR CUSTOMIZING ELECTRONIC COMMERCE USER PRESENTATIONS"; U.S. patent application Ser. No. 10/285,666, filed Nov. 1, 2002 and entitled "SELECTIVE NOTICING OF AVAILABILITY OF AN ELECTRONIC BILL BASED ON SERVICE PROVIDER DATA"; U.S. patent application Ser. No. 10/285,669, filed Nov. 1, 2002 and entitled "SELECTIVE NOTICING OF AVAILABILITY OF AN ELECTRONIC BILL"; U.S. patent application Ser. No. 10/285,664, filed Nov. 1, 2002 and entitled "AN IDENTITY PROTECTION TECHNIQUE IN MATCHING CONSUMERS WITH ELECTRONIC BILLERS"; U.S. patent application Ser. No. 10/285,709, filed Nov. 1, 2002 and entitled "IDENTIFYING CANDIDATE BILLERS OR PAYEES OF A PAYOR"; U.S. patent application Ser. No. 10/285,667, filed Nov. 1, 2002 and entitled "EASY ESTABLISHMENT OF BILLER OR PAYEES OF A PAYOR"; U.S. patent application Ser. No. 10/285,663, filed Nov. 1, 2002 and entitled "A TECHNIQUE FOR MAKING PAYMENTS FOR A NON-SUBSCRIBER PAYOR"; U.S. patent application Ser. No. 10/285,708, filed Nov. 1, 2002 and entitled "MATCHING OF CONSUMERS WITH BILLERS HAVING BILLS AVAILABLE FOR ELECTRONIC PRESENTMENT".

FIELD OF THE INVENTION

The present invention relates to electronic commerce, and more particularly to increasing adoption of electronic billing and payment services by consumers.

BACKGROUND OF THE INVENTION

Electronic billing and payment (EBP) is widely available today due to the proliferation of the Internet and ubiquity of consumer computing devices. However, EBP acceptance by consumers has generally been by early adopters. The remaining members of the potential consumer base are aware of EBP, but have not yet availed themselves of the advantages of electronic billing and payment. There are barriers that, if addressed, can substantially increase the number of both consumers making up the EBP consumer base and EBP transactions.

FIGS. 1A and 1B show current models of EBP services. FIG. 1A shows the Biller Direct model. FIG. 1B shows the Service Provider (SP) model. The Biller Direct model includes multiple electronic billers A' through M'. Each of these electronic billers A' through M' maintains their own electronic billing enrollment and activation data, shown as databases 101 through 102. In the Biller Direct model enrollment and activation is a single process. A consumer 105 interacts with each of electronic billers A' through M' separately to begin receipt of electronic bills. Prior to enrollment and activation of electronic billing, each electronic biller A' through M' maintains information about each of their customers in databases 101 through 102. This is common information maintained by billers about customers. The consumer 105 must request to receive bills by providing enrollment and activation data, in addition to the information already maintained, to all electronic billers A' through M'. Enrollment and activation data is provided via communications channels 106A through 106M. The consumer provided enrollment and activation data for electronic billers A' through M' is very similar, typically merely consumer identifying information such as the consumer's name, in addition to perhaps other consumer identifying information such as address, phone number, etc. Thus, the consumer 105 ends up providing the same or similar data to each of electronic billers A' through M'.

The provided consumer identifying enrollment and activation data for electronic billing can include any or all of consumer name, phone number, billing address, and perhaps a service address, depending on the type of electronic biller. In addition, a consumer 105 may be required to provide an account number with each particular electronic biller from which electronic billing is being activated. Some electronic billers require an enrolling consumer to provide identity confirming information that is not typically publicly known, such as social security number (SSN) or mother's maiden name. Many electronic billers require the same identity confirming information. It will be apparent that in enrollment and activation via the Web the consumer 105 has to access Web sites hosted by each of these multiple electronic billers A' through M' to provide enrollment and activation data at every single electronic biller Web site. Typically, the only different (unique) piece of information required by each electronic biller is the account number, because, as known, these differ by biller.

FIG. 1A also shows the consumer 105 enrolling for making on-line (electronic) payments to biller A' through biller Z'. Enrollment is shown via communications channels 108A through 108Z. Enrollment for making electronic payments is separate from enrollment for electronic billing in the typical Biller Direct EBP system. Required consumer supplied enrollment data for electronic payments is, here again, similar in nature among various electronic billers (payees), and typically includes funding account information. Each of electronic billers A' through Z' stores enrollment data for on-line payments in separate data repositories, 110 through 111, than those in which enrollment data for electronic billing is stored, 101 through 102. Typically, the enrollment data for making electronic payments is not linked to or otherwise shared with the enrollment data for receiving electronic billing, as shown by the separate electronic billing data repositories 101 through 102 and electronic payments data repositories 110 through 111. It should be noted that not all electronic billers offer electronic payments, and that not all billers offering electronic payments offer electronic billing.

In a Biller Direct model there are multiple ways that electronic payments can be performed. In one, an electronic biller A' through Z' provides all the functionality for completing the payment. That is, an electronic biller presents a user interface for payment via a communications channel 108A through 108Z, captures enrollment data for payments from the consumer 105, warehouses payment requests in data repositories 110 through 111, processes the payment requests, and issues all debits, credits, and remittance advice associated with payment requests.

In another way that electronic payments can be performed, an electronic biller A' through Z' shares the functionality for completing payments. An electronic biller presents the user interface, but outsources the actual payment processing to a service provider, not shown in FIG. 1A. There are multiple variations as to whether the electronic biller or the service provider captures enrollment data for payments and whether the electronic biller or the service provider warehouses payment requests. In any event, a service provider processes the payment requests and issues all debits, credits, and remittance advice associated with the payment requests.

Yet another way that electronic payments can be performed, an electronic biller A' through Z' can completely outsource the payment functionality, including the user interface. This variation is much like the SP model of EBP services, to be discussed below. A service provider manages everything from the gathering of payment enrollment data through completion of a payment.

In enrollment for on-line payment, the consumer 105 typically provides, for each payee (billers A' through Z'), customer name, customer address, phone number, and information identifying a funding account from which payment will be made. With some billers it is not necessary for a consumer to provide name, address, and account number information if that consumer is already enrolled for electronic billing. The consumer need only supply funding account information. This same information is required for payment to each payee. The different piece of information, among payees, as above, is the consumer's unique account number associated with each payee. In the Biller Direct model of FIG. 1A, the consumer 105 has to enter similar or the same data for every electronic biller, whether electronic bill receipt or on-line (electronic) payment is desired. Thus, existing EBP enrollment and activation processes are very redundant.

Accordingly, a need exists for an efficient enrollment and activation technique in the Biller Direct model of electronic billing and payment.

Typically a funding account is a demand deposit account (DDA) which can be debited via the Federal Reserve's Automated Clearinghouse (ACH). Deposit account identifying information required for electronic payment includes a financial institution routing number (RTN) and an account number (DDA). RTN and DDA information is found at the bottom of a consumer's check. Consumer 105 is required to either memorize this information, or have a checkbook available at the time the information is supplied to a payee. Not only must the consumer 105 have a check available when entering RTN/DDA information, if not memorized, he or she must have a bill from a biller available when supplying account numbers, if account numbers are not memorized. Some billers accept payment from other types of accounts, such as credit card accounts and money market accounts. Money market accounts are also debitable via the ACH. It is known that oftentimes consumers enter RTN/DDA information and other account numbers incorrectly. For example, digits are often transposed. While an account number with a biller typically has to only be entered once, RTN and DDA, or other funding account information, information has to be entered multiple times, once for each biller.

Accordingly, a need exists for an enrollment technique for electronic billing and payment which reduces incorrect entry of enrollment and activation data.

Prior to even beginning an enrollment process the consumer 105 is required to locate Web sites of every one of these electronic billers A' through M' and/or payees A' through Z', whether this is through a search engine or a marketing message received by the consumer 105. Consumer 105 has to locate and access Web sites, determine if a particular biller offers the desired service (electronic billing and/or electronic payment), and then begin the enrollment process, which itself has deficiencies as discussed above. Thus, finding a particular biller and/or payee on the Web and determining if they offer electronic billing and/or electronic payment services takes time, effort, and initiative on the consumer's part.

Accordingly, a need exists for a technique to efficiently match consumers who desire electronic billing and/or electronic payment with billers who offer such services.

FIG. 1B shows an EBP model in which a service provider 120 is the primary connection for a consumer 115 to reach electronic billers and/or payees. This is known as a SP model. In the SP model enrollment and activation are separate processes. As shown in FIG. 1B, a consumer 115 communicates via communications channel 130 with a SP 120. The consumer 115 enrolls with SP 120, not individual electronic billers A through M. Shown from SP 120 are communications channels 142A through 142M to electronic billers A through M. Thus, one of the advantages for the consumer 115 in this model is that enrollment data is only entered once. Enrollment data is stored in enrollment database 135 by the SP 120. This core enrollment data includes the consumer's name and address and other key consumer identifying information. While the consumer 115 is only required to enter enrollment data once, the consumer 115 must enter activation data for electronic billing for each electronic biller. This activation data often includes part of, or even all of, the same data as required for enrollment.

Also shown in FIG. 1B is multiple instances of stored activation data 140A-140N. This reflects the fact that even though the consumer 115 has enrolled once with the SP 120, he or she is still required to activate receipt of electronic billing for each of electronic billers A through M separately. The consumer 115 has to enter activation data for each biller. Thus, for electronic biller A, consumer 115 is required to enter activation information such as social security number, mother's maiden name, etc. Further, consumer 115 has to continue to enter this information, or variations thereof, each time they activate a new e-Bill from a different electronic biller in this model. To begin activation, the SP 120 typically presents a list of all the billers for which the SP 120 presents bills. The consumer 115 selects those billers he or she wishes to activate. The service provider 120 then transmits an activation notice to each selected biller informing the biller to begin to provide bills to the SP 120 for presentment to the consumer 115.

Accordingly, a need exists for an efficient enrollment and activation technique in the SP model of electronic billing and payment.

In the SP model of EBP services the consumer 115 has the capability within one site to enroll for and review multiple electronic bills. This diagram also depicts a data store 150 associated with the SP 120 labeled "Other Subscriber Data". This reflects the fact that consumer 115 can also access the SP 120 to pay billers other than electronic billers A through M, because this "Other Subscriber Data" includes payment data.

Different SPs offer one or more of at least three different payment models. A first is a 'closed payee list—electronic biller' model in which only electronic billers presenting electronic bills through a SP can be paid. That is, the only payments available are payments of received electronic bills. A second model is a 'closed payee list—electronic biller and managed payee' model in which electronic billers as well as payees with which the SP has a relationship can be paid. A third model is an 'open payee list' model. In an 'open payee list' model, consumers who enroll for EBP services can pay any payee.

Not all electronic billers that the consumer 115 would want to receive e-bills from offer electronic billing through SP 120. In such a case, the consumer 115 has to enroll with those electronic billers via a Biller Direct model to be able to receive those e-bills, or perhaps even via another SP. Thus, consumer 115 would still have multiple locations in which to enter redundant information.

Referring back again to the Biller Direct Model, as discussed above, consumers have to enroll in multiple places to make electronic payments and/or receive electronic bills. In addition to the problems discussed above, consumers have to remember which sites at which they have enrolled, as well as multiple site access code (consumer ID) and password combinations. Because of different site requirements a consumer may not be able to obtain a desired ID/password combination. Also, a desired ID/password combination may be unavailable because it is already in use by another consumer. So, yet another barrier to the making electronic payments and/or the receipt of electronic bills is that consumers have multiple Web sites they have to access to make payments as well as multiple Web sites to access to see bills and/or payment history. Each of these sites requires a consumer ID and password. A consumer must have available the correct ID/password combinations upon each visit to a Web site.

One of the solutions to the problem of multiple user IDs and passwords is found in the on-line retail market. However, the solution only applies to electronic payments, not electronic billing. Today there is known a third party payment service provider which supplies payment services which are accessed via a payment link that is found in multiple Web sites operated by disparate on-line retailers. That is, multiple unrelated retail Web sites each have a link to a single payment service provider Web site. A consumer has to only enroll once for this third party payment service. The on-line retailers provide the link for the consumer to access this payment capability. Once the link is activated, the consumer's browser then is redirected to a third party hosted Web site in order to enter payment information.

In FIG. 2 are shown blocks 205A-205N, each representing one of multiple Web sites a consumer could go to make payments using this third party payment service. Shown are an auction Web site 205A, a retailer A Web site 205B, retailer B Web site 205C, retailer Web site C 205D, and a Web site of the third party payment service provider itself 205N. At each one of these Web sites 205A-205N there is a payment link 210A-210N that represents the third party payment provider. Once activated by a consumer, the consumer's browser is redirected to a Web site for payment 201 hosted by that third party provider and branded as the third party provider. Of course, with link 210N a consumer is already visiting a web site of the third party payment provider. The payment Web site 201 is not branded based on the site from which the consumer may be making a purchase, nor is any of links 210A, 210B, 210C, or 210D branded based upon the Web site at which each respective link is found. Once the consumer has entered payment information at the third party payment service provider, then it is up to the third party payment service provider to feed information associated with the payment back to a seller from which a purchase was made.

The third party payment service provider does provide a single view of all of transactions for a given consumer. The consumer can go directly to the third party payment service provider in order to see all of his or her payment history as well as make payments. This provides the same user experience no matter where the consumer is activating a payment link 210A-210N. However, it should be noted that the third party payment service provider only offers a closed payee list. That is, only certain payees can be paid, those having a business relationship with the third party payment service provider. This third party payment service has a one-time enrollment feature and the consumer uses the same user ID and password no matter the Web site from which the payment link 210A-210N is activated.

The third party payment service provider technique of FIG. 2 works well in the retail environment, however it does not work well for companies who feel like their brand is very important with their customers and would like a user experience to be the same whether the consumer is viewing an e-bill at the company's site, or doing anything else from the company's site, including paying a bill or making a purchase. In order to have a branded environment today, there are isolated silos of EBP activity such that a consumer has to go to multiple sites and have multiple user names and passwords in order for billers to have branded environments and otherwise control the user experience, as discussed above.

Other models of EBP functionality exist in the SP model context which address consumer desires to view electronic bills at a single location. One is known as 'scrape-and-pay'. Here a consumer still has to locate each electronic biller Website and set up a unique relationship with each electronic biller, including establishing ID/password combinations. The consumer provides each biller ID/password combination to a 'scrape-and-pay' service. The service, based upon the consumer-provided ID/password combination, gathers billing information from each electronic biller Web site and then presents this information to the consumer. In this approach, the consumer still must establish relationships with multiple electronic billers, and electronic billers have no control over the final presentation of electronic bills to consumers.

Another model of EBP functionality in the SP context also allows a consumer to view bills electronically and is known as 'scan-and-pay'. Here a consumer issues a directive to a biller to have his or her paper bills delivered to a 'scan-and-pay' service. The 'scan-and-pay' service, upon receipt of a redirected paper bill, merely digitizes at least part of the received paper bill and presents it electronically to the consumer. While this service does make paper bills electronically available, there are several problems with this service. First, a consumer must actively change his or her billing address to the address of the 'scan-and-pay' service provider. Thus, the consumer must take actions with each biller to receive electronic bills through a 'scan-and-pay' service. Also, as a result of the redirection of the paper bill, the biller loses a line of communication to the consumer. Thus, often times important information, such as changes to terms and conditions, are not communicated to the consumer because a 'scan-and-pay' service does not typically digitize the entire contents of the paper bill, including inserts. The redirection of the paper bill also means that the biller loses control of the presentment experience, albeit a paper presentment. It should be noted that the problems of loss of control of the presentment experience as well as loss of a line of communication are also present in 'scan-and-pay' services. Also a problem with paper bills being redirected, replacement credit cards have been directed to a scan 'scan-and-pay' service instead of the consumer, as often a biller does not know that an address to which paper bills have been redirected is not an address of a consumer.

In view of the above, a tension exists between consumer desires to view and pay bills available at multiple different sites from multiple different billers and make purchases at multiple different sites using the same user ID and password and via a one time enrollment process, and billers' desires to control the branding and user experience of the presentment and payment of bills and as well as Web site purchases.

As such, a need exists for a technique of EBP services in which a consumer can view electronic bills of various billers and make electronic payments to various payees utilizing a single user ID/password combination that allows billers and/or payees to control the branding and the user experience.

FIG. 3 depicts a precursor situation to enrollment for EBP services. In FIG. 3 is shown is a consumer 301 who is interacting with their e-mail inbox 305. The consumer 301 may be interested in paying bills on-line and/or receiving bills on-line, but he or she is not quite sure how to achieve this. Also in FIG. 3 is an actual physical mail box 315. The consumer 301 can receive a paper bill in their physical mail box 315 and they can pay that bill via conventional avenues, i.e. by check mailed to a biller. Perhaps consumer 301 has received an offer, perhaps within a paper bill, to participate in e-billing. Accordingly, an e-bill offer 320 is shown being delivered via the traditional mail box 315. This offer could come from either electronic biller A or electronic biller B. Thus, an electronic biller is sending out a paper bill to the consumer 301, and within the paper bill is an e-bill offer 320 to begin to receive that same paper bill in an electronic fashion. It is an offer to receive the bill on-line, and perhaps to even pay it on-line. Such offers are sent to all customers of a biller sending the offers. They are not targeted to those customers likely to act on them.

The consumer 301 has to take that offer and do something with it. He or she has to access the Web, locate the biller, and enroll. As also depicted, the consumer 301 may currently be enrolled with some sort of payment service to make electronic payments. Shown is SP 330 for making electronic payments. Thus, in this example, the consumer 301 is actually making electronic payments. As shown, the SP 330 pays electronic biller B on behalf of the consumer 301, but the consumer 301 has not enrolled for any e-bill service. While the consumer 301 may be interested in viewing and paying bills on-line, there is currently no technique to easily sign up for electronic billing, even in cases where the consumer makes electronic payments of received paper bills. The consumer 301 still must visit one or more Websites and enroll for and activate electronic billing, as discussed above.

Accordingly, a need exists for an EBP service which facilitates consumer enrollment.

FIG. 4 depicts yet another problem in enrollment for electronic billing. At the time of enrollment in today's systems, a consumer has to include payment account information, even though only e-billing services may be desired. Received enrollment information, including payment account information, is typically processed for identity verification. This processing often includes leveraging commercial identity verification services, such as Equifax. This processing also includes risk processing that relates to payments, not billing. Some customers fail this risk processing even though they only desire electronic billing. To support the identity verification and risk processing consumers are required to enter many fields of data. The required data is personal data that many consumers perceive as being extra sensitive. Examples of this data include drivers license information, mortgage, and other loan information. Additionally, this is a time consuming process.

FIG. 4 depicts Web sites 401A-401N associated with Biller A, Biller B, Biller C, and a SP. Each of these sites offers electronic billing as well as electronic payments. A consumer independently has to enroll at each of these sites, as discussed above. Even though a consumer may only wish to receive e-bills, that consumer would have to fully enroll, in which supplemental information for risk management in addition to identity verification must be provided. Thus, the enrollment process ties together information required to receive e-bills with bank account information required to pay bills.

In a SP model, once a consumer enrolls with a SP from site 401N the consumer has to activate individual e-bills 405A-405N, as discussed above. At the time of activation the consumer must enter specific information that billers may require. As also discussed above, a consumer could end up having to supply the same information multiple times in order to activate different bills.

In summary, from a consumer perspective, the consumer has to give the same information out four different times to enroll with Billers A through C and the SP. The consumer goes to the Biller Direct Web site 401A for biller A, and enters in their name, address, e-mail address, or other identifying information. When the consumer goes to the Biller B Biller Direct Web site 401B or the Biller C Biller Direct Web site 401C, as well as the SP Web site 401N, the consumer has to re-key much of the exact same data multiple times. This is also shown in FIG. 1A where biller A' and M' have their own databases storing enrollment data that is not leveraged anywhere else and in FIG. 1B with the siloed activation data.

As introduced above, EBP systems have achieved significant adoption in the marketplace, but have not yet lived up to their full potential. Getting consumers to enroll in EBP services is one hurdle, followed by getting the enrolled consumer to actually use the EBP system to pay bills and make other payments. Due to the effort required to set up payees, including billers, some enrolled consumers never activate a biller or payee and are eventually purged from a SP's customer base.

As shown in FIG. 5, current generation EBP systems require the consumer to manually enter payee information in order to set up and activate each payee for electronic payments. This includes entering biller (payee) name 501, payment account information 505, remittance center address 507, phone number 509, as well as other information. Entering this data for multiple payees usually requires a significant amount of time and effort on the part of a consumer. Additionally, most consumers need to have their paper bill available as a reference during payee setup, as introduced above. It has been the experience of the assignee of the present application that the effort required to set up payees is a major reason why enrolled consumers never become active users of EBP systems.

While an individual consumer may need to pay bills or make payments to only a small number of payees, these payees typically are already associated with or otherwise known to a SP. For example, a consumer may choose to set up Ameritech as a payee, yet a SP may have thousands of customers who have entered Ameritech as a payee. As a result, it is likely that the SP may already store some of the information required to set up Ameritech as a payee of this consumer. This is especially true for billers that have electronic (e-bill) connections to the SP.

Some EBP systems already provide consumers with a "pick list" of billers to choose from in payee set up, as well as for biller activation. However, this approach does not fully exploit various possibilities for providing lists tailored for individual consumers or for identifying specific billers as candidate billers payees. This approach also does not utilize techniques to provide assistance and help automate the payee set up process.

Accordingly, a need exists for a technique for making it easier and faster for consumers to set up payees and/or billers.

A "Web service" is a network accessible interface to application functionality built using standard Internet technologies. Note that the phrase 'standard Internet technologies' is what makes Web services interesting. Computer users have been accessing application functionality over a network for a long time. However, up until now, the various communications protocols used in accessing application functionality were almost exclusively proprietary and unique in nature. Web services defines a common infrastructure to be used by all network-based applications and the clients that use them.

A collection of software and tools that enable developers to create, deploy, and access Web services has been proposed. One such proposal has been made by the Microsoft Corporation. It is important to understand that even though Microsoft's software suite for enabling Web services, known as the .NET platform, is perhaps the most well known, it is by no means the only way to build or use Web services.

A large component of the Microsoft Corporation's .NET proposal is to offer to consumers (presumably for a fee) a suite of commonly used Web services. This bundle of remotely accessible application functionality, dubbed Microsoft .NET My Services, is expected to be publicly available sometime in 2002. Though the exact pricing, business model, and functionality of .NET My Services has not yet been made public, some proposed services include: .NET Profile, which associates a name and other personal profile information with a subscriber; .NET Contacts, which stores electronic relationships/address book for a subscriber; .NET Alerts, which provides subscriber alert subscription, management, and routing functionality; .NET Calendar, which provides time and task management; .NET Wallet, which provides storage for payment instructions as well as perhaps transaction records; and .NET Passport, which is an authentication service.

.NET Passport allows participating subscribers to create one sign-in name and password for use across participating .NET Passport sites. Additionally, subscribers can save time and avoid repetitive data entry by storing basic demographic information that can be shared with .NET Passport sites. When a subscriber signs in to a participating .NET Passport site, .NET Passport sends the subscriber's identifying information such as ZIP Code, country/region, and city information to the site upon request, or, alternatively the .NET data repository can be accessed by participants in the Web service. Subscribers can also choose to provide their nickname, e-mail address, age, gender, and language preference.

Clearly, universal adoption of .NET Passport would go a long way towards simplifying a consumer's Web experience by alleviating a great deal of data entry and removing the need to memorize a different set of authentication credentials (i.e. ID and password) for each Web site they visit.

.NET Alerts can be utilized in a number of interesting and divergent scenarios, including appointment and special events reminders, monthly bill or statement availability online notification, notification of excessive stock price movement; traffic alerts; notification of a bank account being overdrawn; or notification of a magazine article being available based on previously entered keywords. It should be noted that as of yet no specific proposals for utilizing .NET Alerts for online notification of electronic billing availability is known. At best, it is merely envisioned that .NET Alerts could support notification of a newly issued bill being available to a subscriber already receiving electronic bills from a biller issuing the newly available monthly bill.

.NET Alerts is envisioned to allow businesses to notify consumers of important events that the consumer can then, optionally, act upon. An alert is a short instant message that .NET Alerts providers can send to subscribers who opt to receive them. The alert is routed based on the subscriber's delivery preferences and can be delivered directly to desktops, mobile devices, and any e-mail address. As an example, a subscriber will commonly opt to have alerts routed to their Windows Messenger client when online and to an e-mail address when offline. Routing to pagers or to a telephone number is envisioned.

The Microsoft Corporation appears to envision .NET Alerts as a strictly "opt-in" service in which consumers subscribe only to alerts that they want and can unsubscribe at any time. This would avoid spam in .NET Alerts, which is spurious, unwanted, or undesired received communications. It is emphasized that subscribers will only receive the notifications that they want. .NET Alerts are envisioned to be free of spam.

.NET Wallet, yet another Web services data repository, is envisioned to provide a repository for a subscriber's various payment vehicles (e.g. credit card numbers, bank account information, coupons). Much like .NET Passport, the wallet service relieves the subscriber's of much repetitive (and error-prone) data entry.

It does not appear at this time that the Microsoft Corporation intends to provide payment processing functionality. Rather, it seems the intent is that merchants will query the .NET Wallet service for payment information such as a credit card number and it will then be up to the merchant (or perhaps a third-party) to actually ensure that a transaction is executed. Also, the current incarnation of .NET Passport Wallet (a precursor to .NET Wallet) does not capture bank account (RTN/DDA) information. Currently, it is exclusively credit card-based. Thus, .NET Wallet is merely a storage place for financial information, no substantial payment functionality is included.

Accordingly, a need exists for an EBP service which leverages Web services to support the entire EBP experience, including payment processing functionality, including payments based upon and made from subscriber's bank accounts, electronic bill location functionality, and electronic bill delivery functionality.

OBJECTS OF THE INVENTION

It is an object of the present invention to increase the number of electronic commerce participants.

Another an object of the present invention is to increase the number of electronic commerce transactions.

It is another object of the present invention to increase consumer ease of use of electronic commerce systems.

It is also an object of the present invention to provide a technique for identifying one or more electronic billers of a consumer.

It is yet another object of the present invention to provide a technique for identifying one or more electronic billers of a consumer without the consumer identifying any biller.

The above-stated objects, as well as other objects, features, and advantages, of the present invention will become readily apparent from the following detailed description which is to be read in conjunction with the appended drawings.

SUMMARY OF THE INVENTION

In accordance with the present invention, a method and a system for identifying one or more billers having bills available for electronic presentment to a consumer without the consumer identifying its billers are provided. A biller is any entity, including individuals, businesses, and organizations, that receives payment based upon a presented bill. A bill is a demand for payment and includes invoices, statements, and other types of directives demanding payment. A consumer can be any entity, including individuals, businesses, and organizations, that receives a bill from a biller. Electronic presentment of bills can include presenting bills via a computing device, via a telephone, and via any other electronic device capable of conveying information. It should be noted the present invention does not require that a bill actually be electronically presented.

The system includes a communications interface and a processor. The communications interface is configured to transmit and receive information associated with electronic bill presentment, as will be described below. The information can be received via one or more networks. The one or more networks can include, but is not limited to, the Internet, a local area network, a wide area network, and the public switched telephone network, as well as any other network capable of transmitting information, including wireless networks. The processor could be any type of processor capable of functioning to implement the method as described herein, including, but not limited to, a processor as found in a typical personal computer, main-frame computer, server-type computer, or any other type computing device.

In accordance with the present invention, a request for a service provider to identify one or more billers having bills available for electronic presentment is transmitted from a consumer station. A consumer station is any device capable of transmitting such a request, including, but not limited to, a telephone, a mobile phone, and any computing device. A service provider is an entity other than a biller that provides services associated with electronic bill presentment. The service provider might only identify electronic billers of a consumer, while another entity, perhaps a biller, actually electronically presents bills. Or, the service provider might also present a biller's bills to a consumer on behalf of the biller. If so, preferably, the service provider presents bills on behalf of a plurality of billers. Also, if so, preferably the service provider presents bills to a plurality of consumers. Also, the service provider could also provide a payment service in which the service provider makes payments on behalf of payors to payees. The transmitted request is a request for the service provider to identify the consumer's billers that issue bills available for electronic presentment. Such a biller is known as an electronic biller. The consumer may be known to the service provider when the request is transmitted, or the consumer may be unknown to the service provide when the request is transmitted.

The request includes information identifying the consumer. This consumer identifying information can include any information identifying the consumer, including, but not limited to, any or all of the consumer's name, the consumer's address, the consumer's telephone number, the consumer's social security number, and the consumer's date of birth. The consumer identifying information can also include a consumer identifier issued by the service provider, if any.

The request excludes information identifying any billers of the consumer. That is, the request does not name any of the consumer's billers, or include other information identifying the consumer's billers, such an account number issued by a biller for the consumer. The transmitted request merely identifies the consumer and requests that electronic billers of the consumer be identified.

Information identifying those of the consumer's billers whose bills are available by electronic presentment is received at the consumer station. This information identifies electronic billers that are billers of the consumer. A single or multiple electronic billers can be identified. This information identifying electronic billers is received based solely on the transmitted request, the information identifying the electronic billers is not received based upon any other information transmitted, if any, by the consumer station between the transmission of the request and the receipt of the information identifying the consumer's electronic billers. This aspect of the present invention does not require any other information to be transmitted. The consumer has not previously requested the service provider to present bills of the identified electronic billers. Thus, electronic bill presentment from an identified electronic biller has not previously been activated by the service provider for the consumer, and nor has the service provider previously presented a bill of an identified electronic biller to the consumer.

According to one aspect of the present invention, the information identifying the consumer is first information identifying the consumer. Also, those identified billers are first billers. The first billers can be a single biller, multiple billers, or even no billers in this aspect. A request for second information identifying the consumer is received at the consumer station subsequent to the transmission of the request to identify billers. This second request is not dependent upon the number of identified first billers. This request could be received from the service provider, or perhaps from a biller of the consumer. The consumer station transmits the second information responsive to the received request for the second information. This transmission could be to the entity from whom the request for the second information was received, or could be to another entity.

Subsequent to the transmission of the second information the consumer station receives information identifying those other billers of the plurality of the consumer's billers, different than the first billers, whose bills are available by electronic presentment. This information is received based upon the transmitted request and the transmitted second information. The information identifying the other billers could be received with the information identifying the first billers, or could be received separate from the information identifying the first billers. Also, the information identifying the other billers could be received from the service provider, or could be received from one or more of the other billers.

In another aspect of the present invention, the request is transmitted from the consumer station responsive to the consumer activating a Hyper-link which is a part of a Web page which represents an entity different than any identified biller. That is, the consumer, while visiting a Web site associated with a first entity, requests that his or her billers having bills available for electronic presentment be identified, and the results of that identification include billers other than the entity associated with the Web site from which the request originates.

According to a beneficial aspect of the present invention, the request includes information identifying types of billers with which the consumer has a relationship. That is, the request indicates that the consumer receives bills from a certain type of business. This biller type information does not include information identifying any biller of the consumer.

In still another aspect of the present invention, those identified billers are at least two billers of the plurality of billers of the consumer. Thus, the service provider identifies two distinct billers of the consumer having bills available for electronic presentment.

In a further aspect of the present invention, the received information is displayed at the consumer station. In a still further aspect of the present invention, those identified billers are a plurality of electronic billers. The displayed information identifying electronic billers includes information indicating a business type of each of the plurality of electronic billers. Those of the plurality of billers of the same business type are displayed together. For example, identified credit card company electronic billers might be displayed together.

According to an especially beneficial aspect of the present invention, the request is transmitted and the information is received during a single communications session.

In another aspect of the present invention, information identifying at least one candidate electronic billers is received. A candidate electronic biller is an electronic biller that has not been determined to be a biller of the consumer. An identified candidate electronic biller could be an electronic biller having a high likelihood of being a biller of the consumer, or could be any known electronic biller. The information identifying those electronic billers of the consumer and the information identifying the at least one candidate electronic biller are received together. This information is displayed at the consumer station.

According to another aspect, the information identifying those electronic billers of the consumer is displayed separate from the information identifying the at least one candidate electronic biller. The information identifying those electronic billers of the consumer can be displayed in a first presentation, while the information identifying the at least one candidate biller can be displayed in a second presentation. Or, the information identifying those electronic billers of the consumer and the information identifying the at least one candidate biller can be displayed in the same presentation, with the information identifying those electronic billers grouped together, and the information identifying the at least one candidate biller grouped together separate from the information identifying those electronic billers.

In yet another aspect of the present invention, the at least one candidate biller is multiple candidate billers. Each of these candidates is associated with a business type. That is, each candidate is a part of an industry. Those of the multiple candidates in the same industry are displayed together. For example, each candidate that is a department store is displayed with other candidates that are department stores.

It should be noted that whenever a definitely identified electronic biller of the consumer is displayed to the consumer, the display does not have to convey information that the electronic biller has been definitely identified as a biller of the consumer. That is, the displayed information could merely be a biller name or logo. For example, the name "ACME" might merely be displayed, or an "ACME" logo might merely be displayed. Or, the displayed information could be a definite electronic biller's name, or logo, with an indication that the displayed biller has been identified as a possible, candidate, electronic biller of the consumer, even though in fact that electronic biller has been identified by the service provider as a definite electronic biller of the consumer. Of course, the displayed information could indicate that the biller has been identified as a definite electronic biller of the consumer.

Also in accordance with the present invention, another method for identifying one more billers having bills available for electronic presentment to a consumer without the consumer identifying billers is provided. This method consists of transmitting a consumer request, from a consumer station and to a service provider, to identify billers of the consumer, and receiving at the consumer station information identifying electronic billers of the consumer.

The transmitted request, as discussed above, does not contain any information identifying any billers of the consumer. The received information only identifies electronic billers of the consumer. No other electronic billers are identified. As above, the identified electronic billers exclude any billers for which the consumer has previously requested the service provider to present bills. In this method, the consumer station only transmits the request, which excludes any information identifying any biller of the consumer, and then receives the information identifying the electronic billers of the consumer. No other information is transmitted by the consumer station, nor is any other information received by the consumer station in this method.

It will also be understood by those skilled in the art that the invention is easily implemented using computer software. More particularly, software can be easily programmed, using routine programming skill, based upon the description of the invention set forth herein and stored on a storage medium which is readable by a computer processor to cause the processor to operate such that the computer performs in the manner described above.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 5 depicts a payee set up screen as presented to a payor in the prior art, including required fields for the payor to complete.

FIG. 31 is a simplified depiction of a first user presentation of the Easy Payee engine of FIG. 7B in accordance with certain aspects of the present invention.

FIG. 32A is a simplified depiction of a second user presentation of the Easy Payee engine of FIG. 7B in accordance with certain aspects of the present invention.

FIG. 32B is a simplified alternative depiction of the second user presentation of FIG. 32A in accordance with certain aspects of the present invention.

FIG. 33A is a simplified depiction of a third user presentation of the Easy Payee engine of FIG. 7B in accordance with certain aspects of the present invention.

FIG. 33B is a simplified alternative depiction of the third user presentation of FIG. 33A in accordance with certain aspects of the present invention.

FIG. 34 is a simplified depiction of a fourth user presentation of the Easy Payee engine of FIG. 7B in accordance with certain aspects of the present invention.

FIG. 35 is a simplified depiction of a fifth user presentation of the Easy Payee engine of FIG. 7B in accordance with certain aspects of the present invention.

DESCRIPTION OF THE PREFERRED EMBODIMENT

Figure 6:
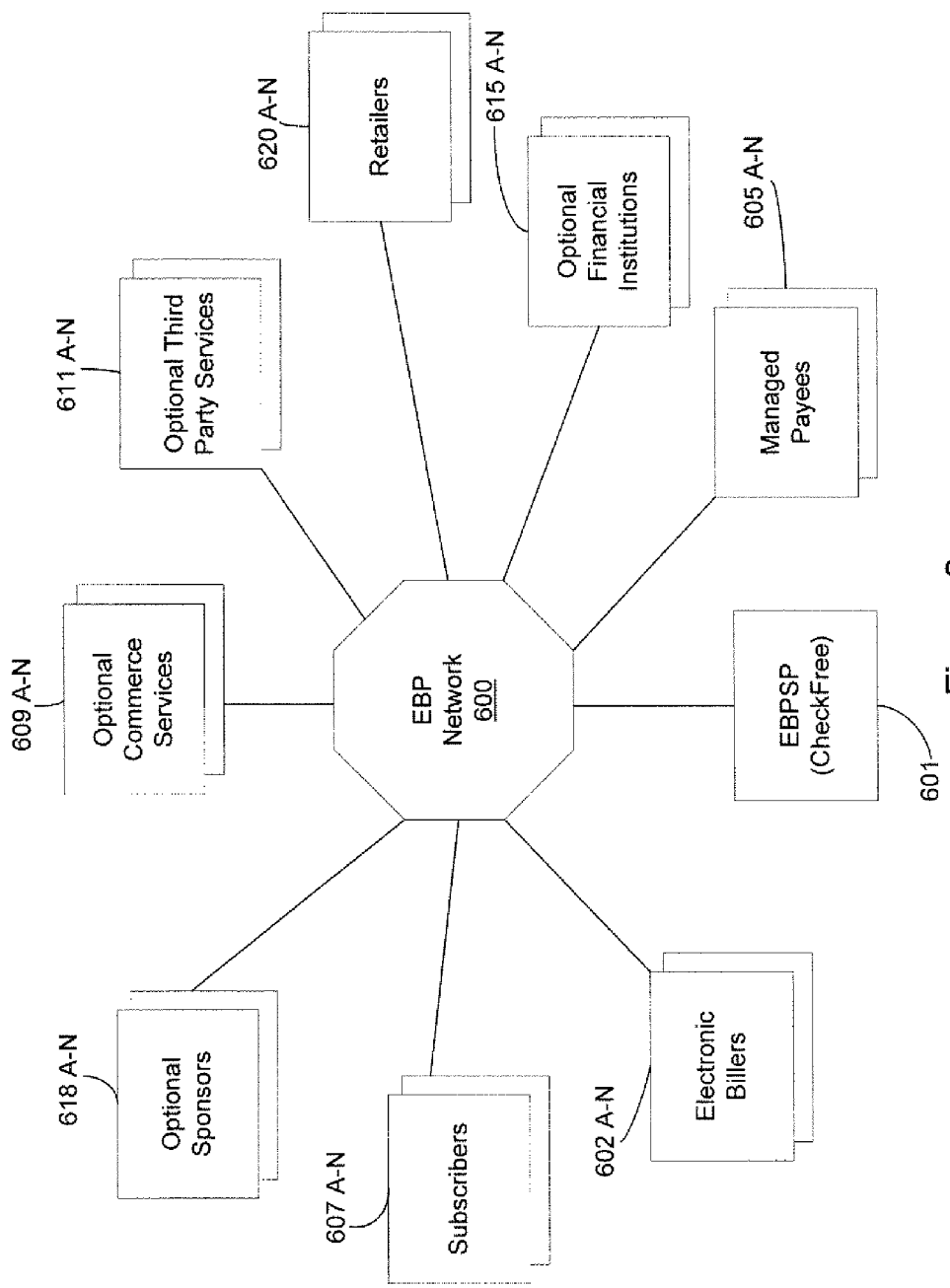
FIG. 6 is a simplified depiction of an electronic billing and payment network of the present invention, including an electronic billing and payment service provider and one or more subscribers of the service. Also shown in FIG. 6 are electronic billers, managed payees, financial institutions, retailers, third party services, common services, and sponsors.

FIG. 6 is a network diagram that shows a number of network entities participating in an electronic billing and payment (EBP) network 600 in accordance with the present invention. Communications between entities participating in the EBP network 600 can travel via the Internet, via one or more other networks, or via both the Internet and one or more other networks.

As shown, the network 600 includes a central electronic billing and payment service provider (EBPSP) 601, such as CheckFree, or some other electronic billing and/or payment service provider. The EBPSP 601 provides electronic payment functionality, sometimes referred to as e-payments, and provides electronic billing functionality, commonly referred to as e-billing. The EBPSP 601 perhaps additionally provides other electronic commerce services.

The network 600 also includes one or more electronic billers 602A-N that can bill their customers electronically, by presenting e-bills to customers, either directly or through the EBPSP 601. Electronic billers are sometimes referred to as e-billers. Also present are one or more managed payees 605A-N. Managed payees are not synonymous with electronic billers. Rather, for purposes of the description set-forth herein, these are entities for which the EBPSP 601 provides on-line payment functionality, which facilitates e-payments to managed payees.

The EBPSP 601 provides EBP services to a number of consumers, referred to in FIG. 6 as subscribers 607A-N. A subscriber could be an individual, a business, or another organization that receives e-bills, makes e-payments, and/or participates in other electronic commerce services provided by the EBPSP 601.

In support of various EBP services provided by the EBPSP 601 are optional Common Services 609A-N, also known as Web Services, introduced above. Examples of an optional Common Service 609A-N include those provided under The Microsoft Corporation's .NET service framework, which are sometimes referred to as "my services". Also shown are optional third party services 611A-N, which are sources of information utilized by the EBPSP 601 in provided EBP services. An example of a third party service 611A-N is EQUIFAX™.

Also optionally participating in network 600 are financial institutions 615A-N. Financial institutions may, for example, provide some identity verification or similar information to the EBPSP 601, in addition to perhaps assisting the EBPSP 601 in completing electronic payments.

Also shown are sponsors 618A-N, such as banks, portals and other entities which sponsor subscribers, which optionally provide access to the EBPSP 601 on behalf of one or more of the subscribers 607A-N. Sponsors are sometimes referred to as consumer service providers (CSPs). Thus, subscribers 607A-N may, if desired, access the EBPSP 601 via a sponsor. The sponsors 618A-N may provide services to subscribers utilizing their own software, and rely on the EBPSP for certain processing, or the EBPSP may provide the sponsor branded services.

Finally, retailers 620A-N are depicted. Retailers 620A-N offer goods or services for sale via the Internet or other networks, and/or at brick-and-mortar, e.g., storefront, locations. The EBPSP 601 may provide e-payments to and/or provide other electronic commerce services for those retailers. It will be appreciated that other entities (not shown) could, if desired, participate in the EBP network 600.

Figure 7A:
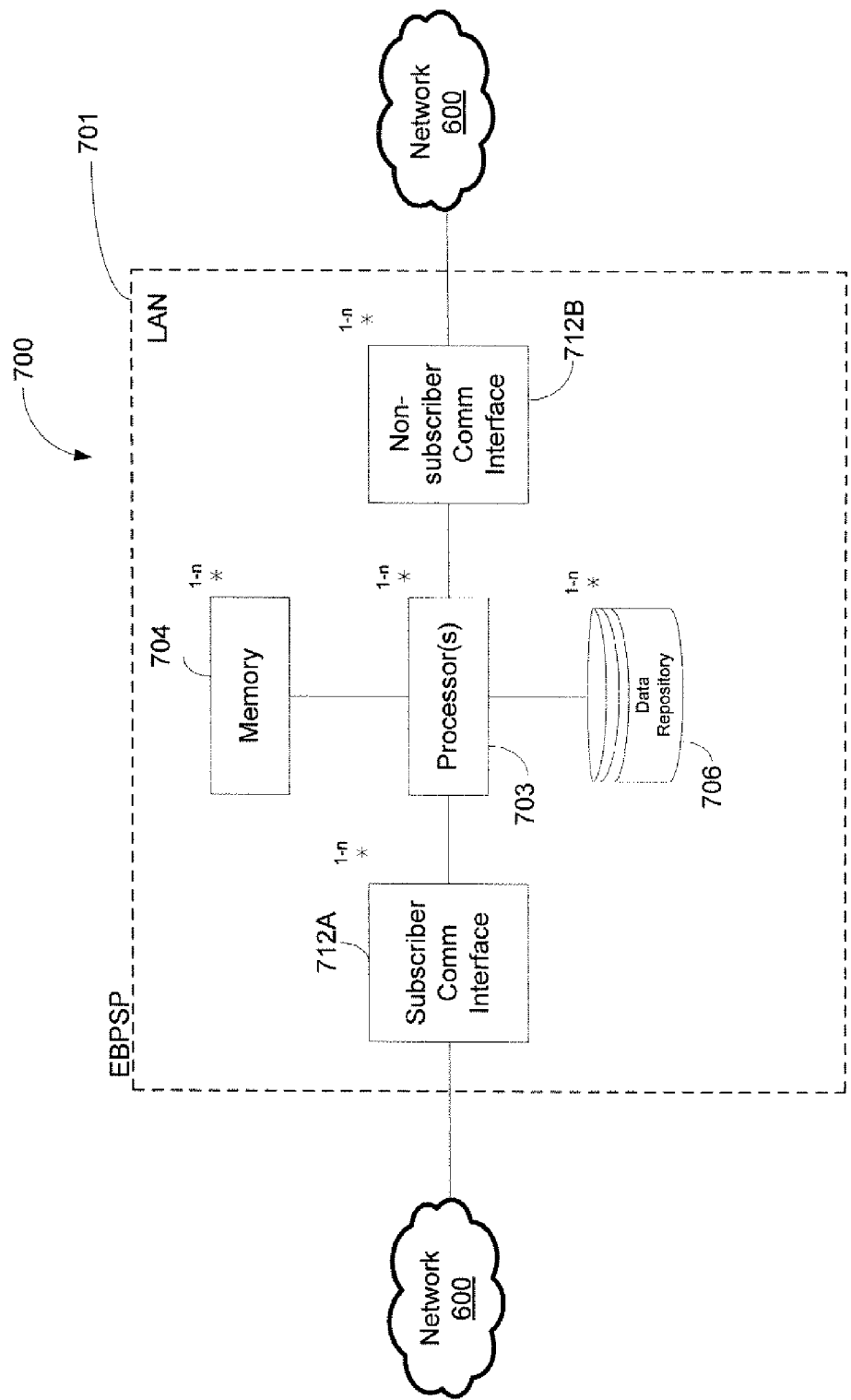
FIG. 7A is a simplified depiction of a computing system which can be associated with the electronic billing and payment service provider of FIG. 6 and with any financial institution of FIG. 6 in accordance with the present invention.

FIG. 7A is a diagram of an exemplary system 700 representing the EBPSP 601 on the network 600. As shown, an EBPSP local area network 701 (LAN), indicated with dashed lines, includes one or more EBPSP processors 703, each of which may be associated with one or more EBPSP memories 704 configured to store software executable by the EBPSP processor(s) 703. The EBPSP processor(s) 703 communicate with one or more EBPSP data repositories 706 of persistently stored data associated with the services provided by the EBPSP 601, at least one communications interface 712A for transmitting information to and/or receiving information from subscribers 607A-N via the network 600, and at least one communications interface 712B for transmitting information to and/or receiving information from, via the network 600, non-subscriber entities shown in FIG. 6. Communications interfaces are also referred to as communications ports. The EBPSP processor(s) 703 cause the EBPSP communications interfaces 712A and 712B to transmit information onto the network 600: The transmitted and received information includes information associated with EBP, and perhaps other, services provided by the EBPSP 601.

Communications with the subscribers 607A-N or non-subscriber entities could be via e-mail, a Web interface, or other type interface. These communications with subscribers 607A-N and non-subscriber entities could be synchronous or asynchronous. Examples of asynchronous communications include batch file or message queuing communications. Synchronous communications may employ any of a variety of response protocols, with Web services being a particular instance.

Figure 7B:
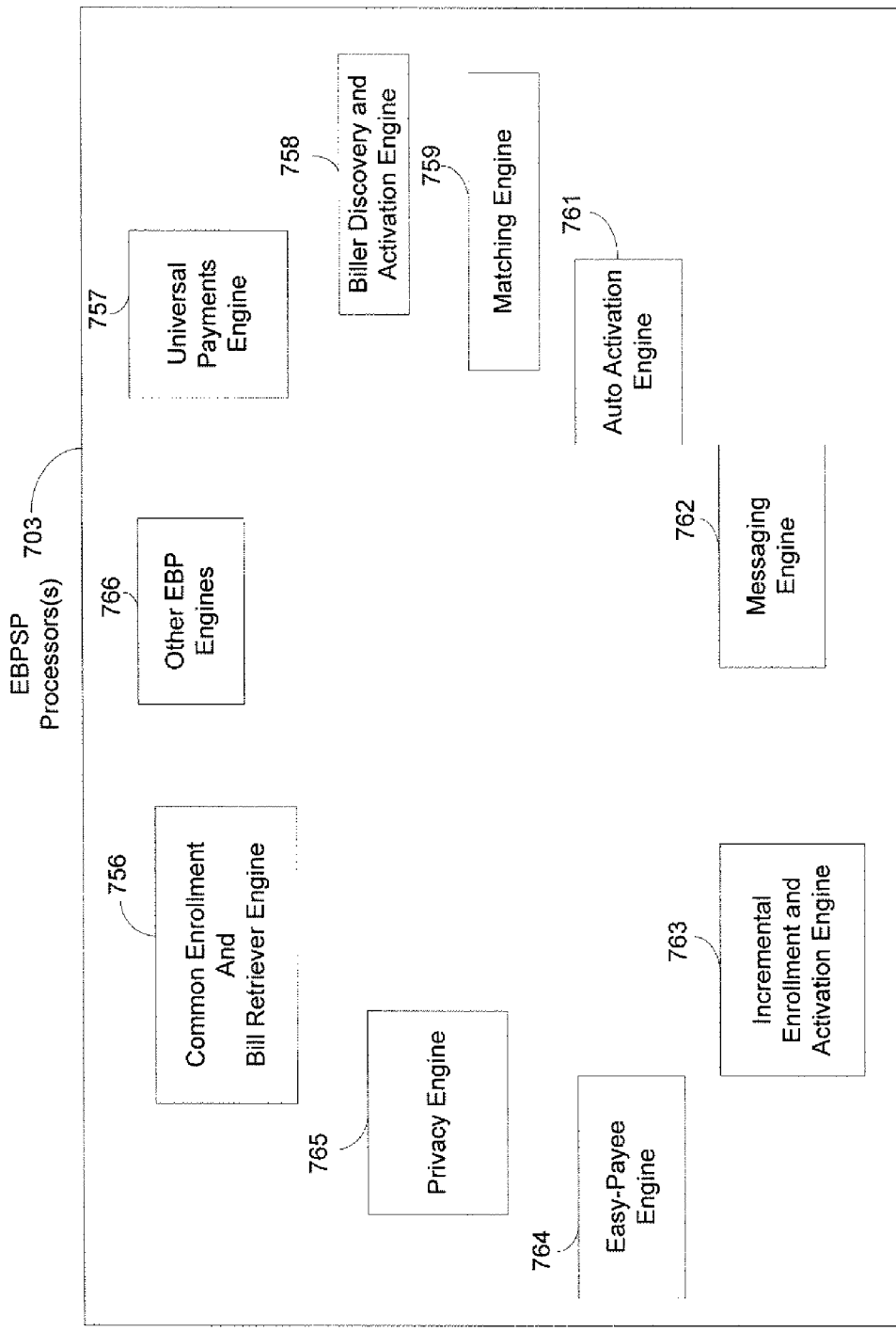
FIG. 7B is a further depiction of the processor of the computing system of FIG. 7A, including multiple electronic commerce engines.

FIG. 7B is a further depiction of the EBPSP 601 processor(s) 703 configured with the executable software to function in accordance with the present invention. The EBPSP processor(s) 703 function to provide EBP services and, if desired, other electronic commerce services. The EBPSP processor(s) 703 include a Common Enrollment and Bill Retriever Engine 756, a Universal Payments Engine 757, a Biller Discovery and Activation Engine 758, a Matching Engine 759, an Auto Activation Engine 761, a Messaging Engine 762, an Incremental Enrollment and Activation Engine 763, an Easy Payee Engine 764, a Privacy Engine 765, as well as other engines 766 used in providing EBP services. A conventional payments engine can be included as one of the other engines 766, as well as perhaps other conventional EBP engines.

The engines described herein and shown in FIG. 7B can operate separately. Preferably, however, two or more of the engines work together in providing EBP and/or other services. Further, if the EBPSP system 700 includes multiple processors 703 instead of a single processor, it is not required that each of the multiple processors be configured with each of the engines shown in FIG. 6. As an example, a first one of multiple EBPSP processors 703 could be configured with a first set of the various engines shown in FIG. 7B, while a second one of multiple EBPSP processors 703 could be configured with a second set of the various engines shown in FIG. 7B. In this example, the first set of engines could be utilized by the EBPSP 601 in providing a first service, and the second set of engines could be utilized by the EBPSP 601 in providing a second service. Other combinations of engines are also within the scope of the present invention.

Figure 8A:
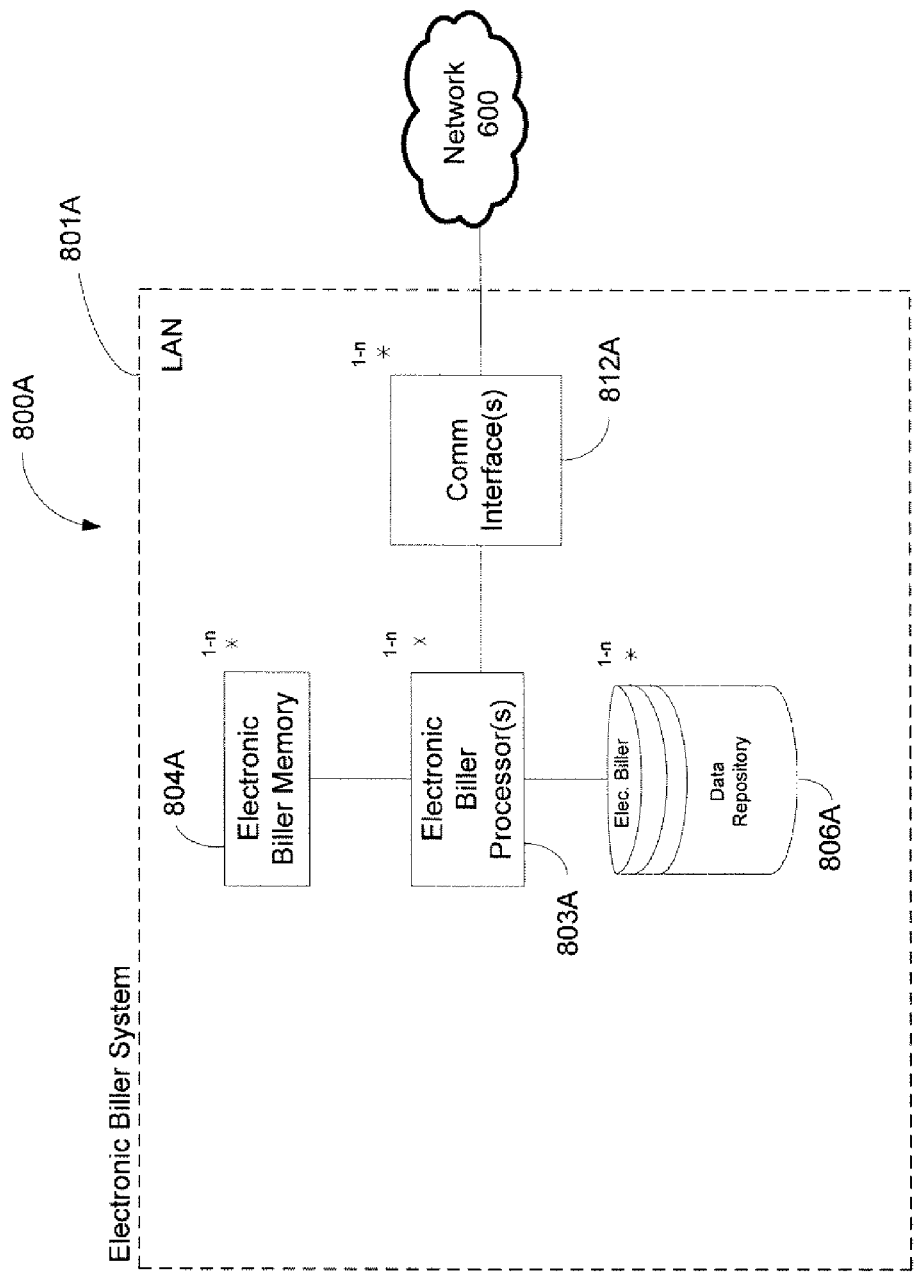
FIG. 8A is a simplified depiction of a computing system which can be associated with any electronic biller of FIG. 6 in accordance with the present invention.

FIG. 8A is a diagram of an exemplary system 800A representing an electronic biller 602A-N on the network 600. As shown, the hardware of system 800A is similar to that of the EBPSP system 700. System 800A includes an electronic biller LAN 801A, indicated with dashed lines, one or more electronic biller processors 803A, each of which may be associated with one or more electronic biller memories 804A configured to store software executable by electronic biller processor(s) 803A. The electronic biller processor(s) 803A communicate with one or more electronic biller data repositories 806A, as well as multiple electronic biller communications interfaces 812A for communicating with both subscribers and non-subscriber entities of FIG. 6.

Figure 8B:
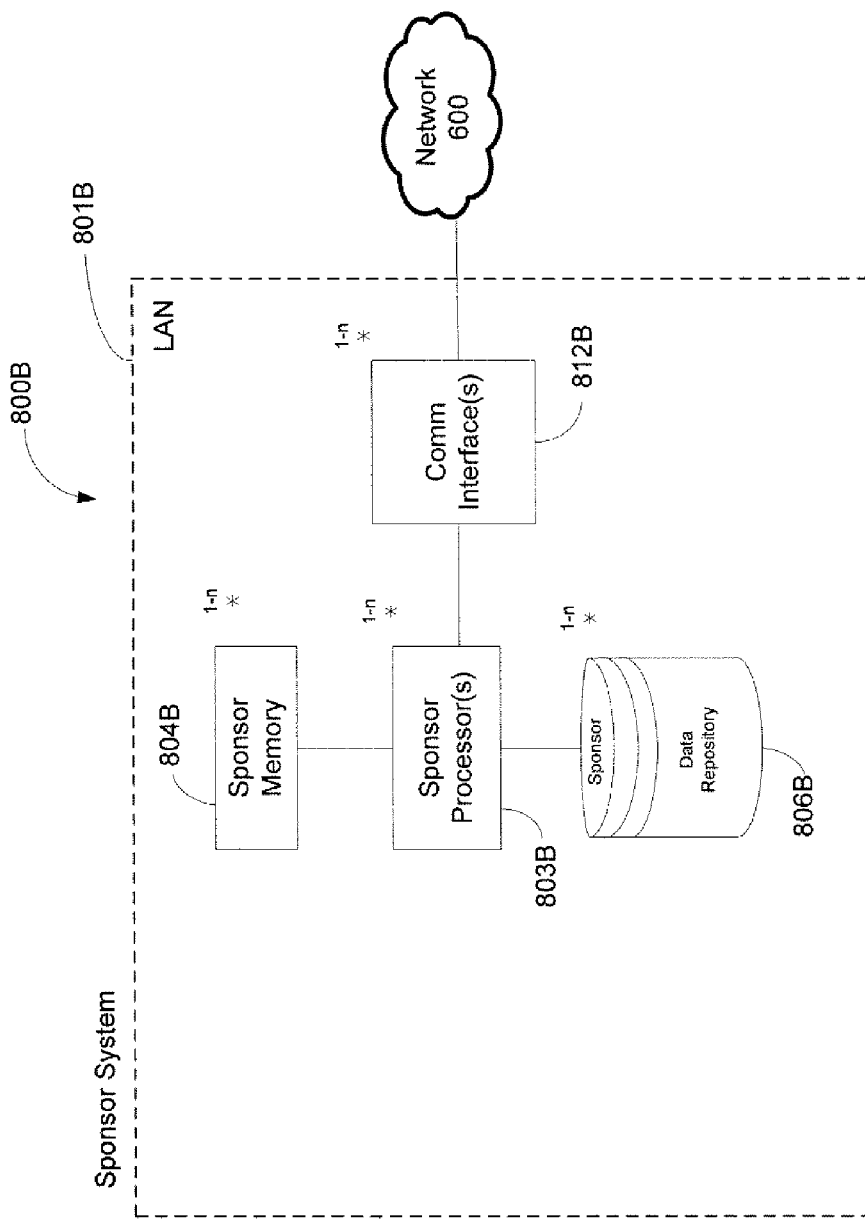
FIG. 8B is a simplified depiction of a computing system which can be associated with any sponsor of FIG. 6 in accordance with the present invention.

FIG. 8B is a diagram of an exemplary system 800B representing a sponsor 618A-N on the network 600. System 800B includes a sponsor LAN 801B, indicated with dashed lines, one or more sponsor processors 803B, each of which may be associated with one or more sponsor memories 804B configured to store software executable by sponsor processor(s) 803B. The sponsor processor(s) 803B communicate with one or more sponsor data repositories 806B and multiple sponsor communications interfaces 812B for communicating with both subscribers and non-subscriber entities of FIG. 6.

Figure 8C:
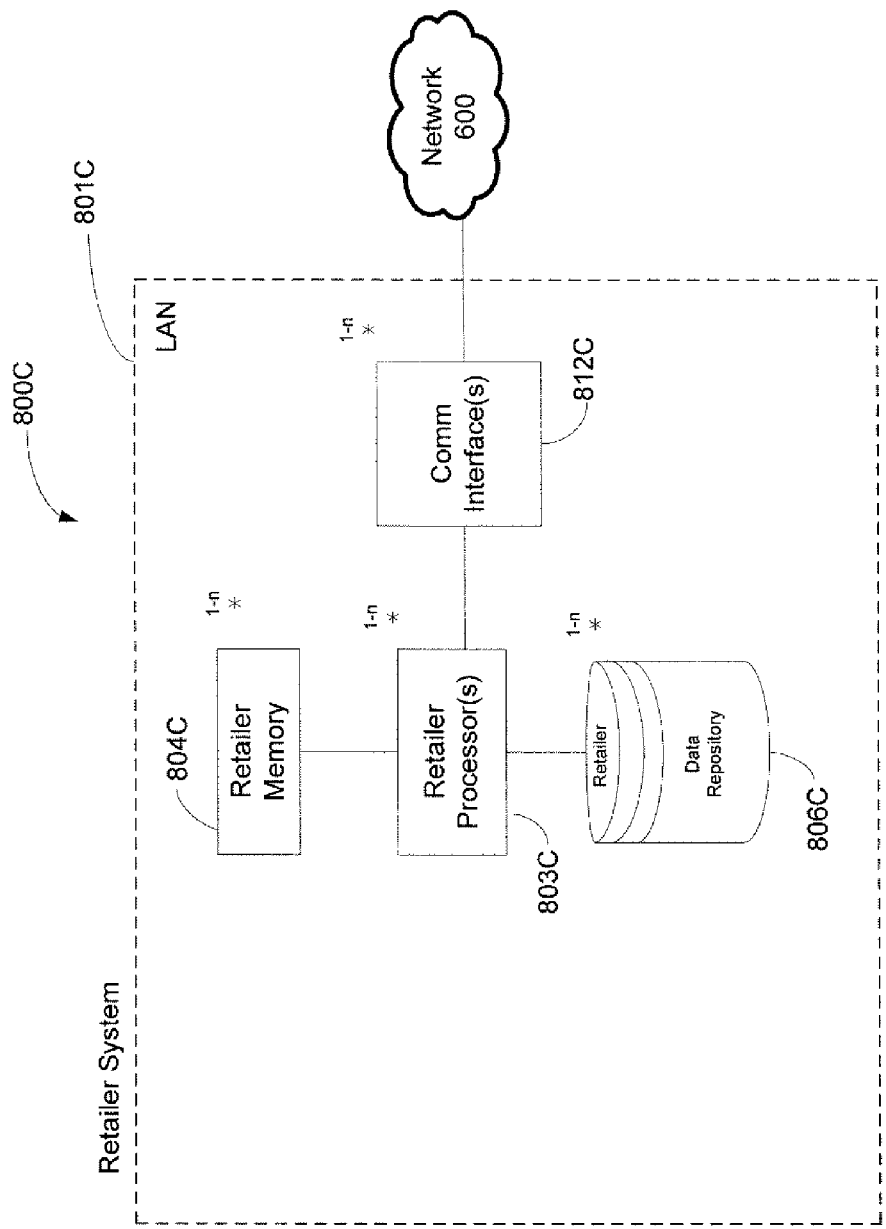
FIG. 8C is a simplified depiction of a computing system which can be associated with any retailer of FIG. 6 in accordance with the present invention.

FIG. 8C is a diagram of an exemplary system 800C representing a retailer 620A-N on the network 600. System 800C includes a retailer LAN 801C, indicated with dashed lines, one or more retailer processors 803C, each of which may be associated with one or more retailer memories 804C configured to store software executable by retailer processor(s) 803C. The retailer processor(s) 803C communicate with one or more retailer data repositories 806C and multiple retailer communications interfaces 812C for communicating with both subscribers and non-subscriber entities of FIG. 6.

Figure 8D:
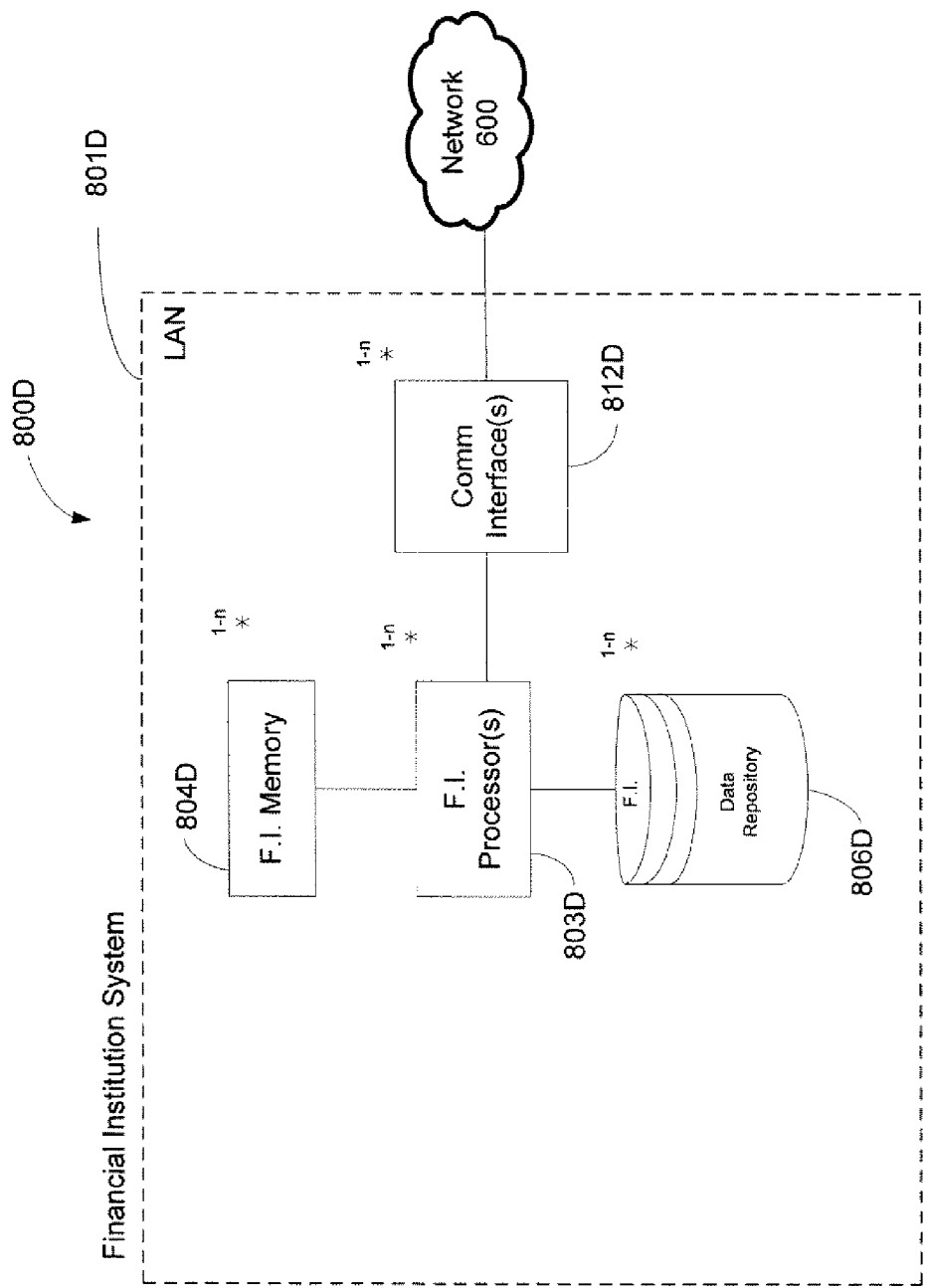
FIG. 8D is a simplified depiction of a computing system which can be associated with any financial institution (FI) of FIG. 6 in accordance with the present invention.

FIG. 8D is a diagram of an exemplary system 800D representing a financial institution 615A-N on the network 600. System 800D includes a financial institution LAN 801D, indicated with dashed lines, one or more financial institution processors 803D, each of which may be associated with one or more financial institution memories 804D configured to store software executable by financial institution processor(s) 803D. The financial institution processor(s) 803D communicate with one or more financial institution data repositories 806D and multiple financial institution communications interfaces 812D for communicating with both subscribers and non-subscriber entities of FIG. 6.

Figure 8E:
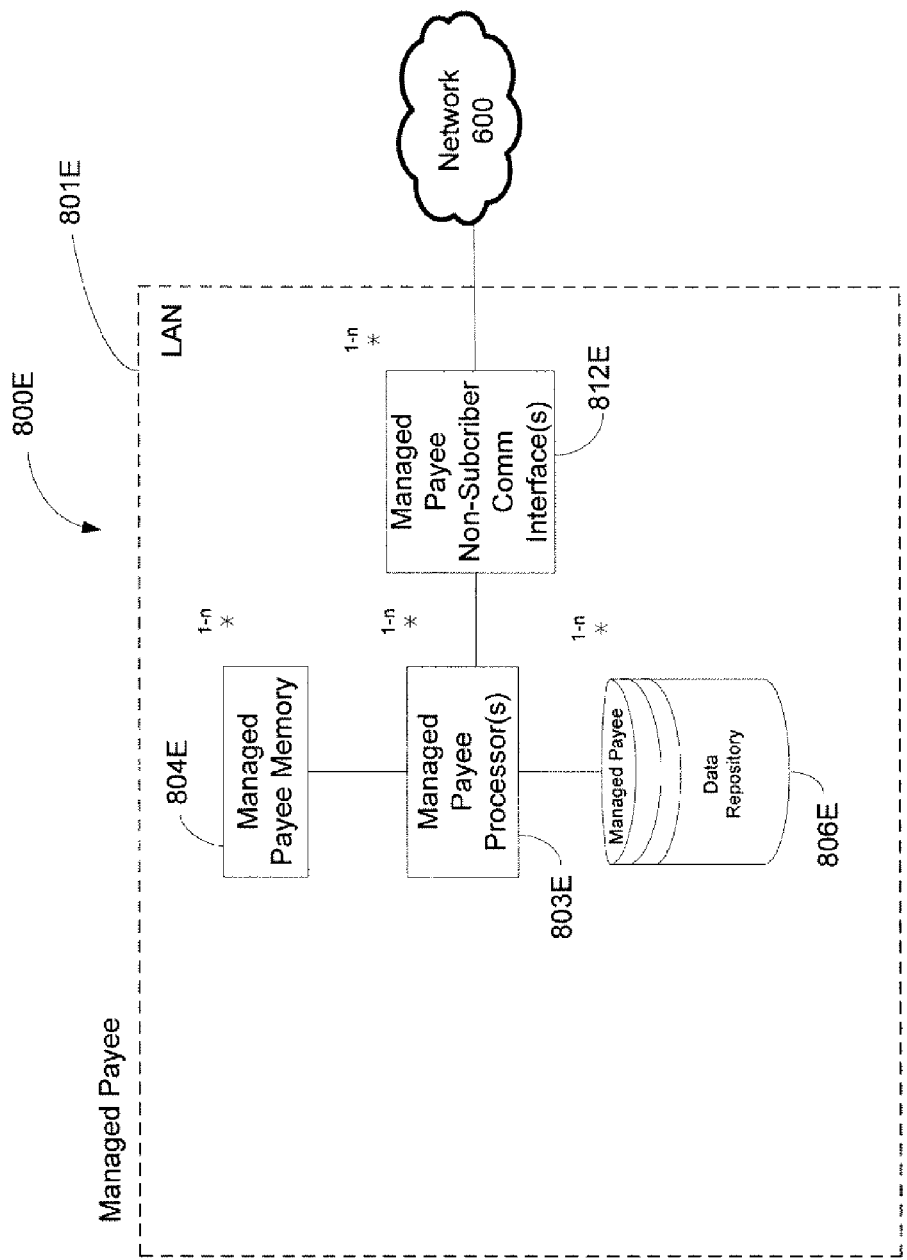
FIG. 8E is a simplified depiction of a computing system which can be associated with any managed payee of FIG. 6 in accordance with the present invention.

FIG. 8E is a diagram of an exemplary system 800E representing a managed payee 605A-N on the network 600. As shown, a LAN 801E, indicated with dashed lines, includes one or more managed payee processors 803E, each of which may be associated with one or more managed payee memories 804E configured to store software executable by managed payee processor(s) 803E. The managed payee processor(s) 803E are also associated with one or more managed payee data repositories 806E of persistently stored data. Also shown is one or more managed payee communications interfaces 812E for communicating with non-subscriber entities of FIG. 6. It will be noted that the managed payee system of FIG. 8E lacks a communications interface for interaction with a subscriber.

Figure 8F:
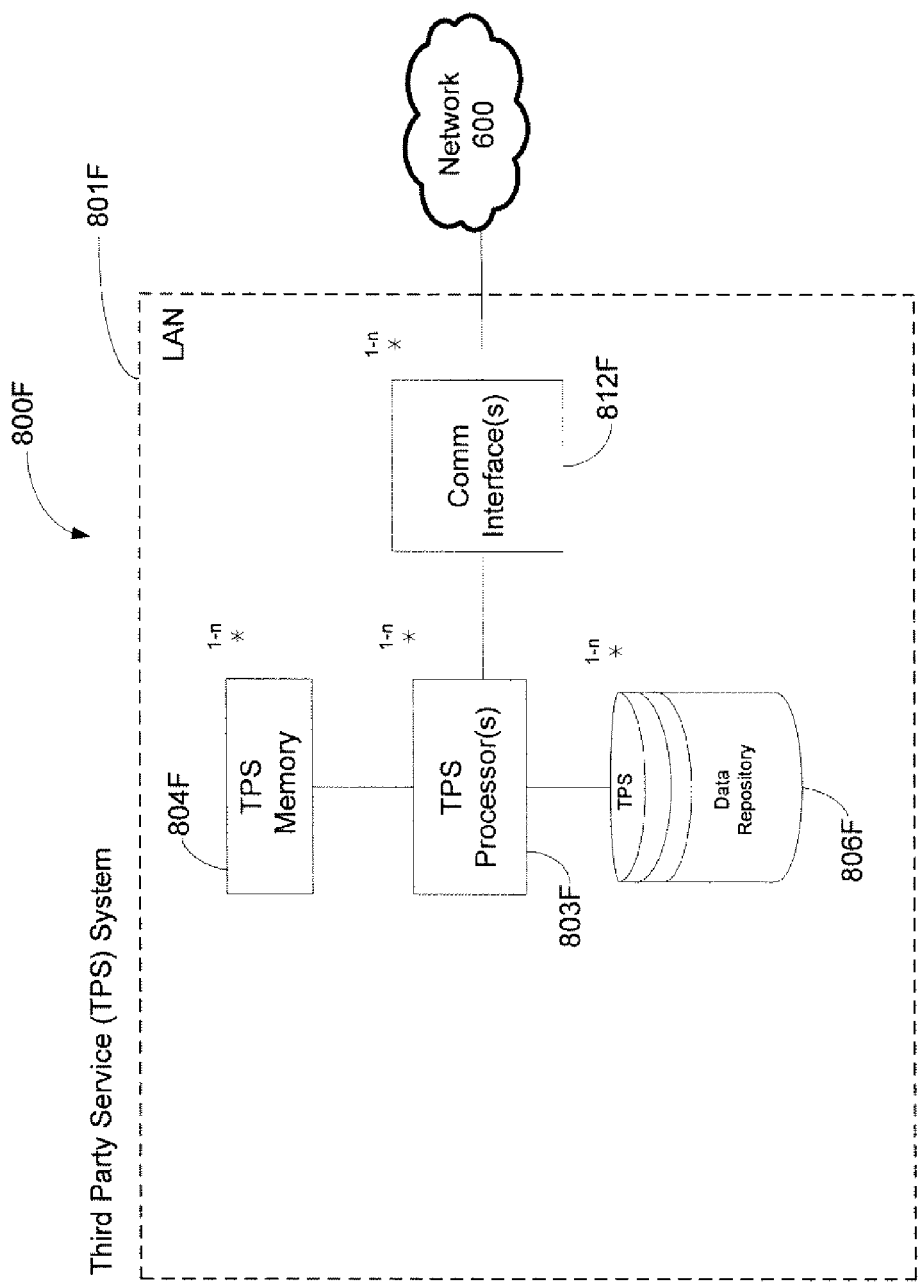
FIG. 8F is a simplified depiction of a computing system which can be associated with any third party service of FIG. 6 in accordance with the present invention.

FIG. 8F is a diagram of an exemplary system 800F representing a third party service 611A-N on the network 600. System 800F includes a third party service LAN 801F, indicated with dashed lines, one or more third party service processors 803F, each of which may be associated with one or more third party service memories 804F configured to store software executable by third party service processor(s) 803F. The third party service processor(s) 803F communicate with one or more third party service data repositories 806F and multiple third party service communications interfaces 812F for communicating with both subscribers and non-subscriber entities of FIG. 6.

Figure 9:
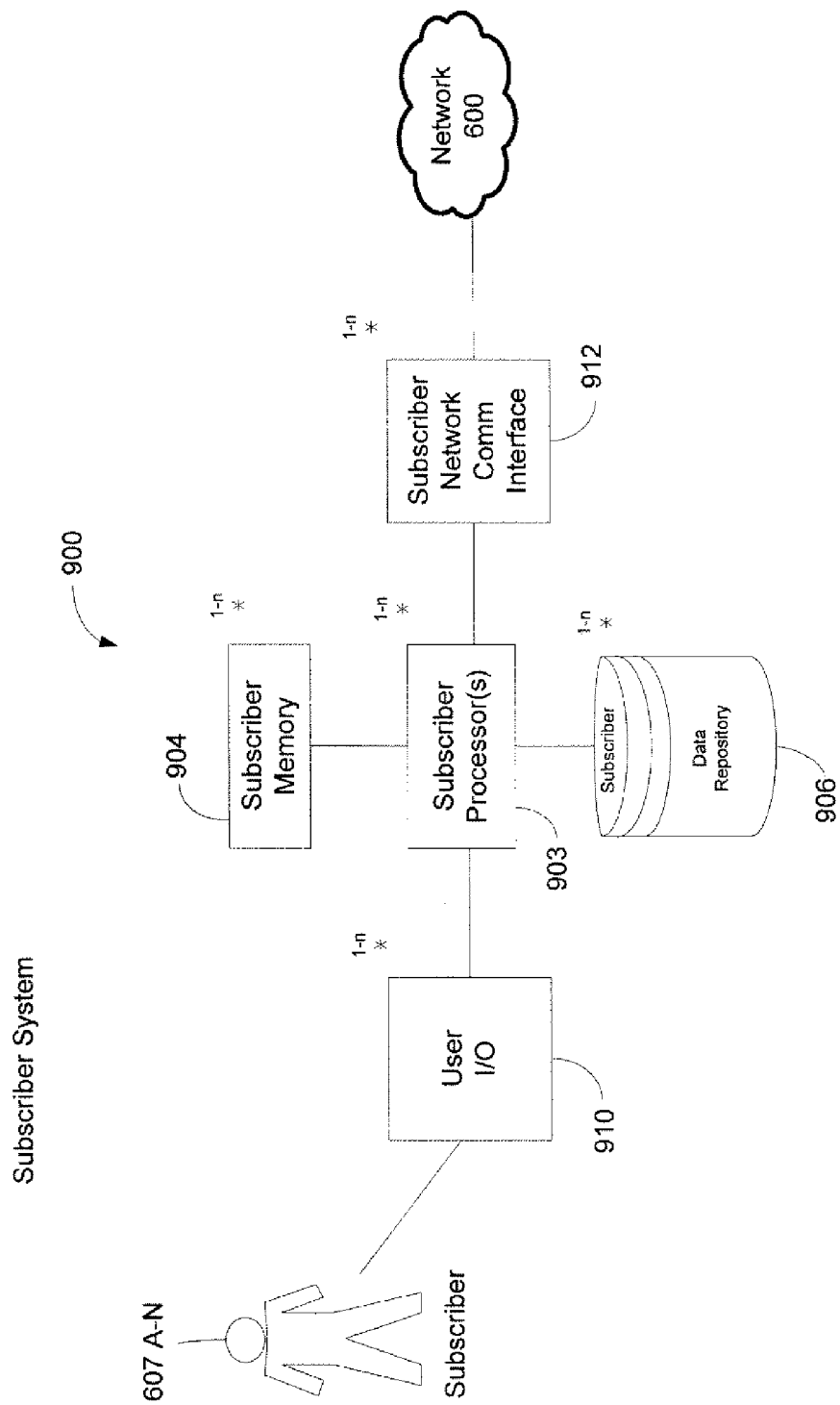
FIG. 9 is a simplified depiction of a computing system which can be associated with any subscriber of FIG. 6 in accordance with the present invention.

FIG. 9 is a diagram of an exemplary system 900 representing a subscriber 607A-N on the network 600. A subscriber 607A-N utilizes system 900 to access EBPSP 601 services via network 600. The subscriber system 900 includes one or more subscriber processors 903, each of which may be associated with one or more subscriber memories 904 configured to store software executable by subscriber processor(s) 903. The subscriber processor(s) 903 may be associated with one or more subscriber data repositories 906 of persistently stored data. It should be noted that a subscriber 607A-N could access EBP services via the network 600 using a simple network appliance rather than the subscriber computing system 900. In such case, a subscriber data repository 906, and perhaps other components would not be present. A subscriber network communications interface 912 is also included in subscriber system 900 for communications via network 600, and perhaps other networks. A subscriber 607A-N interacts with the subscriber processor(s) 903 through user input/output mechanisms (user I/O) 910. A user input/output mechanism can include a monitor, a keyboard, a mouse, a speaker, a microphone, and/or other types of input/output mechanisms.

Common Enrollment and Bill Retriever

Figure 10:
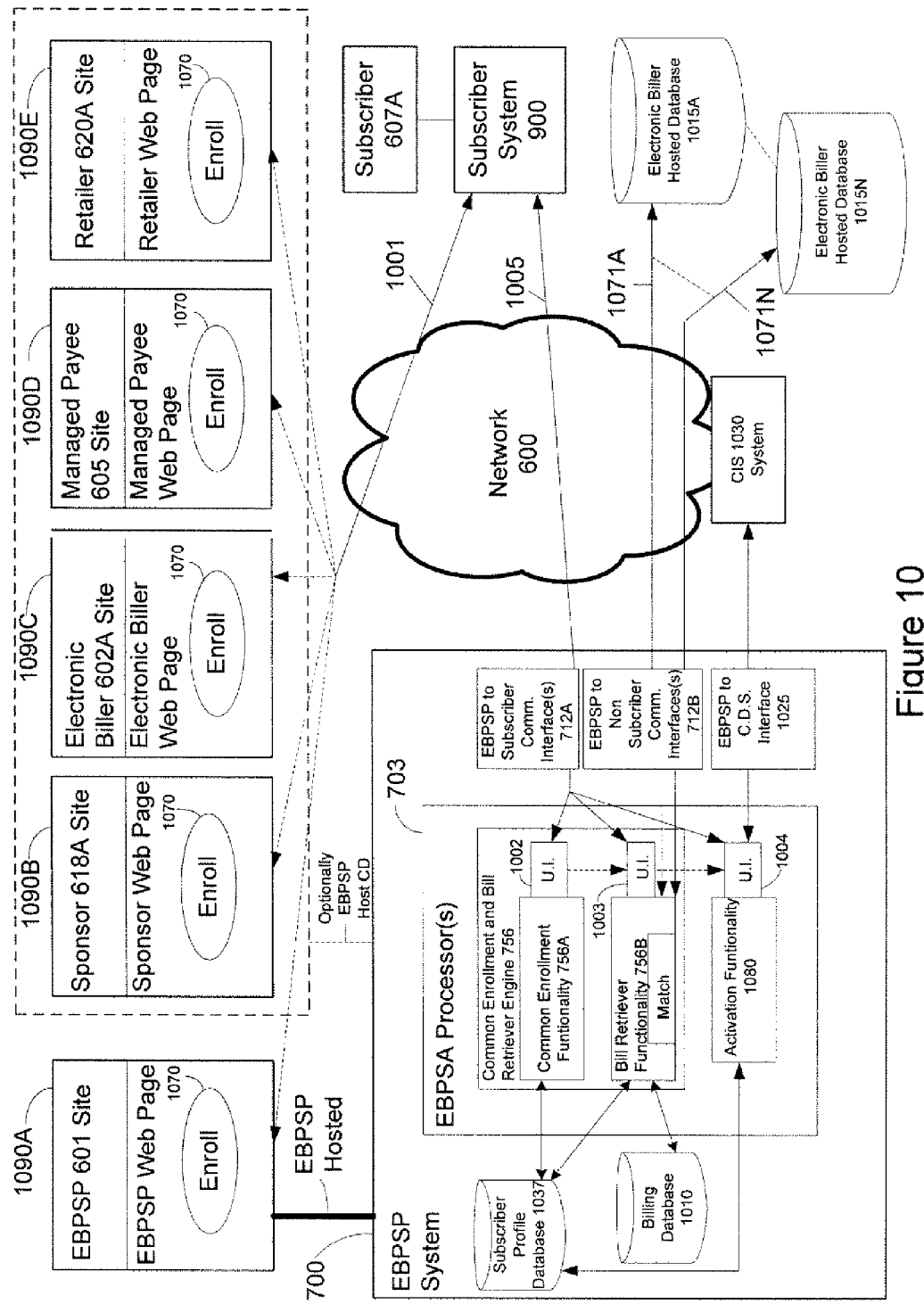
FIG. 10 is a depiction of functionality of the Common Enrollment and Bill Retriever engine of FIG. 7B in accordance with certain aspects of the present invention.

FIG. 10 depicts enrollment and activation for EBP services in accordance with one aspect of the present invention. A subscriber, shown in the example as subscriber 607A, represented on the network 600 by a subscriber system 900, accesses, via the network 600 at communication 1001, one of a Web site 1090A associated with the EBPSP 601, a Web site 1090B associated with a sponsor, in this example sponsor 618A, a Web site 1090C associated with an electronic biller, in this example electronic biller 602A, a Web site 1090E associated with a retailer, in this example retailer 620A, or a Web site 1090D associated with a managed payee, in this example managed payee 605A, to enroll in EBP services provided by the EBPSP 601. The EBP services may be electronic bill presentment, or electronic payment, or both. It should be noted that any of these Web sites could be hosted by the EBPSP 601 using system 700, or by some other entity. Thus, the subscriber 607A initially enrolls for one or more services of the EBPSP 601 via any one of multiple Web sites, each associated with a different participant in the network 600.

The EBPSP 601 Web site 1090A is hosted by the EBPSP system 700. If the subscriber 607A accesses the EBPSP 601 Web site 1090A to enroll, communication 1001 is made between communications interfaces 712A and 912 via the network 600. If the subscriber 607A accesses another one of the Web sites to enroll, i.e., Web sites 1090B-E, and that accessed Web site is hosted by the EBPSP system 700, communication 1001 is also made between communications interfaces 712A and 912 via the network 600. That is, an entity for which the EBPSP system 700 hosts a Web site is represented on the network 600 by the system 700.

If the subscriber 607A accesses one of Web sites 1090B-E to enroll, and that accessed Web site is not hosted by the EBPSP system 700, communication 1001 is made between subscriber communication interface(s) 912 and a communications interface not associated with the EBPSP system 700. Rather, communication 1001 is made between subscriber communication interface(s) 912 and a communications interface associated with a system hosting the accessed Web site. As an example, if the subscriber accesses Web site 1090C, and that Web site is hosted by the electronic biller 602A, electronic biller 602A is represented on the network 600 by electronic biller system 800A and communication 1001 is between communications interfaces 912 and 812A.

No matter which of Web sites 1090A-E the subscriber 607A accesses to enroll, a Web page is transmitted from the system hosting the accessed Web site to the subscriber system 900 via the network 600. The transmitted Web page is presented to the subscriber 607A via at least one user I/O 910 by system 900. The presented Web page includes an enrollment link 1070, e.g., a hyper-link. Enrollment link 1070 is available from each of Web sites 1090A-E. The subscriber 607A, utilizing an I/O 910, activates link 1070 to enroll in the EBP services of the EBPSP 601.

At this point, if the accessed Web site is not hosted by the EBPSP 601, control of an on-line enrollment session 1005 may be passed off and the subscriber system 900 may be linked via the network 600 to the EBPSP processor(s) 703 using communications interfaces 712A and 912. Thus, the enrolling subscriber 607A communicates directly with the EBPSP 601 to enroll. This hand-off to the EBPSP 601 is typically transparent to the subscriber 607A. Alternatively, as will be described further below, enrollment could, if desired, be performed by an entity other than the EBPSP 601. For example, the web page could be presented by Web sites 1090B-E, and the enrollment information is captured at the applicable Web site, and this information is communicated to the EBPSP 601 via synchronous or asynchronous communications.

After the hand-off, the Common Enrollment and Bill Retriever Engine 756 is invoked by the EBPSP processor(s) 703. It should be noted that Common Enrollment functionality within engine 756 could be, if desired, invoked separate from that of Bill Retriever functionality, and vice-versa. Also, the Common Enrollment and Bill Retriever Engine 756 could be two engines, a Common Enrollment Engine 756A and a Bill Retriever Engine 756B. Enrollment data received from the subscriber 607A is controlled and managed by EBPSP 601, no matter which Web site is initially accessed by the subscriber 607A to begin the enrollment.

To enroll, the subscriber 607A transmits enrollment data, including name, address, and other subscriber identifying information to the EBPSP 601. It should be noted that if the subscriber 607A is enrolling for the electronic payment service, the enrollment information includes data identifying one or more funding accounts the EBPSP 601 will utilize in making payments on behalf of the subscriber 607A. A funding account could be a demand deposit account or a credit account, in addition to perhaps another type of account. The transmission of the enrollment information is made between communications interfaces 712A and 912 of systems 700 and 900. This transmission is responsive to an enrollment user interface 1002 the Common Enrollment functionality 756A causes to be transmitted by communications interface(s) 712A of the EBPSP system 700 to communications interface(s) 912 of the subscriber system 900 via the network 600 in response to the subscriber 607A activating link 1070. At system 900 at least one user I/O 910 presents the enrollment user interface 1002 to the subscriber 607A.

After the EBPSP 601 receives the subscriber identifying enrollment information, the EBPSP processor(s) 703 store the received information in a subscriber profile database 1037, which is an EBPSP data repository 706. The subscriber profile database 1037 will be discussed further below. Along with storing the received information, Bill Retriever functionality 756B is invoked by the EBPSP processor(s) 703 to locate e-bills available for the enrolling subscriber 607A after the subscriber identifying information is received. The stored enrollment information, or a portion thereof, is processed by the Bill Retriever functionality 756B, in addition to perhaps other information associated with the subscriber 607A, to match the subscriber 607A with those of the electronic billers 602A-N having bills available for electronic presentment to the subscriber 607A. The processing to match the subscriber 607A with an electronic biller 602A-N will be discussed further below. Once again, it should be understood that, if desired, the Enrollment and Bill Retriever functionality could be decoupled, as has been previously discussed.

The Bill Retriever functionality 756B returns a listing of exactly matched and/or potentially matched ones of the electronic billers 602A-N to the enrolling subscriber 607A via a Bill Retriever user interface 1003 transmitted via the network 600 from communications interface(s) 712A of the EBSP system 700 to communications interface(s) 912 of the subscriber system 900. The transmitted Bill Retriever user interface 1003 is presented to the subscriber 607A by the subscriber system 900 via at least one user I/O 910.

The subscriber 607A, utilizing a user I/O 910, then selects one or more of the electronic billers presented by the Bill Retriever user interface 1003 for which that subscriber desires to activate electronic bill presentment. The subscriber selection(s) are transmitted from communications interface(s) 912 of the subscriber system 900 to communications interface(s) 712A of the EBPSP system 700 via the network 600. Upon receipt of the selection(s) the EBPSP processor(s) 703 invoke activation functionality 1080. The invoked activation functionality 1080 could, if desired, be a part of the Common Enrollment and Bill Retriever Engine 756, be a separate engine, or even be a part of another engine, such as the Incremental Enrollment and Activation Engine 763, to be further discussed below.

Activation functionality 1080 causes an activation user interface 1004 to be transmitted to communications interface(s) 912 of the subscriber system 900 by communications interface(s) 712A of the EBPSP system 700 via the network 600. The activation user interface 1004 is presented to the subscriber 607A by at least one user I/O 910 of the subscriber system 900. Responsive to the presented activation user interface 1004, the subscriber 607A transmits information necessary to activate electronic presentment of bills of the selected electronic biller(s). The transmission of the necessary activation information is made from communications interface(s) 912 of the subscriber system 900 to communications interface(s) 712A of the EBPSP system 700 via the network 600. Thereafter, the EBPSP processor(s) 703 complete activation of the selected electronic biller(s).

FIG. 10 depicts a billing database 1010 that stores information received from various ones of the electronic billers 602A-N. This stored information includes preloaded bills of various ones of the electronic billers 602A-N as well as information identifying customers of other ones of the electronic billers 602A-N, but not preloaded bills for those customers. Billing database 1010 is a data repository 706. The preloaded bills and the customer identifying information are ready to be matched by the Bill Retriever functionality 756B to subscriber identifying information. Also shown in FIG. 10 are databases 1015A through 1015N that are maintained by various ones of the electronic billers 602A-N. Any of databases 1015A through 1015N contains any of the same types of information stored in billing database 1010. It should be noted that one or more of databases 1010 and 1015A-N could also store partial bill data in addition to complete bills. This partial bill data could be any subset of information included in a complete bill. Also shown are real time connections 1071A through 1071N between the EBPSP system 700 and databases 1015A through 1020N. Each of databases 1015A-N is a part of an electronic biller system 800A associated with an electronic biller maintaining a respective database 1015A-1015N.

Databases 1010 and 1015A-N are utilized by the Bill Retriever functionality 756B in matching the subscriber 607A with electronic billers 602A-N. The Bill Retriever functionality 756B transforms the subscriber identifying information into information that identifies one or more electronic billers of the subscriber 607A. It should be stressed that the received enrollment information does not identify any biller, electronic or not, of the subscriber 607A. In transforming the subscriber identity information the Bill Retriever functionality 756B compares the stored enrollment information in subscriber profile database 1037 with information stored in databases 1010 and 1015A-N to identify like information. The Bill Retriever functionality 756B determines if any enrollment information, such as, for example, the name, address, telephone number, and/or social security number of subscriber 607A, is included in any of databases 1010 and 1015A-N. As will be discussed further below, other information associated with the subscriber 607A could be utilized by the Bill Retriever functionality 756B in matching the subscriber 607A with one or more of the electronic billers 602A-N.

Information that is the same as the subscriber enrollment information, in addition to other information associated with the subscriber 607A, could reside in any of databases 1010 and 1015A-N. If a match between subscriber enrollment information and information contained in database 1010 and/or databases 1015A-1015N is made, the electronic biller with which the matched information in database 1010 or 1015A-N is associated is designated by the Bill Retriever functionality 756B as at least a candidate electronic biller of the subscriber 607A, if not an exact electronic biller of the subscriber 607A. Different classes of matched electronic billers will be discussed further below.

If the Bill Retriever functionality 756B utilizes any of databases 1015A-N to match subscriber information, this utilization could, if desired, include a direct accessing of a database 1015A-N associated with an electronic biller system 800A by the EBPSP system 700 over the network 600. In such a case, the direct accessing includes communications between communications interfaces 712B and 812A. Also, the utilization could, if desired, include the EBPSP system 700 transmitting a request via the network 600 for the electronic biller system 800A hosting the utilized database to determine if any subscriber information is included in the utilized database. In such a case, the transmitted request, between communications interfaces 712B and 812A, includes information identifying the subscriber 607A. The electronic biller system 800A then determines if the subscriber information is included in a database associated with the subscriber system 800A and returns a response to the EBPSP system 700 via the network 600 between communications interfaces 812A and 712B. Alternatively, the electronic biller could send confirmation information of the availability of electronic billing or directly to the subscriber 607A. The Privacy Engine 765, to be discussed in detail further below, could, if desired, be utilized by the EBPSP processor(s) 703 in transmitting subscriber information to an electronic biller.

In addition to matching enrollment information of the subscriber 607A, the EBPSP processor(s) 703 could, if desired, obtain additional information via the network 600 identifying the subscriber 607A from the third party services 611A-N, common services 609A-N, or even the subscriber 607A. This additional information could, if desired, be obtained prior to attempting to match the subscriber with any electronic biller 602A-N, subsequent to not finding a match to any electronic biller 602A-N, and/or responsive to partially matching the subscriber 607A to an electronic biller. Also, the additional information could, as necessary, be obtained by the EBPSP processor(s) 703 when an electronic biller 602A-N is the entity determining if subscriber identifying information is included in a database 1015A-N, and that electronic biller requests additional subscriber identifying information upon which to make the determination.

The EBPSP processor(s) 703 could, if desired, utilize the Easy Payee Engine 764, to be discussed in detail further below, to select those of the electronic billers 602A-N with which the Bill Retriever functionality 756B will attempt to match the subscriber information.

Three different classes of electronic billers are potentially returned by the Bill Retriever functionality 756B. First are those electronic billers that have an exact match to the enrolling subscriber 607A. These are electronic billers that have a 100% certainty of being the subscriber's billers. The Bill Retriever functionality 756B has exactly matched information identifying the subscriber 607A with information identifying a customer of an electronic biller 602A-N, i.e., the subscriber and the customer are the same entity. Second are those of the electronic billers 602A-N which have a high probability of being matched to the enrolling subscriber 607A, but an exact match is not made. Third are remaining ones of electronic billers 602A-N, i.e., a listing of all, or at least some of, non-matched electronic billers 602A-N with which the EBPSP 601 has a relationship.

As discussed above, the enrolling subscriber 607A chooses from among the available electronic billers 602A-N, which are preferably presented in order of exact, probable, and other, those he or she would like to activate. Alternatively, electronic bill presentment of bills of one or more of any exactly matched electronic billers could automatically be activated without notifying the subscriber 607A. This automatic activation option is available to the EBPSP processor(s) 703 when all information necessary to activate electronic presentment of an electronic biller's bills is available to the EBPSP 601. This information, as will be discussed further below, could have been obtained by the EBPSP 601 in activating electronic presentment of bills of another electronic biller, or could have been obtained from a third party service 611A-N, such as a credit bureau.

Also shown in FIG. 10 is a consumer database service interface 1025, which is a communications interface 712B. This facilitates interaction with a consumer identity service (CIS) 1030, which is a third party service 611A-N. A consumer identity service 1030 is utilized by the EBPSP 601 to verify subscriber identifying information provided by the subscriber 607A during enrollment, as well as for other purposes. Preferably, a consumer identity service 1030 is accessed in real-time during enrollment processing, though it could be accessed in an asynchronous manner. The Matching Engine 759 and the Privacy Engine 765, each to be discussed further below, also, as desired, utilize the services of a consumer identity service 1030.

As will be understood from the discussion above, the Common Enrollment and Bill Retriever Engine 756 provides functionality such that enrollment can be initiated at any of a EBPSP 601 Web site, any managed payee Web site, any sponsor Web site, any retailer Web site, or any electronic biller Web site. However, the functionality to achieve enrollment is performed by the EBPSP processor(s) 703 utilizing the Common Enrollment functionality 756A. Once the EBPSP 601 receives enrollment information from the subscriber 607A, which does not identify any biller of the subscriber 607A, that information is stored by processor(s) 703 in a data repository 706, preferably in subscriber profile database 1037. The Bill Retriever functionality 756B returns multiple available electronic billers to the subscriber 607A via the Bill Retriever user interface 1003 based at least in part upon the stored enrollment information. The subscriber 607A then chooses bills to activate for electronic presentment. Alternatively, activation of electronic bill presentment of exact matches can be performed by the EBPSP processor(s) 702 without requiring the subscriber 607A to select an exactly matched biller for activation, or even without notifying the subscriber 607A of the exact match.

Bill Retriever functionality could be, if desired, invoked by the EBPSP processor(s) 703 at times other than during a real-time enrollment session with any subscriber. The EBPSP 601 can invoke the Bill Retriever functionality 756B on behalf of any enrolled subscriber 607A-N, for example, when a new electronic biller joins the network 600, or on a periodic basis. Further, the Bill Retriever functionality 756B can be triggered in an asynchronous fashion. For example, when a new electronic biller joins the network 600 the Bill Retriever functionality 756B could be run in a batch fashion to determine if that new electronic biller is an electronic biller of any of the subscribers 607A-N.

For any resulting matches with any of subscribers 607A-N, those matched subscribers could, if desired, be informed by the EBPSP 601 that there is a new electronic biller having bills available for electronic presentment. The Messaging Engine 762, to be discussed further below, could be utilized to inform subscribers 607A-N of the availability of electronic bills from new electronic billers. One goal of the functionality provided by Messaging Engine 762 is to proactively send e-mails to those of subscribers 607A-N that have been matched, which could be a matching by the Common Enrollment and Bill Retriever Engine 756, or other engines to be discussed further below.

Figure 11:
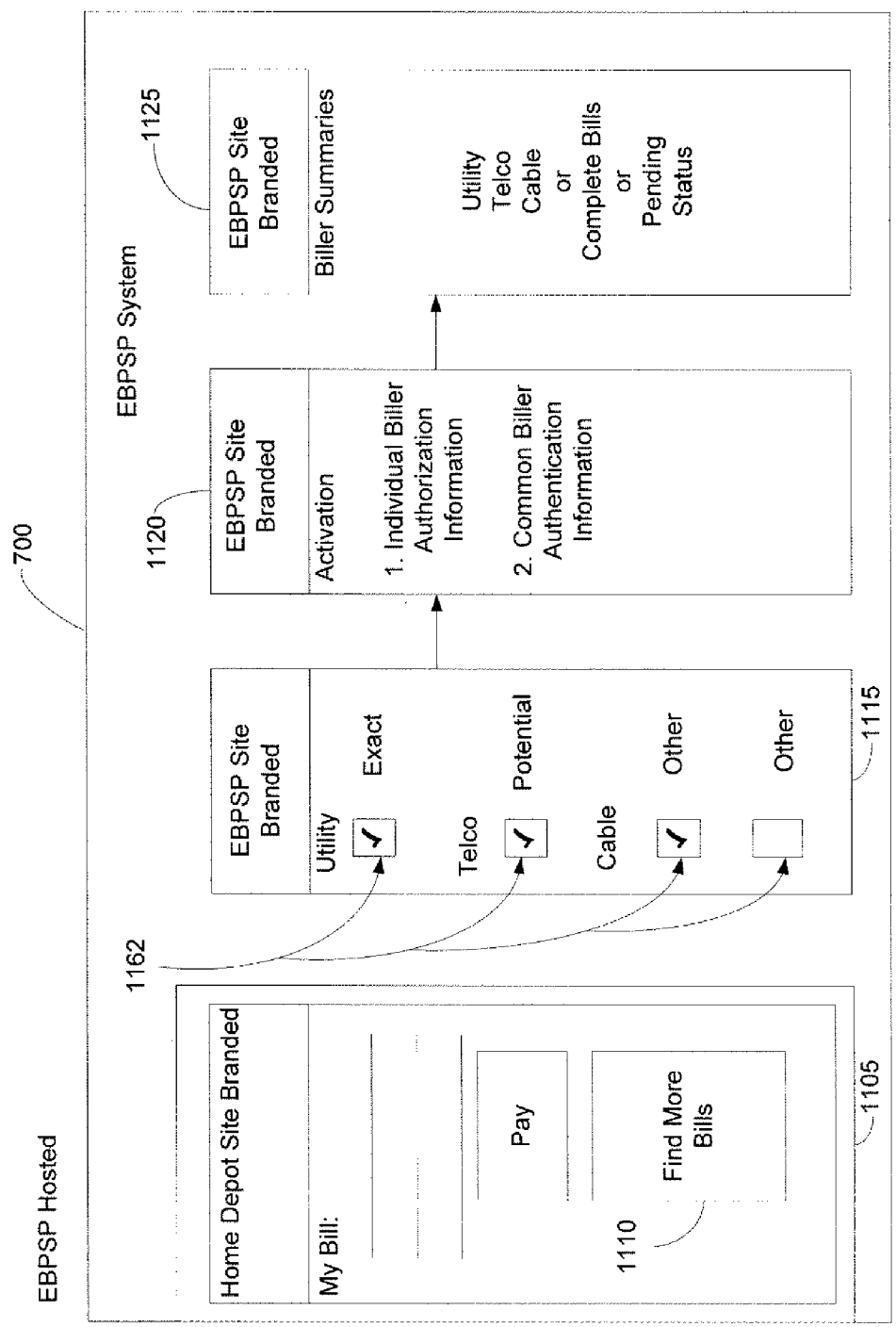
FIG. 11 is a further depiction of functionality of the Common Enrollment and Bill Retriever engine of FIG. 7B when Bill Retriever is invoked by a subscriber from an electronic biller branded Web site.

The Bill Retriever functionality 756B can also be trigged by an enrolled subscriber 607A-N while accessing a Web site associated with any one of a sponsor 618A-N, electronic biller 602A-N, managed payee 605A-N, retailer 620A-N, and/or EBPSP 601. Referring now to FIG. 11, shown is a Biller Direct Web site 1105 that is hosted by the EBPSP system 700. A Biller Direct Web site, in accordance with this aspect of the present invention, is a Web site hosted by the EBPSP 601 but branded as being hosted by an electronic biller. As will be understood from the discussion above, the electronic biller with which Web site 1105 is associated is represented on the network 600 by the EBPSP system 700. As such, Web page 1105 is transmitted by communications interface(s) 712A of the EBPSP system 700 to communications interface(s) 912 of a subscriber system 900.

In the example of FIG. 11 Web site 1105 is associated with The Home Depot. An enrolled subscriber, subscriber 607B in this example, at some point has enrolled for the EBP service of electronic presentment of The Home Depot bills through a Home Depot branded Web page hosted by the EBPSP system 700. Enrollment/activation data is captured by the EBPSP 601 and stored in a data repository 706, preferably subscriber profile database 1037, as described above. After this enrollment/activation, the subscriber 607B is electronically presented a bill of The Home Depot for the subscriber 607B. Included in the electronic bill presented via The Home Depot branded Web site 1105 is a link 1110 to activate the Bill Retriever functionality 756B. Once the link 1110 is activated by the subscriber 607B, a request is then transmitted by communications interface(s) 912 of a subscriber system 900 to communication(s) interfaces 712A of EBPSP system 700 for electronic billers of the subscriber 607B to be identified.

Upon receipt of the request, the EBPSP processor(s) 703 retrieves enrollment data provided by the subscriber 607B during the previous enrollment/activation for EBP services through The Home Depot branded Web site 1105. The retrieved enrollment information is then utilized by the Bill Retriever functionality 756B to identify those of electronic billers 602A-N having electronic bills available for the subscriber 607B, as described above. An available bills Web page 115, which is a part of an EBPSP branded Web site hosted by the EBPSP 601, is then transmitted by communications interface(s) 712A of EBPSP system 700 to communications interface(s) 912 of subscriber system 900 via the network 600. The available bills Web page 1115 is presented to the subscriber 607B by at least one user I/O 910. Presented to the subscriber 607B are the three categories of electronic billers: exact matches, potential matches, and other, sorted by industry. Web page 1115 includes check boxes 1162 to activate electronic billing. The subscriber 607B selects at least one check box utilizing a user I/O 910 to begin activation of electronic bill presentment of one or more electronic billers shown in Web page 1115. The user selection(s) are transmitted by communications interface(s) 912 of subscriber system 900 to communications interface(s) 712A of EBPSP system 700 via network 600. Responsive to the received subscriber selection(s), activation functionality 1080 causes an activation user interface 1120 to be presented to the subscriber 607B, as described above. The activation user interface 1120 is branded as belonging to the EBPSP 601.

As will be described in detail further below, stored data necessary for activation of the selected electronic biller(s) is retrieved from a data repository 706, which could, if desired, be subscriber profile database 1037, by the EBPSP processor(s) 703 and included in the activation user interface 1120 presented to the subscriber 607B. This retrieved data could be data obtained during activation of electronic presentment of another of electronic billers 602A-N bills. Any other information necessary for activation of electronic bill presentment of bills of the selected electronic biller(s) not stored in a data repository 706 is determined by the EBPSP processor(s) 703 and requested from the subscriber 607B in the activation user interface 1120. It should be noted that each of electronic billers 602A-N supplies to the EBPSP 601 the required criteria for activation of electronic presentment of bills of each respective electronic biller 602A-N. The subscriber 607B then transmits the requested activation information to the EBPSP processor(s) 703 via the network 600. Thereafter, the retrieved information, and any requested information supplied by the subscriber 607B, is then used to activate the new electronic bill(s). After activation, billing information, in the form of Web page 1125, is transmitted from communications interface(s) 712A of the EBPSP system 700 to communications interface(s) 912 of subscriber system 900 via the network 600. At least one user I/O 910 of subscriber system 900 presents Web page 1125 to the subscriber. The billing information included in Web page 1125 can be bill summary information, can be a complete bill, or can be an indication of a pending status if billing information is not immediately available for the subscriber 607B.

Whenever the Bill Retriever functionality 756B is invoked to match an already enrolled subscriber 607A-N with one or more of the electronic billers 602A-N having bills for the already enrolled subscriber available for electronic presentment, the Bill Retriever functionality 756B could, if desired, also utilize information associated with electronic commerce services previously provided to that enrolled subscriber by the EBPSP 601. The use of information associated with providing electronic commerce services to a subscriber 607A-N in matching that subscriber with electronic billers will be discussed further below in relation to the Auto Activation Engine 761.

Incremental Enrollment and Activation

Figure 24:
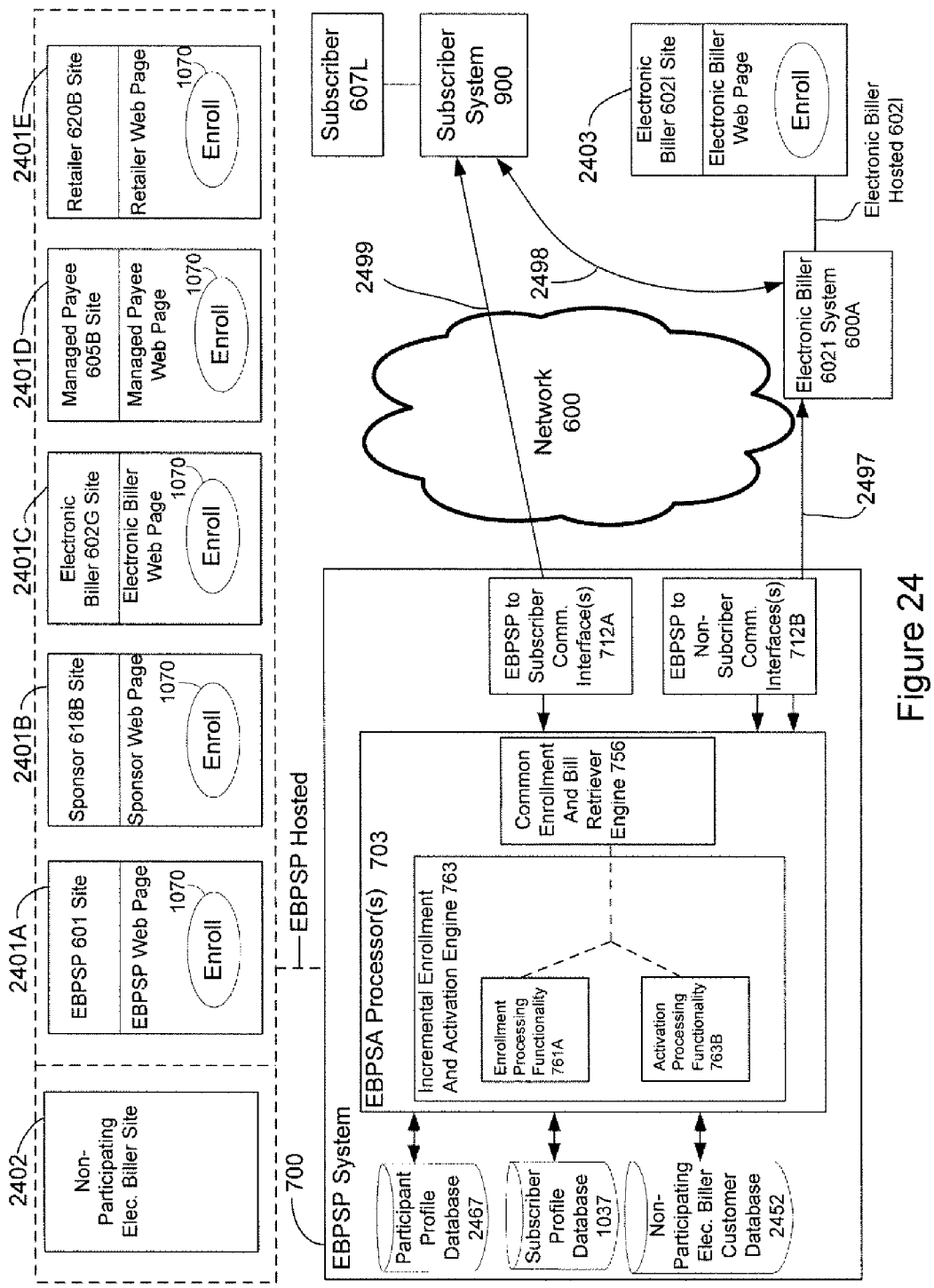
FIG. 24 is an simplified depiction of functionality of the Incremental Enrollment engine of FIG. 7B in accordance with certain aspects of the present invention.

FIG. 24 is a depiction of subscriber enrollment with the EBPSP 601 and/or activation of electronic bill presentment in accordance with an aspect of the present invention which overcomes the need for a subscriber 607A-N to have to provide full enrollment and/or activation data to the EBPSP 601 multiple times. Further, this aspect of the present invention allows a subscriber 607A-N to provide only the minimum amount of subscriber identifying information necessary for enrollment and/or activation, dependent upon the EBP service desired by that subscriber. This functionality is driven by the Incremental Enrollment and Activation Engine 763, which preferably works in conjunction with the Common Enrollment and Bill Retriever Engine 756, and can also, as desired, function with other engines described herein, such as the Biller Discovery and Activation Engine 758, to be discussed further below. Shown in FIG. 24 are a Web site 2401A associated with the EBPSP 601, a Web site 2401B associated with a sponsor, in this example sponsor 618B, a Web site 2401C associated with an electronic biller, in this example electronic biller 602G, a Web site 2401D associated with a managed payee, in this example managed payee 605B, and a Web site 2401E associated with a retailer, in this example retailer 620B. Each of Web sites 2401A-E are hosted by the EBPSP system 700. Also shown in FIG. 24 is a Web site 2402 associated with an electronic biller that does not participate in the network 600. The EBPSP system 700 also hosts web site 2402. FIG. 24 also depicts a Web site 2403 associated with electronic biller 602I. Web site 2403 is hosted by an electronic biller system 800A associated with electronic biller 602I. Thus electronic biller system 800A represents electronic biller 602I on the network 600. It will be appreciated that the functionality of the Incremental Enrollment Engine 763 can also be utilized with user interfaces other than Web sites, such as telephone-based interfaces.

As will be understood from the discussion above and FIG. 10, an enrolling subscriber, in this example subscriber 607L, can access any one of sites 2401A-E to enroll for the EBP services of the EBPSP 601. That is, each of Web sites 2401A-E includes a Web page having an enrollment link 1070, discussed above. Also as discussed above, communications between subscriber 607L and the EBPSP 601 are made via network 600, shown at 2499. It should be noted that the enrollment link associated with the retailer 620B Web site 2401E is shown as a "U-Pay" enrollment link 1070. Universal payment, or U-Pay, will be discussed further below.

As described above, all enrollment data received from the enrolling subscriber 607L is stored by the EBPSP 601 in the subscriber profile database 1037. The functionality of the Incremental Enrollment and Activation Engine 763 enables the stored profile data, irrespective of at which of Web sites 2401A-E enrollment is initiated, to be shared in activating electronic billing of bills of various ones of the electronic billers 602A-N as well as in enrolling the subscriber 607L for various services of the EBPSP 601.

When the initial enrollment request is received from the subscriber 607H, the Common Enrollment and Bill Retriever Engine 756 passes the request to the Incremental Enrollment and Activation Engine 763. Enrollment processing functionality 763A of engine 763 determines the EBP service and/or services for which the subscriber 607L is requesting to enroll. This determination can be made in multiple alternative ways. In a first alternative, the determination is made based upon the Web Site at which the subscriber 607L activates the enroll link 1070. For example, if the initiating Web site is associated with managed payee 605B, the enrollment processing functionality 763A determines that the subscriber 607L is enrolling for the electronic payment service. Also for example, if the initiating Web site is associated with an electronic biller 602A-N, and that electronic biller is an entity for which the EBPSP only presents electronic bills, but does not process electronic payments, the enrollment processing functionality 763A determines that the subscriber is enrolling for the electronic bill presentment service. An escort ID, to be discussed further below, preferably supports this functionality.

In a second alternative, the enrollment processing functionality 763A causes communications interface(s) 712A to transmit a request for the subscriber 607L to identify the service or services the subscriber 607L is seeking. Responsive to this request, the subscriber 607L transmits, via the network 600, information identifying the service or services sought.

Once the enrollment processing functionality 763A determines the service(s) for which the subscriber is enrolling, enrollment processing functionality 763A causes the Common Enrollment and Bill Retriever Engine 756 to include in the enrollment user interface 1002, discussed above, a request for enrollment information in accordance with the determined service(s). Thus, if the subscriber 607L is enrolling for only the electronic billing service, the requested information will be only basic subscriber identifying information, such as, for example, name, address, and telephone number. However, if the requested service(s) include the electronic payment service, further enrollment information is requested. This further enrollment information is information identifying a funding account, introduced above, in addition to, if desired, further subscriber identifying information such as social security number and other information utilized in further identity verification and/or risk processing, also introduced above. Thus, the gathering of enrollment data by the EBPSP 601 is streamlined. The number of fields of information that an enrolling subscriber must enter in the enrollment user interface 1002 is reduced to the minimal set of information required for a desired EBP service(s). Subscriber funding account information, such as deposit account information (RTN/DDA) or credit card account information, is not required by the EBPSP 601 for enrollment in electronic billing. As will be discussed further below, funding account information is not gathered by the EBPSP 601 until and unless the a subscriber 607A-N requests access to the electronic payment service. Discussed above, received subscriber enrollment information is stored in the subscriber profile database 1037.

The enrollment processing functionality 763A, during enrollment, also issues the subscriber 607L a user name/password combination. The subscriber 607L uses this same user name and password at any Web site or other user interface of any participant in the network 600, even one they have never visited before. Additionally, the enrollment processing functionality 763A causes information identifying from which Web site enrollment is initiated to be stored in the subscriber profile database 1037. This information could be, if desired, an escort ID, to be discussed further below.

Once the subscriber 607L is enrolled, electronic bill presentment of bills of one or more of electronic billers 602A-N can be activated. Also, if desired, upon enrollment the bill retriever functionality 756B can be invoked. As discussed above, different electronic billers require various pieces of information to activate electronic bill presentment. The subscriber 607L, perhaps during the enrollment session, or perhaps during a later session, chooses to activate electronic presentment of bills of a first electronic biller. That is, subscriber 607L has yet to activate electronic presentment of bill of any of electronic billers 602A-N.

Activation processing functionality 763B of the Incremental Enrollment and Activation Engine 763 determines the information necessary to activate electronic bill presentment of bills of this first electronic biller. As discussed above, each electronic biller 602A-N specifies to the EBPSP 601 subscriber information necessary for activation of electronic billing for each respective electronic biller. The activation processing functionality 763B accesses the subscriber profile database 1037 and determines if any of the information required to activate electronic presentment of bills of this first electronic biller is stored in the subscriber profile database 1037. That is, some of the stored enrollment information could be the same as the required activation information.

The activation processing functionality 763B causes the Common Enrollment and Bill Retriever Engine 756 to include in the activation user interface 1004, discussed above, a request for only that required activation information not included in the subscriber profile database 1037. The activation user interface 1004 is transmitted to the Subscriber system 900, and the requested activation information is received by the EBPSP system 700 as described above. Once the requested activation information is received from the subscriber 607L this received information is stored in the subscriber profiler database 1037 along with the other information associated with the subscriber 607L, as discussed above in relation to the subscriber 607A activating electronic bill presentment. Electronic presentment of bills of this first electronic biller is then activated based upon the received activation information and information necessary for activation of electronic presentment of bills of this first electronic biller already stored in the subscriber profile database 1037, if any.

Whenever the subscriber 607L requests to activate electronic presentment of bills of another of electronic billers 602A-N, the activation processing functionality 763B once again determines the activation information necessary to activate electronic bills of this other electronic biller, determines if any of this information is stored in subscriber profile database 1037, and only requests the subscriber 607L to supply that necessary information that is not stored in the subscriber profile database 1037. Any activation information requested from the subscriber 607L is then stored in the subscriber profile database 1037 for use in activating electronic presentment of bills of other ones of electronic billers 602A-N, as well as perhaps in enrolling for other services of the EBPSP 601.

What results from the processing of the Incremental Enrollment and Activation Engine 763 is a series of stages to continuously update a subscriber's profile. It is a build-out of profile information so that a subscriber does not have to enter information necessary for enrollment and activation of electronic billing as well as information necessary for electronic payment at one time. For example, if a subscriber 607A-N activates a first electronic biller, that subscriber provides social security number and mother's maiden name as part of the first electronic biller's requirements for activation. That information is added to the subscriber profile database 1037 so that subscriber does not need to provide that same information again when activating another electronic biller that requires the same information.

It should be stressed that information necessary to make electronic payments is not gathered until necessary, i.e. until a subscriber wishes to avail him or herself of such service. It is at this time that funding account information, such as, for example, bank account information (RTN/DDA) and/or credit account information, is collected by the EBPSP 601. It is also at this point that any identity processing related to enrollment for electronic payments is performed by EBPSP processor(s) 703. Information necessary for electronic payments, including information gathered from a subscriber 607A-N and information generated by identity or risk processing, is added to that subscriber's profile in subscriber profile database 1037. So, incrementally a subscriber 607A-N is adding to his or her profile, building out pieces of information that enable new functionality. Thus, upon a subscriber's first request for electronic payment functionality, such as requesting to pay a bill electronically presented by the EBPSP 601, the EBPSP 601, because of the functionality of the Incremental Enrollment and Activation Engine 763, will request funding account information at this time, once received, add this funding account information to the subscriber's profile, and then that subscriber can pay that bill. At this point it does not matter from which Web site the subscriber initially enrolled.

Enrollment data stored in subscriber profile database 1037 responsive to a subscriber 607A-N requesting to enroll from a first Web site is usable by the EBPSP processor(s) 703 for activation of electronic bill presentment requested from a second Web site. Once funding account information is added to the subscriber profile database 1037 it too is available to be used across any of the other network sites. This provides a tremendous advantage to electronic billers 602A-N over existing EBP systems. As one of electronic billers 602A-N begins to funnel subscribers to the network 600, these subscribers are automatically enrolled and ready to participate at other electronic biller, managed payee, and retailer Web sites.

Introduced above, FIG. 24 depicts an electronic biller hosted Biller Direct Web site 2403. An electronic biller might host a Web site for various reasons. For example, an electronic biller might be a large biller that wants to maintain complete control of their site, but yet understands the benefits of participating in network 600. Discussed above in relation to the Common Enrollment and Bill Retriever Engine 756, subscriber 607L can, if desired, initiate enrollment from such an electronic biller hosted Biller Direct Web site. In this case, via the network 600 at communication 2498. That is, an enrollment link 1070 is included in a Web page presented to subscriber 607C by the electronic biller system 800A. There are a number of options to provide enrollment for services of the EBPSP 601 initiated at an electronic biller hosted Web site, one being the transparent hand-off discussed above. Other options are an asynchronous (e.g. batch) data feed, and a real time data feed. No matter which option is utilized, enrollment data is ultimately stored in the subscriber profile database 1037.

In asynchronous data sharing the electronic biller system 800A associated with electronic biller 602I provides the EBPSP system 700, at communication 2497, a specific amount of data via the network 600. This data is transmitted onto the network 600 by communications interface(s) 812A of system 800A, and received from the network 600 by communications interface(s) 712B of system 700. The EBPSP processor(s) 703 use this received data to populate the subscriber profile database 1037. The EBPSP 601 also provides back some data to the electronic biller system 800A via the network 600 to allow the subscriber 607L to log-in and to enable the electronic biller system 800 to perform other functions as needed. This data transfer happens in a batch mode. The information is put together by the transmitting system and then sent at specific intervals. The data exchange is done with no expectation that both processing endpoints, i.e., systems 700 and 800A are up and running at the same time.

In a real time connection, the EBPSP 601 and the electronic biller 602I need to share specific types of data with the other. In this option, electronic biller 602I transmits enrollment information, via the network 600, to the EBPSP 601, and the EBPSP 601 sends back to the electronic biller 602I, via the network, data needed for log in and other functions as needed. As above, these transmissions are performed by communications interfaces 712B and 812A. This occurs in real time. The data exchange is done with the expectation that the two processing end points are up and running at the same time.

It should be understood that the EBPSP 601 could employ one or more of the three methods when enrolling the subscriber 607L from the electronic biller hosted Web site 2403. The EBPSP 601 is not limited to just a batch method all the time, or real time all the time, or session hand off all the time.

The EBPSP 601 can utilize different alternatives with different electronic billers that wish to host their own sites.

Figure 1A:
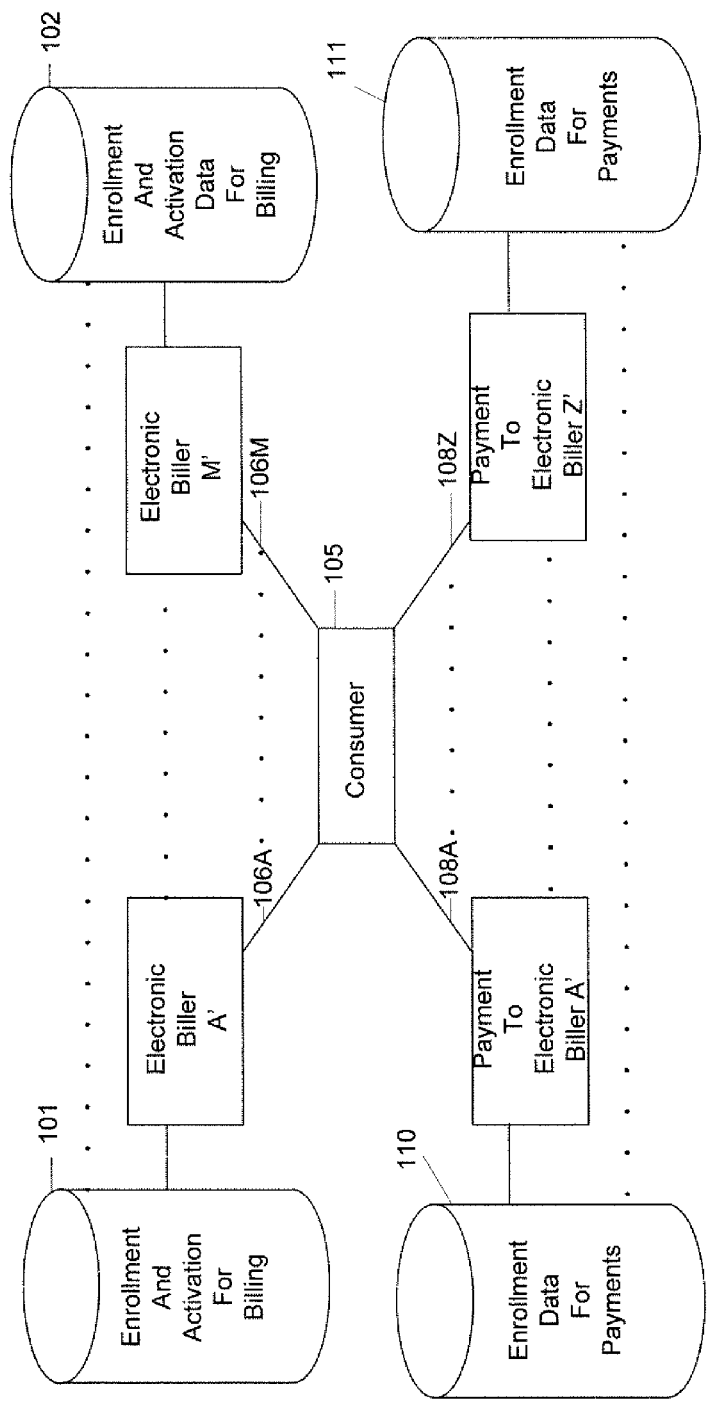
FIG. 1A depicts a prior art biller direct model of an electronic billing and/or payment system.
Figure 1B:
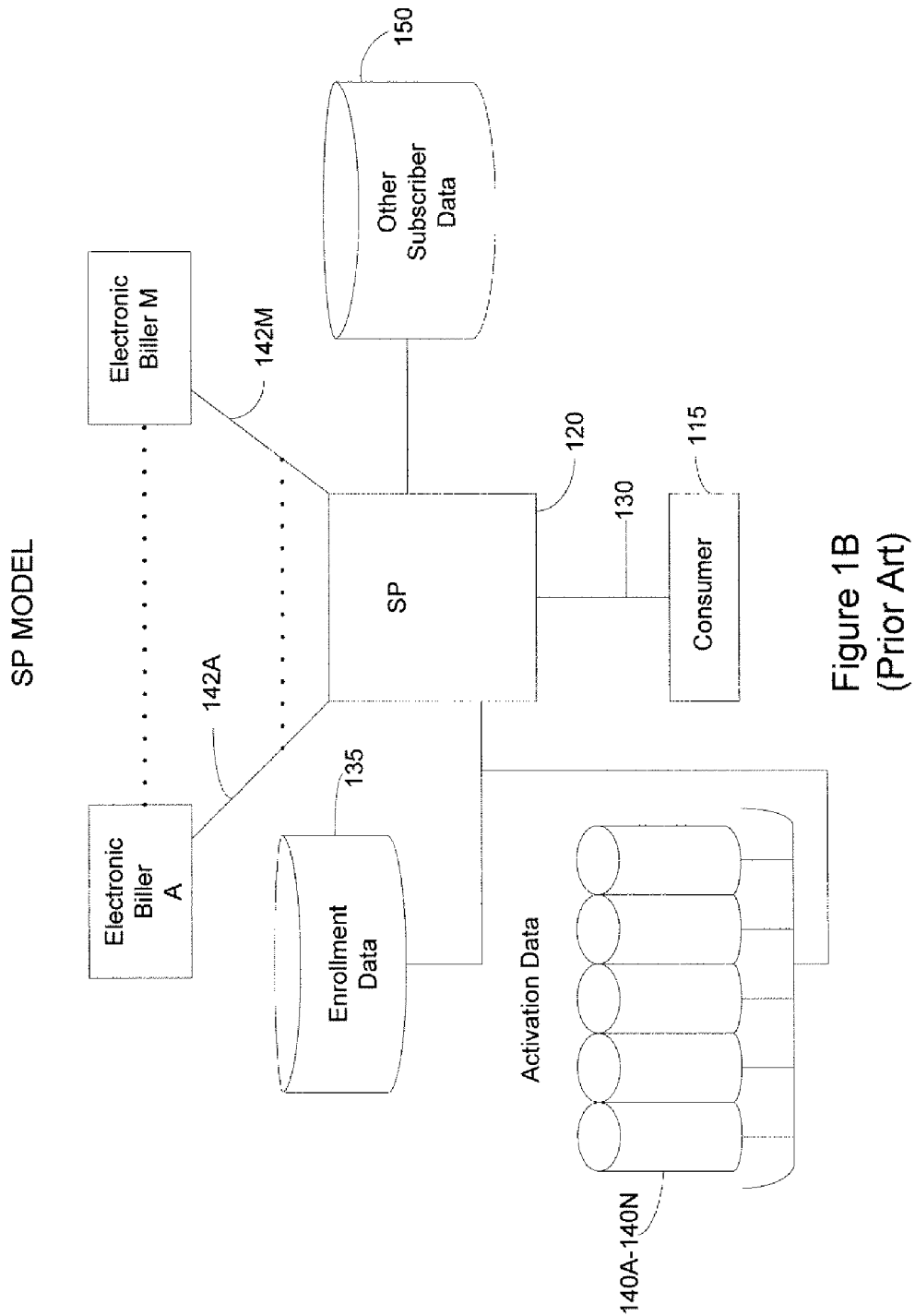
FIG. 1B depicts a prior art service provider model of an electronic billing and/or payment system.

Also introduced above, Web site 2402 is an EBPSP 601 hosted biller direct site of an electronic biller that does not participate in the network 600. The EBPSP 601 stores the data of customers of the non-participating electronic biller siloed apart from other subscribers, shown in FIG. 24 as non-participating electronic biller database 2452. As shown, the Common Enrollment and Bill Retriever Engine 756 and Incremental Enrollment and Activation Engine 763 do not have access to the non-participating electronic biller database 2452. This is very similar to the existing SP model of EBP services, discussed above and shown in FIG. 1B. This data is not shared with the other electronic billers or utilized in activating electronic presentment of bills of electronic billers 602A-N or enrolling any of subscribers 607A-N in any of the services of the EBPSP 601. The option is retained that if the non-participating electronic biller decides to participate in the network 600, the EBPSP 601 merely has to add the information identifying this electronic biller's customers to the subscriber profile database 1037.

Figure 25:
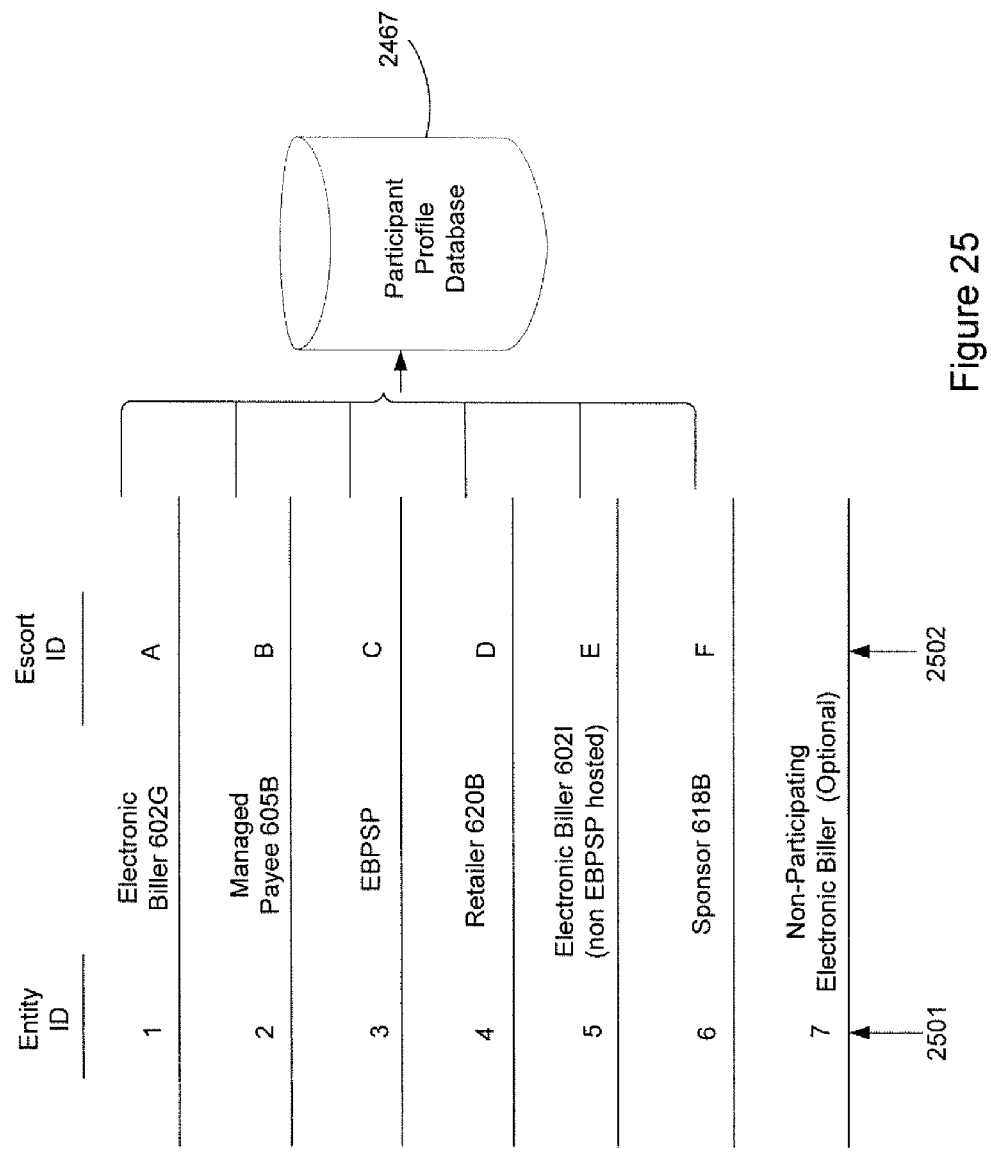
FIG. 25 is a simplified depiction of use of escort identifiers in accordance with certain aspects of the present invention.

FIG. 25 depicts profile information associated with the various entities a subscriber 607A-N could access via the network 600 to access the services of the EBPSP 601. This profile information is stored in participant profile database 2467 of FIG. 24. Shown in FIG. 25 are multiple pre-existing entity IDs 2501. Each pre-existing entity ID is associated with a specific participating network entity. In order to accomplish the sharing of subscriber profile data, a one time enrollment process for a subscriber 607A-N, unique Web site branding, as well as generation of tracking reports, each participating entity is also associated with a new type of entity identifier, which will be sometimes referred to as an escort ID 2502. The escort ID 2502 allows the EBPSP processor(s) 703 to track from which Web site a subscriber 607A-N initiates enrollment, from which Web sites electronic bills are activated, and from which Web sites payments are made. The escort ID 2502 also enables the EBPSP processor(s) to provide other beneficial functionality.

From the discussion of FIG. 24 above, the sponsor 618B, electronic biller 602G, electronic biller 602I, managed payee 605B, and retailer 620B are all participants in network 600, as well as obviously the EBPSP 601, as such, each has an Escort ID 2502. Preferably the non-participating electronic biller ID does not have an escort ID because no data associated with customers of the non-participating electronic biller is utilized by the EBPSP processor(s) 703 in providing EBP services to subscribers 607A-N. At any point in time, if the non-participating electronic biller decides to join the network 600 the EBPSP 601 can tie this electronic biller into the network 600 and very easily include them so that they can take advantage of the benefits of participating in the network 600. At such point, the previously non-participating electronic biller would be given an escort ID 2502. Optionally, the non-participating electronic biller could have a non-functioning escort ID 2502 previous to electing to participate in the network 600. Profile information associated with the non-participating electronic biller is not stored in participant profile database 2467.

Electronic biller 602I, as discussed above, maintains a non-EBPSP 601 hosted Web site. However, electronic biller 602I has an escort ID 2502 in order to allow profile data of its customers to be shared and utilized by the EBPSP processor(s) 703, even though the actual Web site for the electronic biller 602I, in this example, is not hosted by the EBPSP system 700.

An escort ID 2502 is used by the EBPSP processor(s) 703 in the tracking of from where a subscriber 607A-N enrolls, from which electronic billers 602A-N electronic billing has been activated, and at what sites and to whom electronic payment has been made, as well as tracking other electronic commerce services provided by the EBPSP 601. This information has various uses, including customer care as well as in tracking payment issues or enabling the EBPSP 601 to allow the electronic billers 602A-N to understand and see where electronic payments are being made in relation to delivered electronic bills and delivered paper bills. Also, the tracking information gather through the use of an escort ID 2502 allows a sponsor 618A-N to determine where electronic bills are being activated, and to whom payments are made.

In addition, the escort ID 2502 is used by the EBPSP processor(s) 703 to deliver electronic bills via e-mail such that delivered electronic bills have the appropriate branding. For example, if a subscriber 607A-N activates electronic billing at a Biller Direct Web site, that e-mail delivered electronic bill would contain that Biller Direct site's branding for that subscriber, even if initial enrollment was made at another Web site. In addition, the escort ID 2502 is used by the EBPSP processor(s) 703 to electronic biller Web sites hosted by the EBPSP system 700. An escort ID 2502 will allow the electronic billers 602A-N to, if desired, set up their EBPSP hosted Web site with branding identifying only an electronic biller 602A-N with which a EBPSP hosted Web site is associated. However, if desired, the EBPSP 601 could set allowed parameters for the branding.

Also, the escort ID 2502 is used by the EBPSP processor(s) 703 to filter data communications to a subscriber 607A-N. For example if a subscriber is logged into a first EBPSP hosted electronic biller Web site, only bills and messages that are directly related to that first electronic biller are available to the subscriber. Also, the escort ID 2502 can filter certain functionality such as paying only e-bills, or a pay anyone functionality as well. For example, if a subscriber 607A-N is at a sponsor site, that subscriber would be able to make payments to anyone, whereas if at a managed payee site, that same subscriber would only be able to make payments to that managed payee.

Universal Payments

Figure 2:
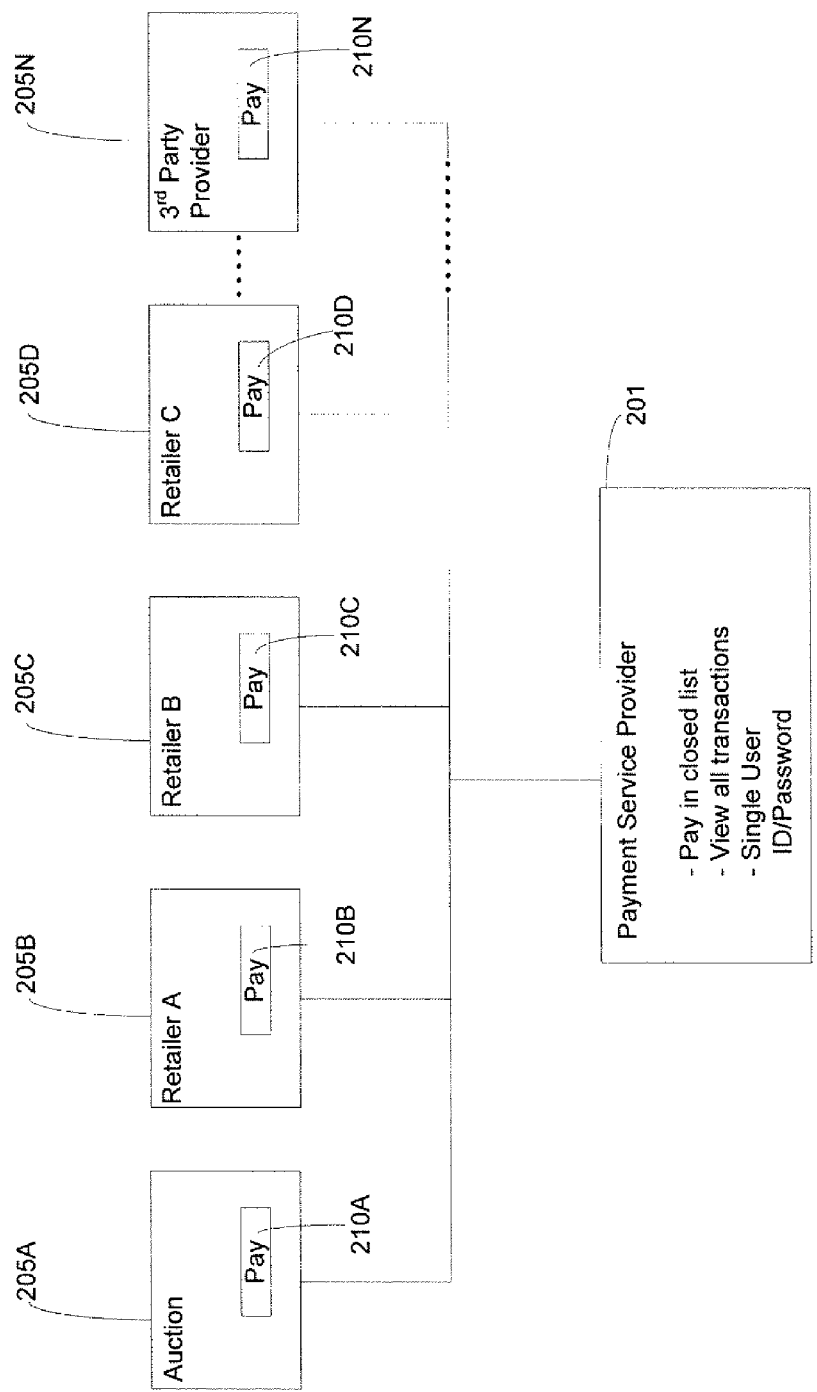
FIG. 2 depicts a prior art payment system accessed from a plurality of unrelated Web sites.
Figure 3:
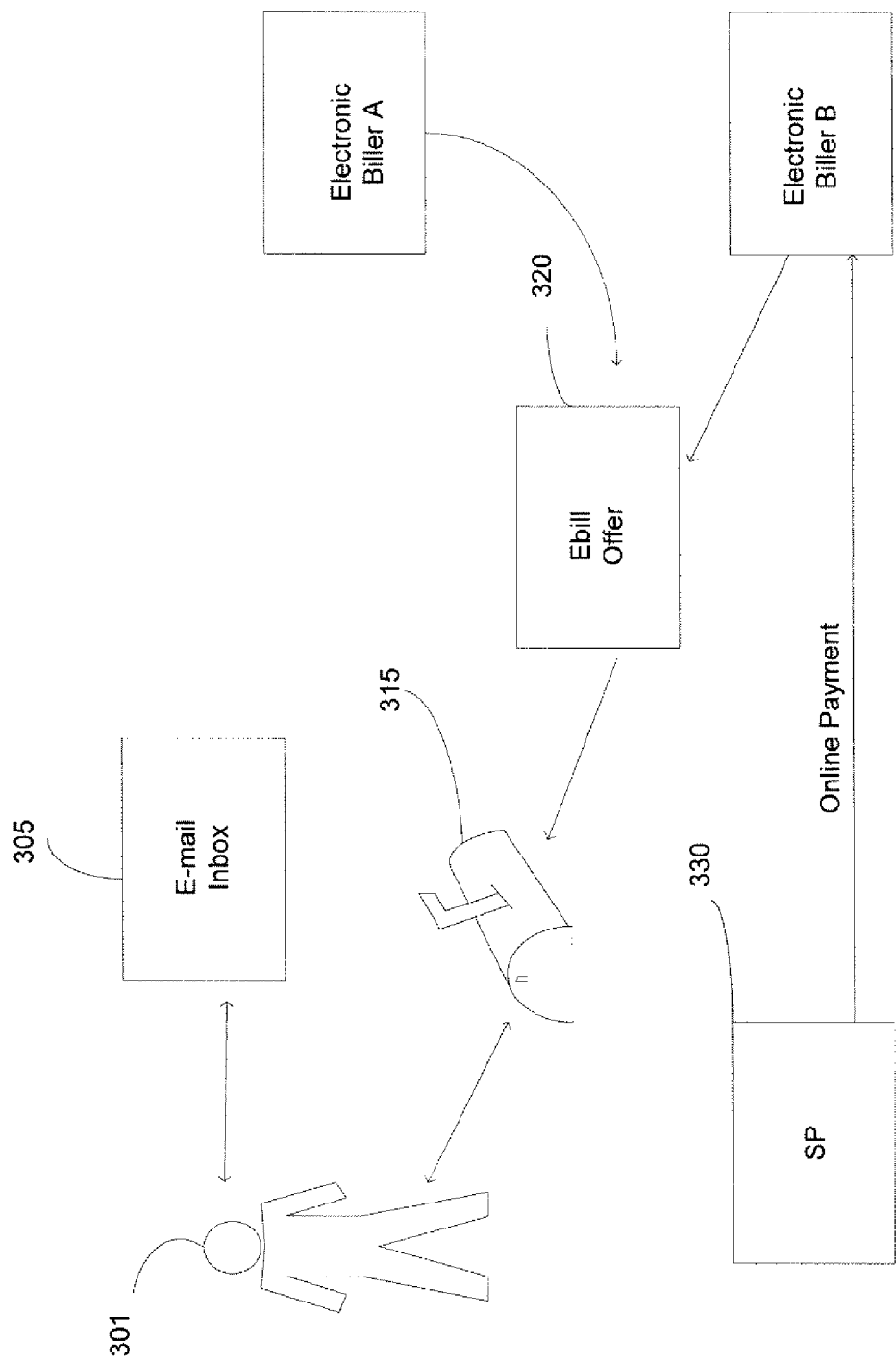
FIG. 3 depicts the flow of offers for electronic billing to a consumer from electronic billers in the prior art.
Figure 4:
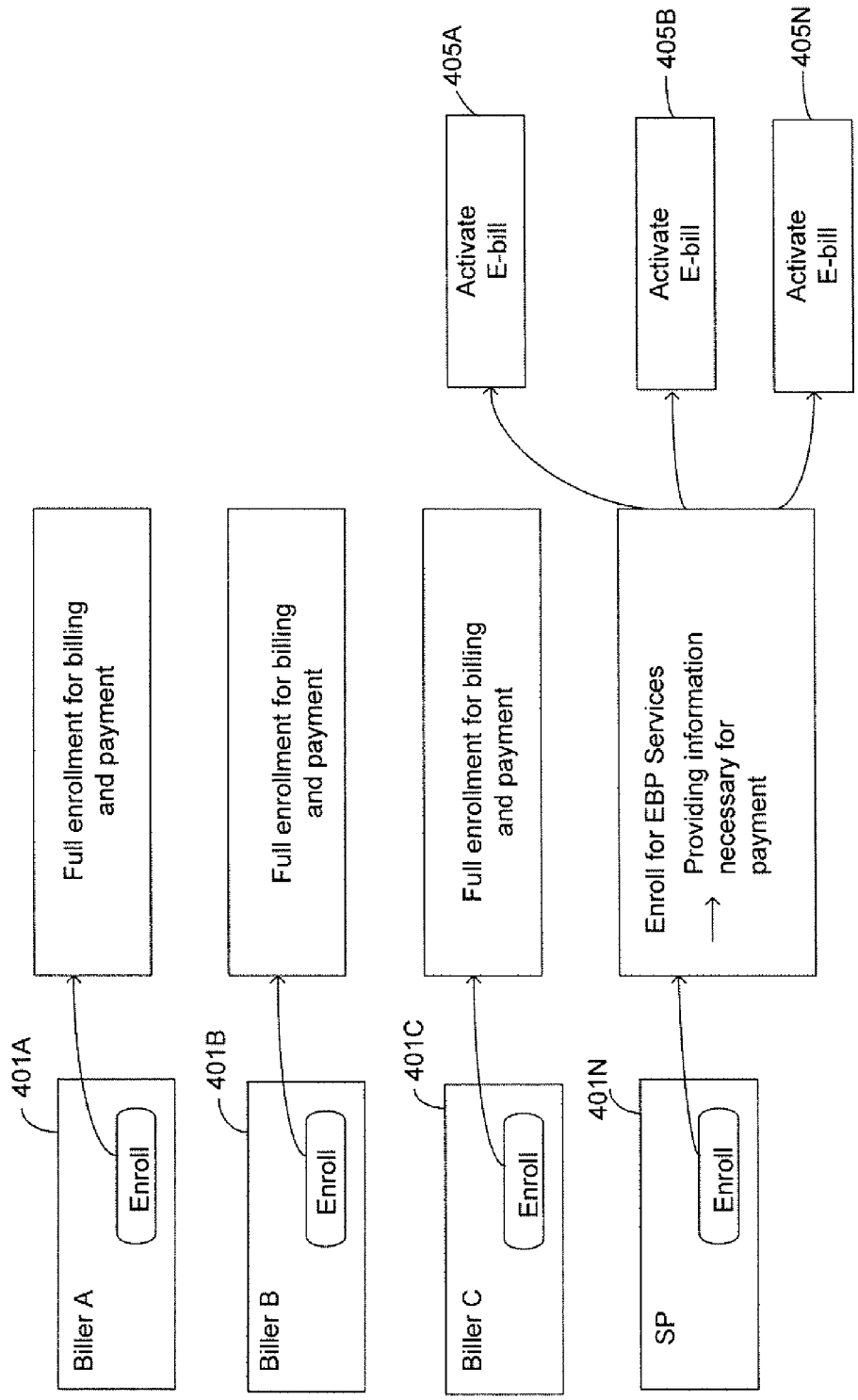
FIG. 4 depicts the enrollment process for electronic billing and payment services in the prior art.
Figure 12:
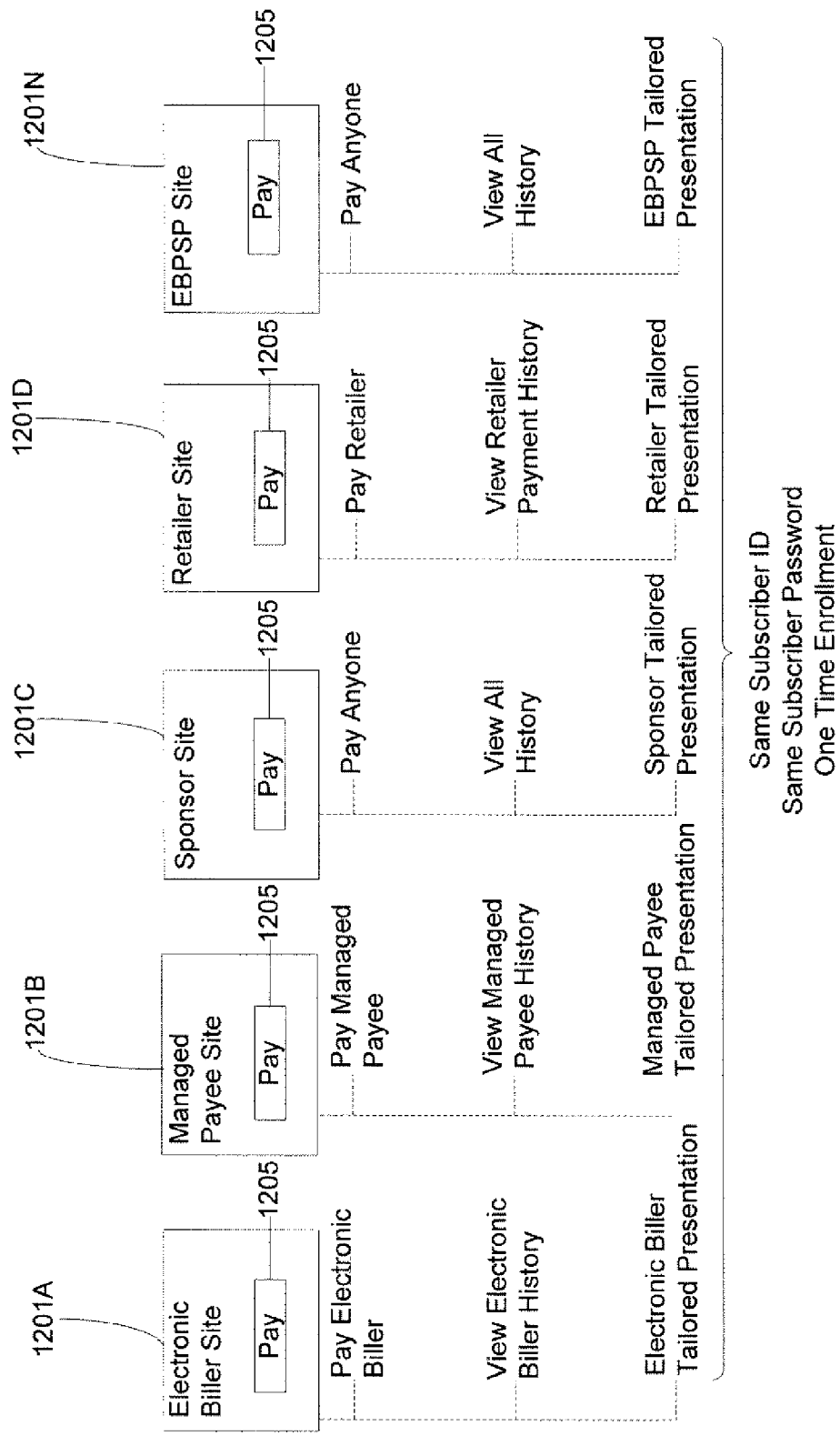
FIG. 12 is a depiction of functionality of the Universal Payments engine of FIG. 7B in accordance with certain aspects of the present invention.

FIG. 12 depicts another aspect of the present invention which enables a subscriber 607A-N to enroll once, use the same user ID and password, and leverage a single payment service across multiple electronic biller 602A-N and/or retailer 620A-N Web sites to make payments, and view history while having a tailored experience at each site, no matter the branding of the site or link to access the site, unlike the system shown in FIG. 2 and discussed above. The Universal Payments Engine 757 controls this functionality. It will be appreciated that the Universal Payments Engine 757 can be utilized in conjunction with other engines described herein.

Shown in FIG. 12 are multiple Web sites 1201A-1201N. Each Web site could be associated with an electronic biller 602A-N, a managed payee 605A-N, a sponsor 618A-N, EBPSP 601, or a retailer 620A-N. Any of Web sites 1201A-N could be hosted by the EBPSP system 700, or another system. Also, each of sites 1201A-N are uniquely branded. Common to each of the sites is a payment link 1205. A subscriber 607A-N could activate link 1205 at a retailer branded site and make a payment only to that retailer or view payment history to that retailer. The subscriber could then move to a managed payee branded site and see payment history specific to only that managed payee, as well as make payment to that managed payee upon activation of link 1205. If link 1205 is activated at an electronic biller branded site, the subscriber could view electronic bills from that biller only, make payment to that biller only, and view payment history to that biller only. Thus, transactions are filtered by the EBPSP processor(s) 703 to be relevant only to the network entity at whose site the payment link 1205 has been activated. However, if the subscriber visits a EBPSP branded site or a sponsor branded site in order to view and pay bills, they would see all transactions for any payee to which they have made a payment utilizing link 1205 and could make payment to any network entity participating in electronic payments.

Figure 13:
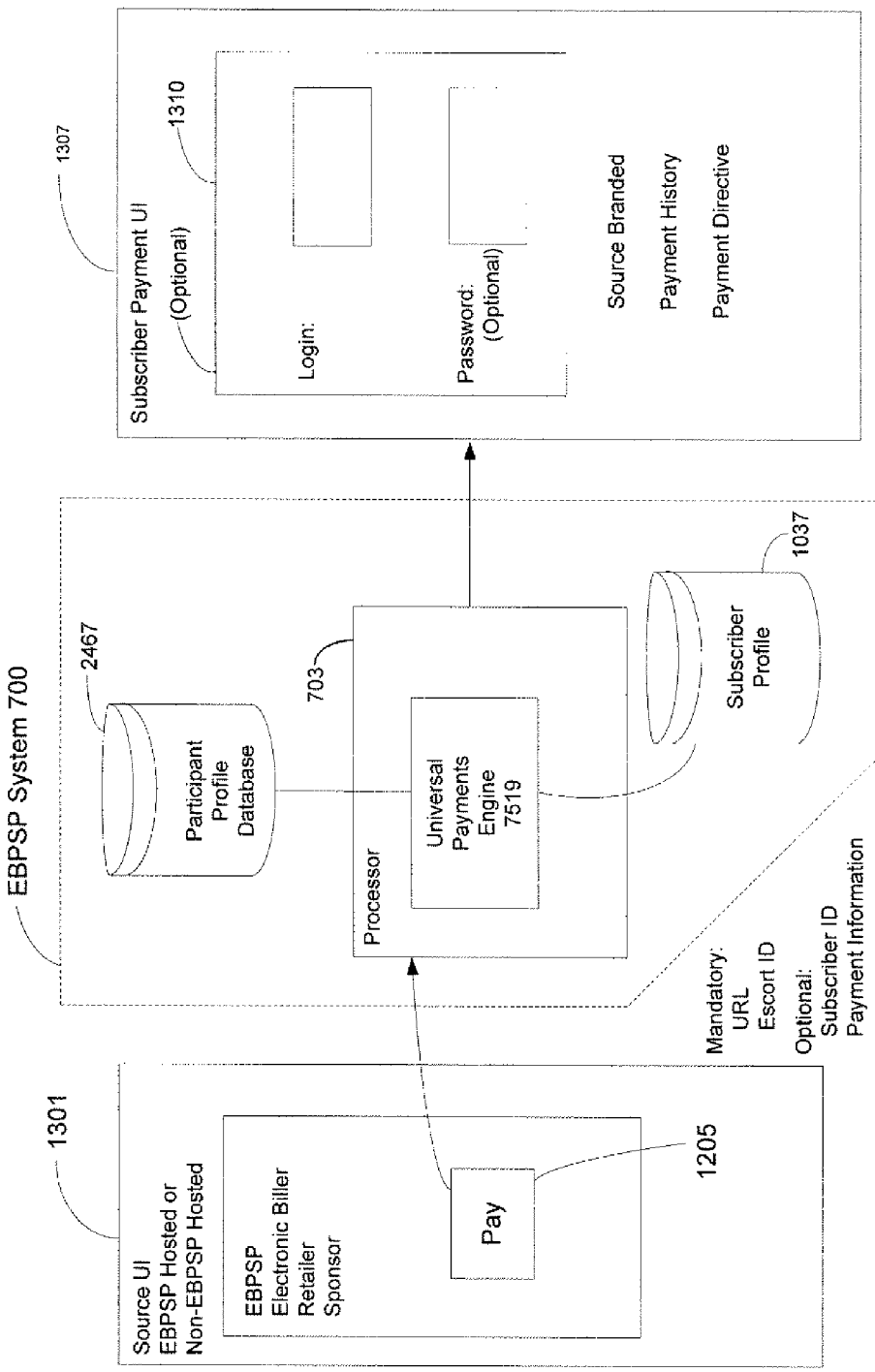
FIG. 13 is a further depiction of functionality of the Universal Payments engine of FIG. 7B after a payment link is activated by a subscriber in accordance with certain aspects of the present invention.

FIG. 13 depicts a source user interface (UI) 1301, which could be branded as an electronic biller site, an EBPSP site, a retailer site, or a sponsor site. Whenever a subscriber 607A-N selects the payment button 1205 at a source UI, the system hosting the source UI 1301 sends a URL to the EBPSP 601 processor(s) 703 via network 600 if the accessed site is not EBPSP hosted. The URL contains an escort ID discussed above, and optionally a subscriber ID if the source UI participates in a consolidated log on service. A consolidated log on service is a single sign-on mechanism in which an originating site provides a subscriber identifier and a token, such as a digital signature, that enables a receiving site to verify that a subscriber is being redirected from a trusted originating site that has previously authenticated the subscriber. Optionally, the source UI can send payment information, including date and amount. Any information from the source UI 1301 is referred to as source data. The source data is received by communications interface(s) 712B and passed to the Universal Payments Engine 757 by the EBPSP processor(s) 703. If the source UI 1301 is hosted by the EBPSP system 700, the same information is passed to the Universal Payments Engine 757 by the EBPSP processor(s) 703.

If the source data is received from a non-EBPSP hosted Web site, the Universal Payments Engine 757 validates the source data, by accessing the participant profile database 2467. Also if the source UI 1301 is not EBPSP 601 hosted, any received subscriber information is validated, preferably by accessing the subscriber profile database 1037. If the source information received from a non-EBPSP hosted Web site does not include a subscriber ID, the Universal Payments Engine 757 causes communications interface(s) 712B to transmit, via the network 600, a log in and password page 1310 to the subscriber system 900, preferably source UI 1301 branded, as will be discussed further below. The subscriber then provides his or her ID, and optionally password, back to the EBPSP system 700 via the network 600. Once received, this information is passed to the Universal Payments Engine 757 for validation.

The Universal Payments Engine 757 accesses participant profile database 2467, which is a data repository 706, or in alternative embodiments, another data repository 706, and retrieves information associated with the source UI. This retrieved information includes branding information specific to the entity that the source UI 1301 represents. The Universal Payments Engine 757 creates a subscriber payment user interface 1307 branded specifically for the source UI 1301, of which optional log in and password page 1310 is a part. The Universal Payments Engine 757 then causes communications interface(s) 712B to transmit the created subscriber payment UI to the subscriber system 900 via the network 600.

As a result of the functionality of the Universal Payments Engine 757, a tailored payment experience, based at least upon the identity of the source UI 1301, is provided preferably by utilizing an escort ID. The tailoring of the payment experience also includes the Universal Payments Engine 757 determining other EBP services in addition to electronic payments to be made available to the subscriber via the payment UI 1307, as well as business rules to be applied in processing payment requests received via the payment UI 1307, all dependent upon the information retrieved from the participant profile database 2467, and/or other data repositories 706. The business rules introduced above include rules such as payment amount thresholds, payment frequency thresholds, or other business rules associated with risk processing. The source branding of the payment UI 1307 also preferably includes a payment history specific to the escort ID/subscriber ID combination giving rise to the payment UI 1307.

Accordingly, a subscriber is provided with one time enrollment and can use the same ID and password to pay bills presented by different billers at different sites, and make payments to retailers, for example, for on-line purchases or auction purchases, while a network entity is provided with control over the branding and user experience in both the presentment and payment of the bill.

Biller Discovery and Activation

Figure 14:
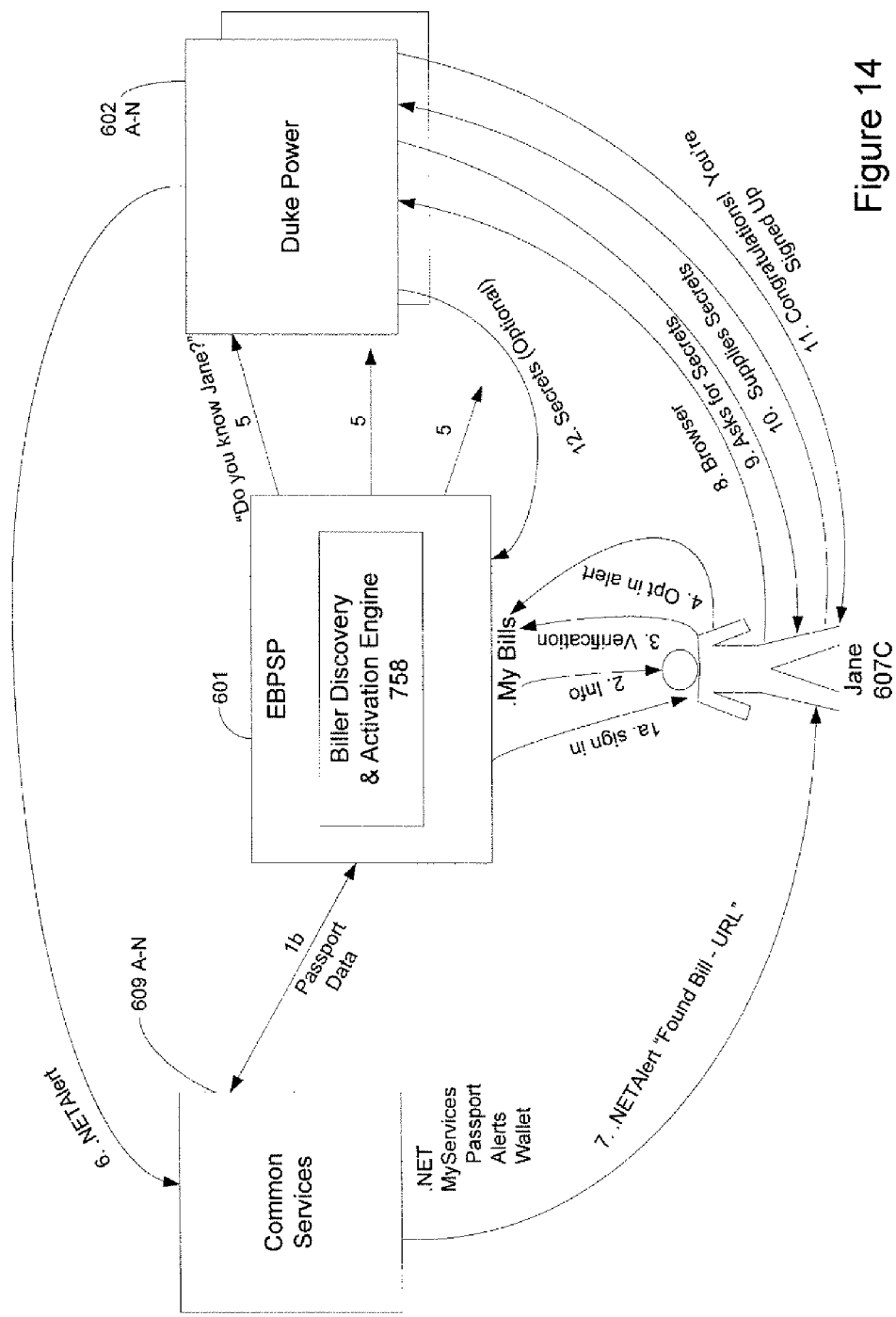
FIG. 14 is a simplified overview depiction of functionality of the Biller Discovery and Activation engine of FIG. 7B in accordance with certain aspects of the present invention.

Another aspect of the present invention, performed by the Biller Discovery and Activation Engine 758, leverages either existing or proposed Web services, shown in FIG. 6 as Common Services 609A-N. The example below leverages The Microsoft Corporation's .NET service discussed above, though other Web services could also be leveraged. FIG. 14 is a high level overview of the activation process and initial bill delivery process that a subscriber, in this example subscriber 607C, Jane, goes through. The processes shown in FIG. 14 will be further discussed below and further detailed in subsequent figures. All communications shown in FIG. 14 are via the network 600. Further, each operation described below is performed by a system associated with the entity to which each operation is attributed.

In detail 1*a* subscriber 607C signs in via .NET passport with the EBPSP 601. The EBPSP 601 queries one of common services 607A-N in detail 1*b* and retrieves passport data. The EBPSP 601 also retrieves demographic data that is stored in a .Net My Bills service data repository (not shown in FIG. 14), which is a data repository 706. This .NET My Bills service is a new service built to leverage Web services presented by the Biller Discovery and Activation Engine 758 of EBPSP system 700. This passport and demographic information is presented to the subscriber 607C, in detail 2. The subscriber 607C verifies the information in detail 3 and then immediately thereafter in detail 4 opts in to receive .Net Alerts that correspond to important billing events such as activation and bill delivery. Verification can include the subscriber 607C providing supplemental information. The subscriber 607C ends the session with EBPSP 601 after detail 4.

At detail 5 the EBPSP 601 broadcasts what amounts to a "do you know Jane" message to any number of electronic billers 602A-N. The EBPSP 601 may beneficially perform intelligent filtering to reduce the scope of billers queried. This intelligent filtering can utilize other Engines described herein. One of these electronic billers in FIG. 14 is denoted as The Duke Power Company. Duke Power receives this "do you know Jane" message and after a search of customer roster files comes up with a determination that the subscriber 607C is most likely a customer, but that there is not a 100% determination. Since it is not 100% known that the subscriber 607C is a customer, in detail 6 Duke Power sends the subscriber 607C a .Net Alert that routes through the common services provided by The Microsoft Corporation or some other hosting service. This Net Alert gets further routed to the subscriber's preferred client for receiving alerts in detail 7, in this example an instant messenger windowing client. There is a message included in that .Net alert along the lines of "we have your bills available at Duke Power". Preferably the alert includes a link to Duke Power.

The subscriber 607C sees the .Net Alert and in detail 8 activates a link that causes a browser associated with subscriber 607C to access a Duke Power Web site. Duke Power receives a sign-in request and then in detail 9 asks the subscriber 607C for at least one shared secret (authentication token), examples of which would be information readily known such as mother's maiden name, social security number, father's middle name, etc. In detail 10 the subscriber 607C supplies the secret. Duke Power verifies that the secret is indeed correct. Duke Power is able to determine to an adequate comfort level that the subscriber 607C is a customer of Duke Power because of the correctly supplied secret. Even if Duke Power has a 100% certainty that the subscriber 607C, Jane, is a customer, the authentication token could still be required. In detail 11 a message is sent back to the subscriber 607C via her browser, in this example, that amounts to a congratulatory message saying that she is signed up and ready to start receiving bills from Duke Power. At this point the subscriber 607C is not involved anymore and will not be involved until she receives her first bill, which could be at the start of the next billing cycle. Alternatively, a congratulating note could include a link to an immediately available electronic bill, or the bill itself.

At detail 12 Duke Power optionally shares Jane's secrets with the Net My Bills service presented by the Biller Discovery and Activation Engine 758 with the presumption that these secrets could be used to further streamline further bill activations at other electronic billers, as discussed above in relation to the Incremental Enrollment and Activation Engine 763. Or, Duke Power could share the information with a third party billing-specific information repository service, not shown in FIG. 14. One interesting aspect of this entire flow is that the subscriber 607C was never prompted, or at least never required to enter in, information that she has to go look up. A good example of this is a bill account number. The subscriber 607C is not required to enter this number by Duke Power and Duke Power is able to activate the subscriber 607C by asking for what most people have easily remembered, such as social security number or mother's maiden name. This does not preclude that Duke Power could ask the subscriber 607C to enter in her billing account number, but it is certainly not required for this activation to succeed. Also, Duke Power could obtain an account number from the EBPSP 601 if Jane had ever paid Duke through the EBPSP 601.

Figure 15:
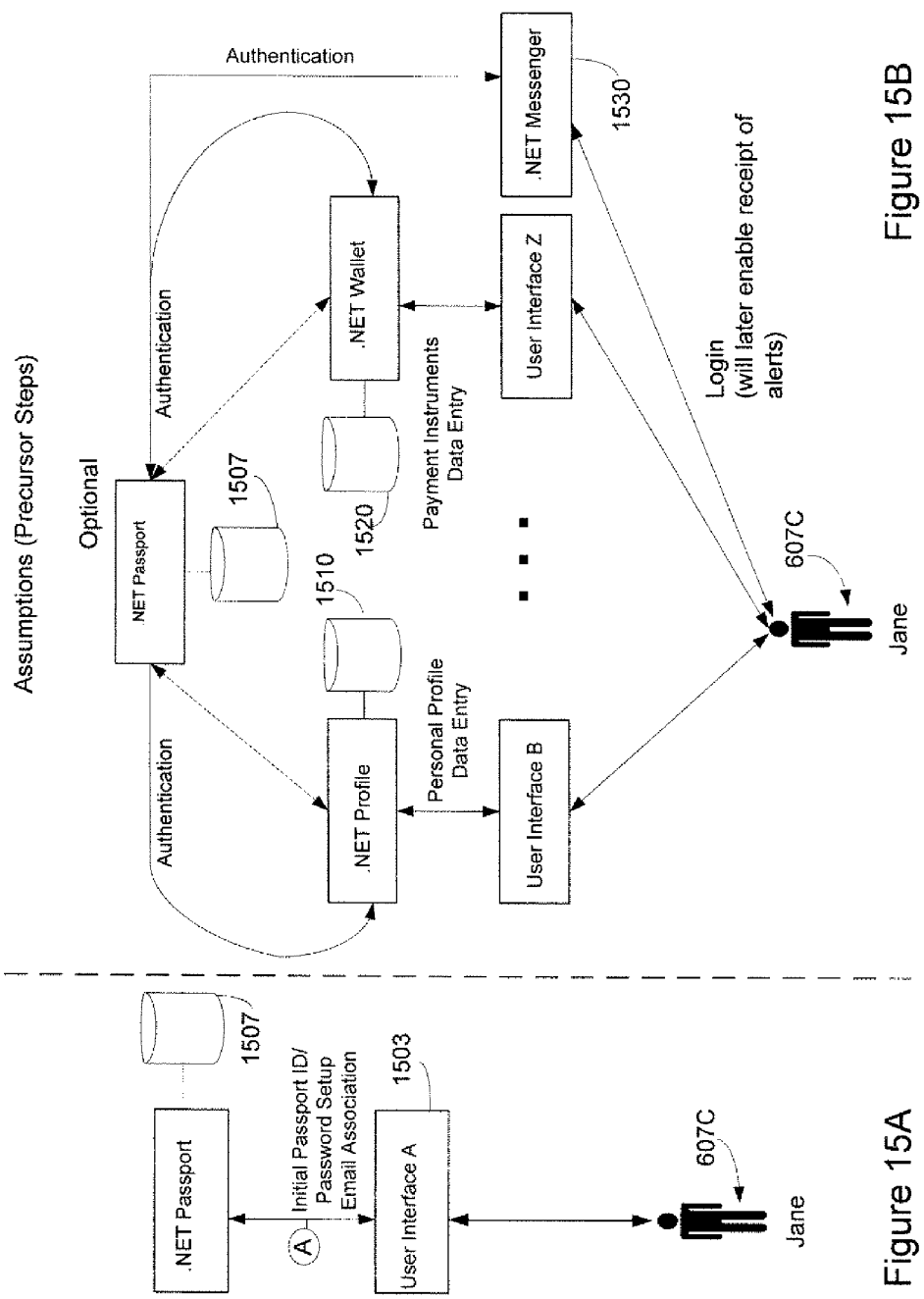
FIG. 15A is a simplified depiction of initial Passport ID/password set up for use with the Biller Discovery and Activation engine of FIG. 7B in accordance with certain aspects of the present invention.
FIG. 15B is a simplified depiction of on line activity which forms a foundation for use of the Biller Discovery and Activation engine of FIG. 7B in accordance with certain aspects of the present invention.

FIG. 15A depicts the most basic framework in which the Biller Discovery and Activation Engine 758 operates. At a minimum, the subscriber 607C has to become a .NET Passport user utilizing a user interface 1503. This will give her an ID/password combination which is stored in a data registry 1507 in association with an e-mail address of the subscriber 607C, detail A. User interface 1503 could, if desired, be presented by the EBPSP 601, or another entity.

FIG. 15B depicts other activity subscriber 607C may perform on the Web which is supported by .NET services. The subscriber 607C may beneficially extend her usage of .NET common services (and therefore the "knowledge" these have about her in the depicted data repository 1507). Some general profile information (e.g., name, address, phone number) may be maintained in a .NET Profile 1510, or even in the .NET Passport profile 1507. Her credit cards may be maintained in a .NET Wallet data repository 1520. Other possibilities include her use of calendaring offered by .NET Calendar, or a common contacts list offered by .NET Contacts. Also, Jane's login via .NET Messenger 1530 enables receipt of alerts, further discussed below.

The new .NET My Bills Web service (and, by delegation, associated electronic billers) provided in this aspect of the present invention can, if desired, alert the subscriber 607C through the .NET Alert common service. In order for this to happen, the first time the subscriber 607C accesses .NET My Bills through a user interface, she must supply her alert preferences. In the detailed example described below it is assumed that the subscriber 607C indicates receipt of alerts through .NET Messenger 1530 (rather than e-mail) as her preference. These preferences are stored in a Jane/.NET My Bills-specific combination in the .NET Alert repository, not shown in FIG. 15B.

Figure 16:
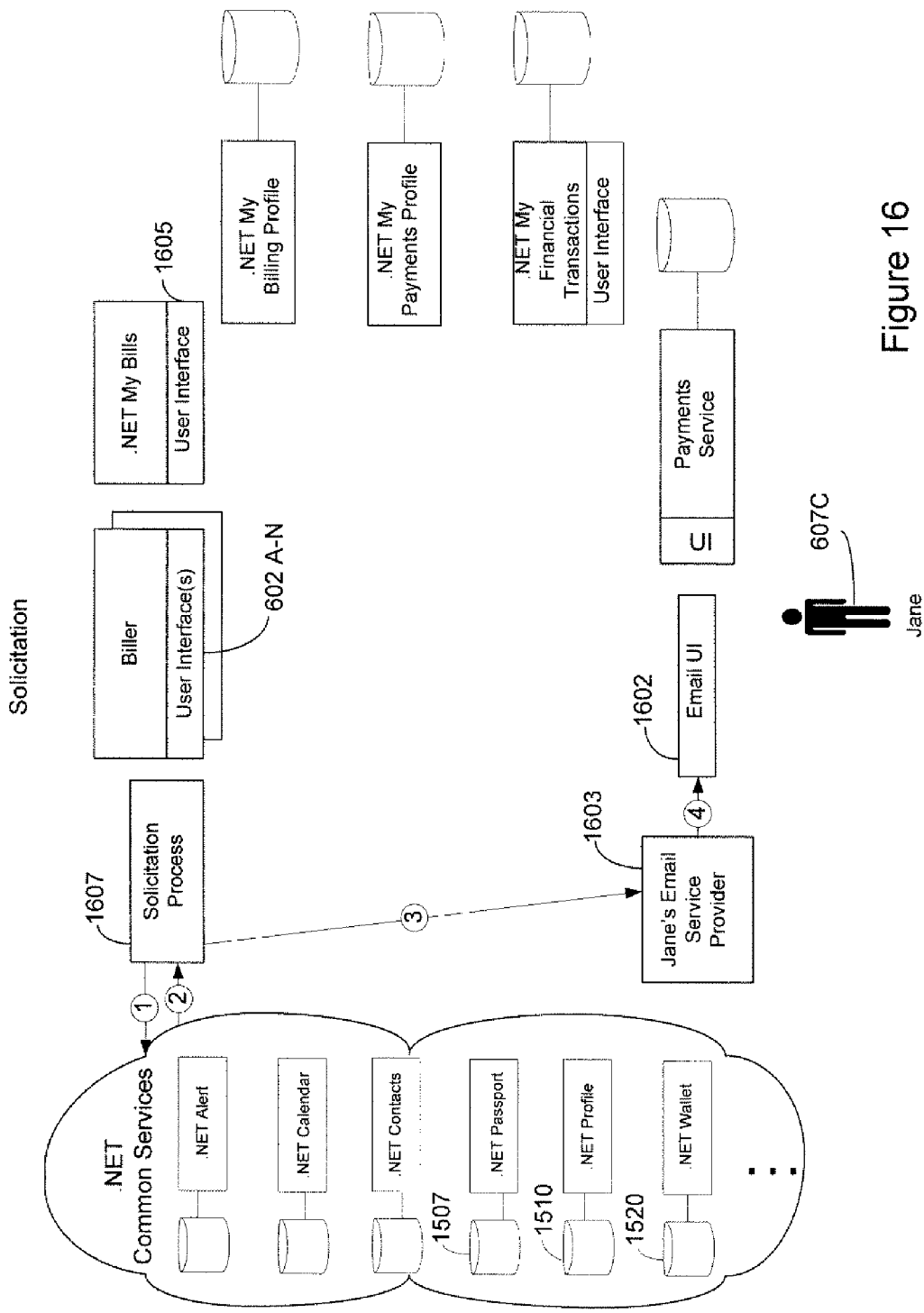
FIG. 16 is a simplified depiction of solicitation functionality of the Biller Discovery and Activation engine of FIG. 7B in accordance with certain aspects of the present invention.

FIGS. 16 through 20 further detail the Biller Discovery and Activation Engine 758 introduced above and shown in FIG. 6 and FIG. 14. As shown in FIG. 16, a solicitation process 1607 solicits .NET Passport users to initiate the steps to discover and begin receiving their bills electronically. This process could, as desired, be performed by the EBPSP 601, the entity offering the .NET framework (e.g., Microsoft™), or some other entity such as an electronic biller 602A-N. Beneficially, the solicitation process 1607 has access rights to the .NET Passport database 1507 in order to identify candidates to notify (including their e-mail addresses). Alternatively, the solicitation process 1607 may receive candidates (including e-mail addresses) from other third-party databases. Other functionality of the EBPSP 601 described herein could be utilized with the solicitation process to identify candidates.

A preferred way the solicitation process 1607 has to reach out to the subscriber 607C is via e-mail. Standard "snail mail" could, if desired, be used, of course, but it would be much more tedious for the subscriber 607C. The subscriber 607C would have to open a browser and type in a URL rather than just click on a link.

The solicitation process 1607 could, as desired, also place some passive or generic advertising on the Web, rather than perform active/targeted solicitation. In any case, through one means or another, the subscriber 607C reviews a link that can be followed to the new .NET My Bills UI 1605. As shown in detail 1, the solicitation process 1607 requests Passport data, and at detail 2, the .NET Passport returns Passport data from database 1507 to the solicitation process 1607. Note that a single request could return just a single individual, or multiple individuals. The solicitation process 1607 chooses one individual (Jane) to target, and sends a solicitation e-mail to her (with an embedded link to the .NET My Bills UI), detail 3. This e-mail is transmitted to her e-mail service provider 1603. At the time of her own choosing, the subscriber 607C pulls e-mail from her e-mail service provider 1603 and opens/reads this solicitation e-mail, detail 4. (Note that the solicitation process 1607 could repeat this process for other individuals.)

The subscriber 607C is a frequent user of e-mail and one day she notices a new message in her e-mail in-box advertising a new service called "My Bills" in which she can now have bills delivered electronically to her personalized MSN Money home page. Alternatively, a complete description of the service could be contained in the message. Delivering bills to her e-mail account is also an option, as well as a EBPSP 601 hosted site. The subscriber 607C decides to "opt-in" for the service and follows a link included in the message. Preferably, there is no charge for this service to subscribers. Signing up is a very simple process because the combination of .NET Passport database 1507 and .NET Profile database 1510 already holds demographic data such as home addresses and phone numbers, as well as supports identity authentication (via a password). She merely confirms the entries and clicks OK. Concluding the signup process, the subscriber 607C sees that on her behalf participating electronic billers will be notified of her desire to receive bills electronically. The subscriber 607C also reads that she could manually select the bills she wishes to receive electronically, or use a Wizard-type interface to select bills.

Figure 17:
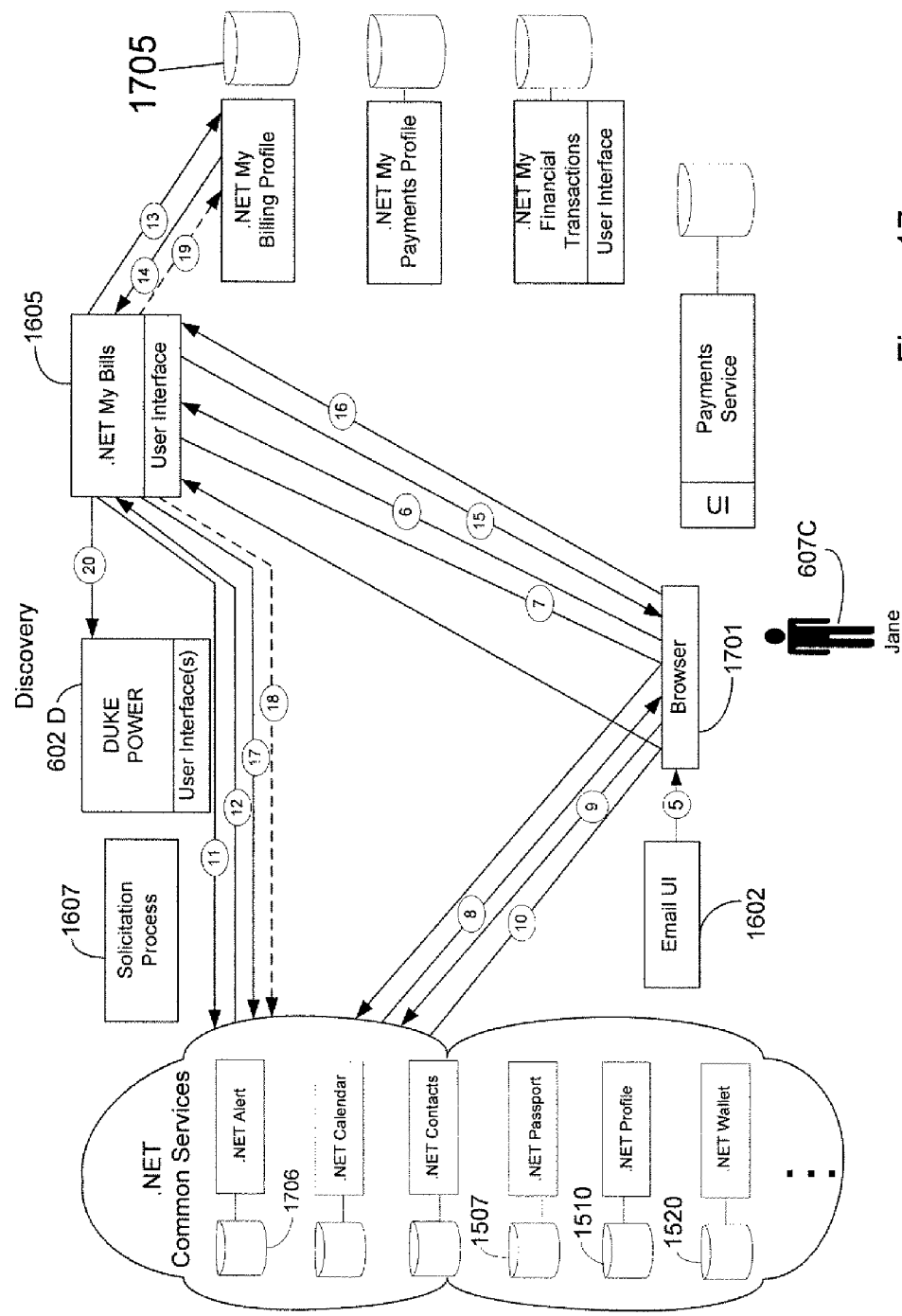
FIG. 17 is a simplified depiction of discovery functionality of the Biller Discovery and Activation engine of FIG. 7B in accordance with certain aspects of the present invention.

More particularly, as shown in FIG. 17 at detail 5, the subscriber 607C clicks on the e-mail link, i.e. a hyperlink within an e-mail, and a browser window is launched 1701. As shown at detail 6, Jane's browser 1701 is directed to the .NET My Bills UI 1605. The first time the subscriber 607C visits this UI, there are no accompanying authentication credentials and the .NET My Bills UI 1605 detects this.

.NET My Bills redirects Jane's browser to .NET Passport for authentication, detail 7. .NET Passport presents a screen to the subscriber 607C asking her to authenticate herself (at a minimum, by a password), and whether she wants to have this "remembered" for future sessions from this computer/browser at .NET My Bills, detail 8.

At detail 9, the subscriber 607C responds. It is assumed she also indicates that she wants her credentials "remembered" so she does not have to provide credentials at each visit to .NET My Bills. .NET Passport updates its local repository 1507, provides "cookies" to Jane's browser 1701, and redirects browser 1701 back to the .NET My Bills UI 1605, as shown in detail 10. The redirection includes an encrypted authentication query string that indicates to .NET My Bills that the subscriber 607C has been successfully authenticated. .NET My Bills requests any available profile information on the subscriber 607 from the .NET Profile database 1510 (could also be in .NET Passport database 1507), detail 11.

As shown in detail 12, .NET Profile (or Passport) returns any available profile information on the subscriber 607C to .NET My Bills. .NET My Bills requests any available billing-specific profile information on the subscriber 607C from the .NET My Billing Profile database 1705 at detail 13.

At detail 14, .NET My Billing Profile returns any available profile information on the subscriber 607C to .NET My Bills. The .NET My Bills UI 1605 presents a screen to the subscriber 607C that contains all available profile information, asks her if she wants to change any of it, asks her alert preferences for the .NET My Bills context, may optionally ask her to supply some additional information, and asks if she wants to continue with the electronic biller discovery process, detail 15. Note that a link to service terms and conditions may also be available.

The subscriber 607C provides a response which at the very least indicates her desire to proceed with the electronic biller discovery process and alert preferences, and may optionally modify some existing profile information and/or provide additional information, detail 16. .NET My Bills propagates Jane's .NET My Bills context alert preferences to .NET Alert, which stores them in its repository 1706 detail 17. At detail 18, as necessary, .NET My Bills may update .NET Profile database 1510 (or .NET Passport database 1507) information on the subscriber 607C.

Also as necessary, at detail 19, .NET My Bills may update .NET My Billing Profile information 1705 on the subscriber 607C. Finally, at detail 20, .NET My Bills issues a "do you know Jane?" discovery request to an electronic biller 602D. It is assumed in this example that the request includes all of the profile information (including billing-specific information) available about the subscriber 607C. Alternatively, only a minimal set of profile information, perhaps dependent upon a biller's identity, could be provided, with the expectation that the electronic biller would request specific additional information desired. Also, as will be discussed further below, shared information could be subjected to processing of the Privacy Engine.

Note that although this scenario only involves one electronic biller, .NET My Bills may very well issue a number of requests in parallel to a number of electronic billers, based on some decision criteria. Also, note that the subscriber 607C "goes away" after providing the information in step 16. The discovery process initiated by .NET My Bills is completely asynchronous with the subscriber 607C. As a result, the request to the electronic biller could be presented in a variety of ways. Though, it should be noted that the discovery process could be performed while the subscriber 607C is in session with the .NET MyBills user interface 1605.

While the subscriber 607C is away, .NET My Bills service goes to work and starts looking for electronic billers that have a business relationship with the subscriber 607C. Based on, for example, the ZIP code of her home address (and perhaps a second home), other information associated with the subscriber 607C, including information obtained from the subscriber 607C, third party sources, the .NET Profile database 1510 or the .NET Passport database 1507. The Web service of all of the electronic billers that might be associated with Jane's location are messaged. Naturally, this set of potential electronic billers includes local companies such as Jane's electricity provider, but it also includes electronic billers that are national in scope, for example, credit card companies.

The message, formatted according to the specification set forth by the .NET My Bills service, or perhaps formatted according to individual electronic biller specification, sent to each electronic biller includes Jane's full name, addresses, phone numbers, and perhaps other identifying data such as credit card numbers. (The subscriber 607C agreed to this exchange of information when she accepted terms and conditions during the signup process.) In essence, the message informs electronic billers that the person described by the contents of the message (Jane in this case) wishes to be billed electronically. If this person is someone with whom an electronic biller has a business relationship, then the electronic biller should begin delivering bills electronically to that person. It again should be noted that in certain implementations, sharing of personal information may be limited and/or masked, as will be discussed further below.

So far, all of this data exchange is made possible because participating ones of each electronic billers 602A-N have each made available a Web service that conforms to a specification set forth by The Microsoft Corporation (or some standards body) and has registered with the EBPSP 601 directly (possibly via another Web service) as a standard electronic biller. Of course, these biller requests could be presented by other methods.

Duke Power, electronic biller 602D, is one of the companies that receives a message indicating Jane's willingness to start receiving electronic bills. Now, at this point, Duke Power has no idea whether or not the subscriber 607C is a customer. But after performing an automated search of their customer roster files, they are able to determine that the subscriber 607C is probably a customer based on the supplied information.

Since Duke Power has decided that there is a strong likelihood of the subscriber 607C being a customer, they decide to begin the process of signing the subscriber 607C up to receive electronic bills. First and foremost, since Duke Power is not 100% certain that the subscriber 607C is a customer, the company sends a .NET Alert to the subscriber 607C informing her that "Duke Power is ready to send her electronic bills". To be safe, Duke also sends the same information in an e-mail.

Since only a few minutes have elapsed between Jane's original request to receive electronic bills, she is still online in this example and notices the messenger alert box pop up on her computer screen. The subscriber 607C clicks on the alert and is presented with a "final enrollment" screen, in this aspect preferably hosted by Duke Power. On this screen, she reads that Duke Power needs only a few extra bits of information (her social security number, for example) to complete the enrollment process. The subscriber 607C decides to enter in the final bits of required data since the concept of receiving electronic bills is still fresh in her mind. Duke Power could also obtain information about Jane from the EBPSP 601, from the .NET Profile database 1510, from the .NET Passport database 1507, and/or from a third party source.

Verifying the data supplied by the subscriber 607C, Duke Power determines that the subscriber 607C is, indeed, a customer and then presents the subscriber 607C with a copy of her current bill.

Figure 18:
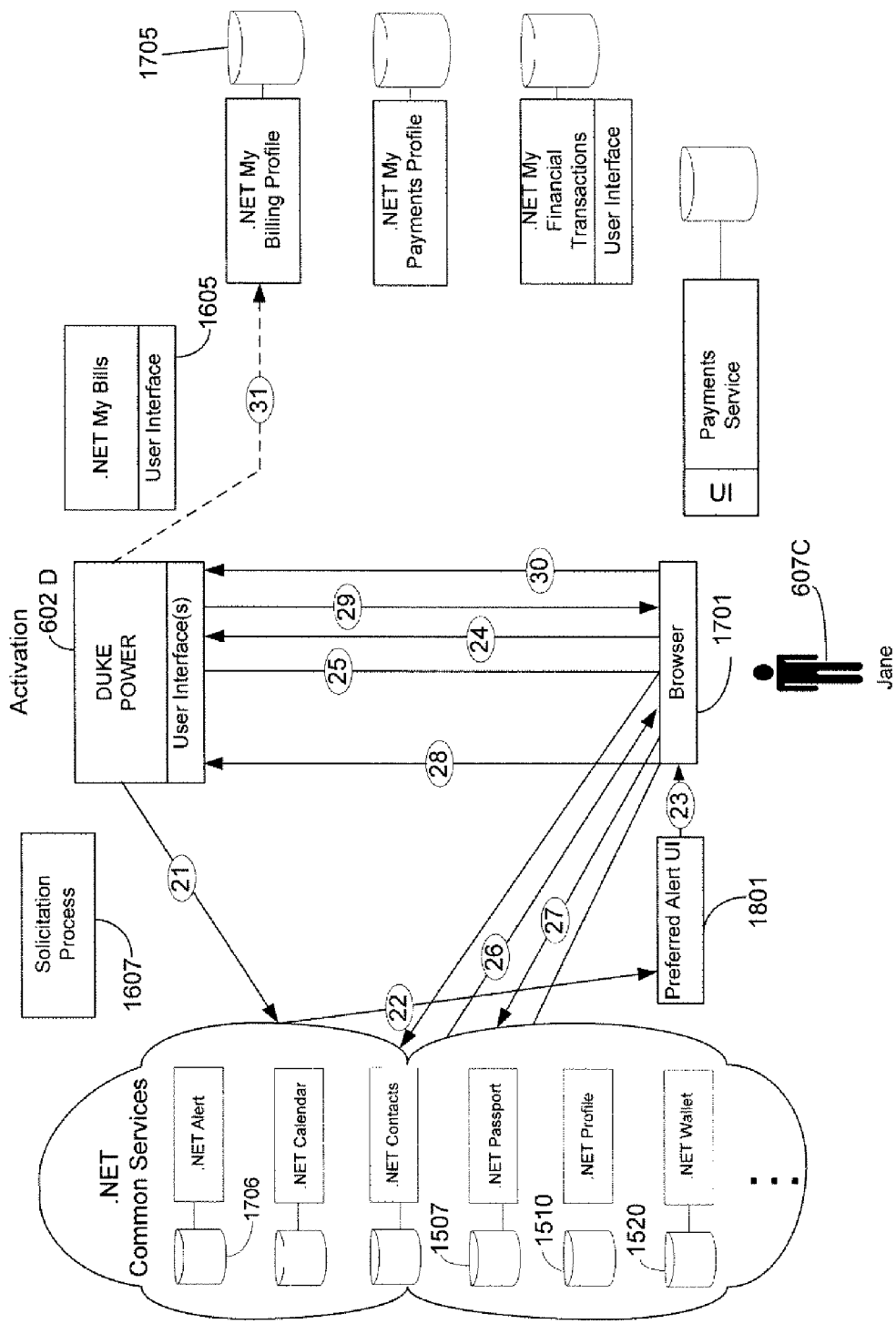
FIG. 18 is a simplified depiction of activation functionality of the Biller Discovery and Activation engine of FIG. 7B in accordance with certain aspects of the present invention.

More particularly, as shown in FIG. 18, the electronic biller 602D performs some internal matching and determines that it is likely that the subscriber 607C is one of its customers. However, it must confirm this directly with the subscriber 607C, using supplemental "shared secret data" the subscriber 607C knows, and that the electronic biller 602D also has previously stored in association with the customer it thinks is the subscriber 607C. It is presumed that the .NET My Bills alert context can "span over" to the electronic biller (so that the electronic biller 602D does not have to route a notification request through .NET My Bills, which may certainly be an alternative).

At detail 21, Duke Power initiates a notification to the subscriber 607C that it thinks it has matched her, but confirmation is first needed before she is activated to receive bills electronically. This notification is directed to Jane's Passport identity via the .NET Alert service.

.NET Alert forwards the notification to Jane's preferred alert UI 1801 (again, it is assumed this is .NET Messenger and that she is currently logged on), as shown in detail 22. At 23, the subscriber 607C activates a link, and a browser window 1701 is launched.

Jane's browser 1701 is directed to the Web site of Duke Power 602D, and the Web site detects that no authentication credentials are present (in .NET, user direction to "remember" past authentications is site-specific so the subscriber 607C must authenticate herself at the very least the first time she visits each of .NET My Bills and every electronic biller site), detail 24.

The electronic biller 602D redirects Jane's browser to .NET Passport for authentication, detail 25. As shown in detail 26, .NET Passport presents a screen to the subscriber 607C asking her to authenticate herself (at a minimum, type in a password), and whether she wants to have this "remembered" for future sessions from this computer/browser at this Web site.

The subscriber 607C responds. For this example it is assumed that she also indicates that she wants her credentials "remembered" so she doesn't have to go through this every time, detail 27. .NET Passport updates its local repository 1507, provides "cookies" back to Jane's browser 1701, and redirects Jane's browser 1701, back to the Duke Power site. The redirection includes an encrypted authentication query string that indicates to the electronic biller 602D that the subscriber 607C has been successfully authenticated, as shown at 28.

At detail 29 the electronic biller 602D presents the subscriber 607C a screen requesting the "shared secret data". Also, additional billing-specific profile information may be requested. The subscriber 607C responds (and presumably successfully confirms the "shared secret"), detail 30. If any additional billing-specific information was collected, Duke Power may beneficially update/extend the data in .NET My Billing Profile data repository 1705, detail 31.

It is assumed in this example that no bill is available for immediate presentation. A few weeks pass and the end of the billing cycle rolls around. It is time for the electronic biller 602D to send the subscriber 607C her new bill. Once again, the electronic biller 602D sends the subscriber 607C a .NET Alert informing her that a new bill is available. This time, however, the subscriber 607C is not online and (obviously) does not receive the alert via her Windows Messenger client. Rather, the .NET Alert system routes the message to her e-mail address and signals her pager. (The subscriber 607C specifically requested this behavior.)

The subscriber 607C receives the page, notes the fact that she received a bill, but takes no action to receive the bill at this point.

A couple more weeks pass by and Duke Power notices that the subscriber 607C has not viewed, and more importantly, paid her new bill. In fact, the due date of the bills is only a few days away. Duke Power, not wanting customers to be late with payments, sends yet another .NET Alert to the subscriber 607C informing her of the almost past due bill. This time the subscriber 607C is online and sees the .NET Alert popup. The subscriber 607C clicks on the .NET Alert message text to view the bill.

Activating a link in the .NET Alert message text takes Jane's browser 1701 to Duke Power's Web site where she can view her new bill. Since the subscriber 607C uses .NET Passport for authentication and also has chosen the "automatic sign in" option, the electronic biller 602D does not have to prompt the subscriber 607C for her user ID and password. Rather, the electronic biller 602D can simply verify the credentials received automatically with Jane's browser request and determine whether or not this is the "same Jane" as in the original signup process. Also, it should be understood that even if the subscriber 607C had not opted to automatically sign in using Passport, she would still only have to supply her Passport user ID and password, not some user ID and password used only at Duke Power. Of course, an electronic biller 602A-N could require entry of password ID for site access.

Figure 19:
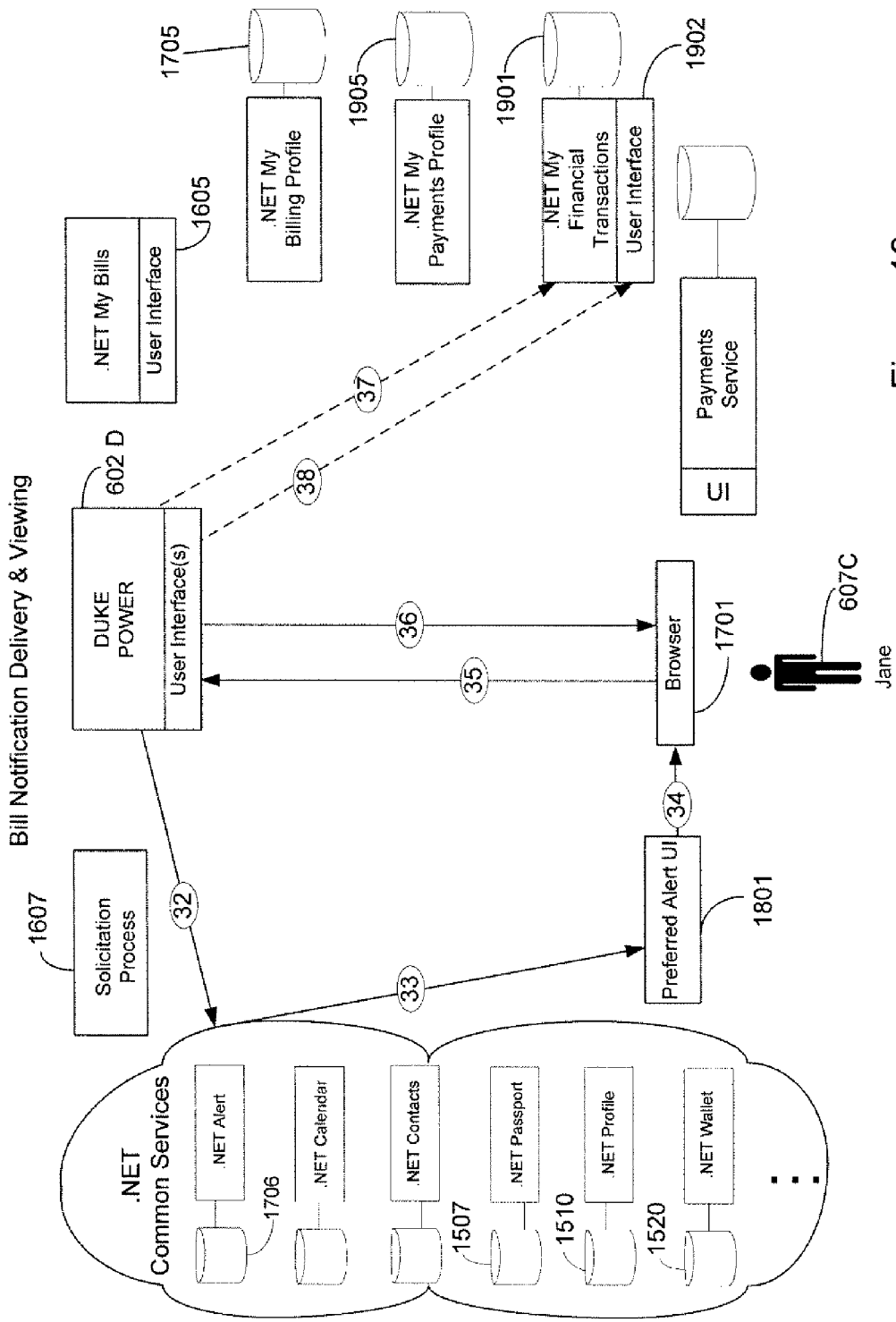
FIG. 19 is a simplified depiction of bill notification delivery and viewing functionality of the Biller Discovery and Activation engine of FIG. 7B in accordance with certain aspects of the present invention.

More particularly, as shown in FIG. 19, now the subscriber 607C is confirmed by Duke Power 602D and is therefore "activated" to begin viewing bills. An assumption with Biller Discovery and Activation is that an electronic biller (or some proxy for the electronic biller such as EBPSP 601) will host bills to be viewed over a Web browser. As bills are available (either immediately or at the next billing cycle), Duke Power must notify the subscriber 607C and support her viewing of her data. At detail 32, Duke Power initiates a notification to the subscriber 607C that a bill is available for her to view through the .NET Alert service.

As in prior steps, .NET Alert directs the notification to Jane's preferred alert UI 1801, which in this example is assumed to be .NET Messenger, detail 33. Assuming Jane is logged on, she selects an embedded link, and a browser window is launched, detail 34. Jane's browser 1701 is directed to the Duke Power Web site. The redirection includes an encrypted authentication query string that indicates previous successful .NET Passport authentication from this computer/browser for this specific site. Furthermore, the URL included in the embedded link provided by the Duke Power preferably includes a parameter that indicates the specific bill to be presented to the subscriber 607C, detail 35.

At shown at detail 36, the electronic biller 602D presents the bill to the subscriber 607C. The electronic biller 602D may log a reference to the bill (and status as "viewed") in transaction history 1901 maintained by a general .NET My Financial Transactions service, detail 37. The subscriber 607C may choose to view transaction history and be redirected to the UI 1902 offered by .NET My Financial Transactions, detail 38.

After viewing her bill, the subscriber 607C decides to pay it. Via a Web interface supplied by Duke Power, the subscriber 607C gives permission for the electronic biller 602D to query her .NET Wallet service for her bank account information, stored in database 1520, which Duke Power proceeds to do. Finally, when the payment date arrives, the ACH record is created by the electronic biller 602D and is included in a transaction file sent daily to Duke Power's corporate bank. The subscriber 607C has now paid her bill.

Figure 20:
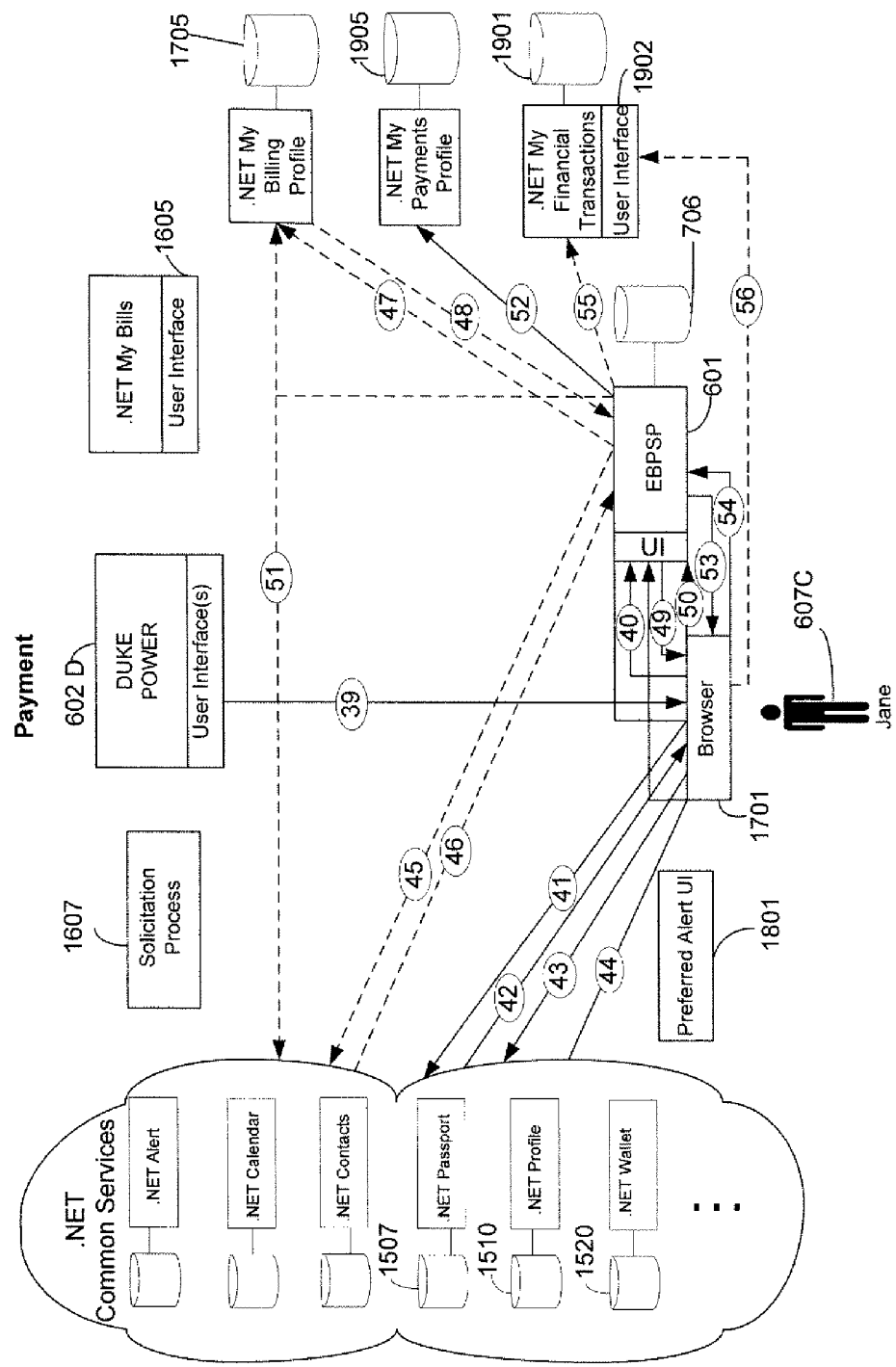
FIG. 20 is a simplified depiction of payment functionality of the Biller Discovery and Activation engine of FIG. 7B in accordance with certain aspects of the present invention.

Alternatively, as shown in FIG. 20, it is assumed that the electronic biller 602D, rather than handling the payment UI and payment processing itself, has a relationship with the EBPSP 601 which presents a UI to the subscriber 607C and services her payment request, perhaps via the Universal Payment functionality described above, or perhaps via a traditional payments engine. In this example it is assumed that the subscriber 607C has not yet enrolled with EBPSP 601.

In detail 39 Duke Power presents a link to the subscriber 607C to EBPSP 601. The presented bill could include a link directly to the payment functionality of the EBPSP 601. The link may beneficially include as parameters key elements of the payment request (e.g., amount, date, payee). The subscriber 607C follows the link to a UI of EBPSP 601, detail 40. The biller-supplied (payment request-specific) parameters accompany the browser redirection. However, since this is the subscriber's first time at the payment functionality of the EBPSP 601, no authentication credentials for this EBPSP 601 site are provided.

The EBPSP 601 redirects Jane's browser to .NET Passport for authentication, detail 41. .NET Passport presents a screen to the subscriber 607 asking her to authenticate herself (at a minimum, type in a password), and whether she wants to have this "remembered" for future sessions from this computer/browser at the EBPSP 601 site, detail 42.

The subscriber 607C responds at detail 43. Again, it is assumed that she wants her credentials "remembered". .NET Passport updates its local repository 1507, provides "cookies" to Jane's browser 1701, and redirects Jane's browser 1701 to the EBPSP 601 site. The redirection includes an encrypted authentication query string that indicates to the EBPSP 601 that the subscriber 607C has been successfully authenticated, detail 44.

As shown in detail 45, the EBPSP 601 may request any available profile information on the subscriber 607C from .NET Profile database 1510 (could be in .NET Passport database 1507).NET Profile (or Passport) returns any available profile information on the subscriber 607C to the EBPSP 601, detail 46. At detail 47 the EBPSP 601 may also request any available billing-specific information on the subscriber 607C from .NET My Billing Profile 1705. .NET My Billing Profile returns any available profile information on the subscriber 607C to EBPSP 601, detail 48. Preferably all of this identifying information is stored by processor(s) 703 in data repository 706.

The EBPSP 601 presents the subscriber 607C with an enrollment screen that contains any profile information retrieved from .NET Profile/Passport and/or .NET My Billing Profile, allows the subscriber 607C to change any of this, and perhaps further request some additional payments-specific profile information (e.g., funding account information), detail 49. The subscriber 607C, at a minimum, provides the necessary supplemental payments-specific profile information and optionally updates other profile information, detail 50.

As necessary, the EBPSP 601 updates .NET Profile/Passport and/or .NET My Billing Profile with received updates, detail 51. At detail 52, the EBPSP 601 also updates a .NET My Payments Profile 1905, which could be a part of data repository 706, with the supplemental payments-specific information (note this could be directed to .NET Wallet, depending on the latter's ability to support DDA information, as well as other data repositories).

Now the subscriber 607C is "enrolled" and can be presented a payment screen for modification/confirmation. In future payment handoffs, the enrollment steps outlined above will be unnecessary, as will be the authentication steps through .NET Passport if the subscriber 607C has indicated that credentials be remembered.

At detail 53, the EBPSP 601 presents the subscriber 607C with a payment request screen pre-populated with the payment information "handed off" from Duke Power, if any. The subscriber 607C modifies the payment request as allowed and desired, and submits it to the EBPSP 601 for processing, detail 54. After validation and acceptance, the EBPSP 601 may log a reference to the payment request (and status as "accepted") in transaction history 1901 maintained by a general .NET My Financial Transactions service, detail 55. As shown at detail 56, the subscriber 607C may choose to view transaction history and be redirected to the UI offered by .NET My Financial Transactions 1902. Additionally, the payment request itself may be stored for later processing. Information associated with the payment can also be stored locally by the EBPSP 601.

After signing up for several more electronic bills from other of electronic billers 602A-N and using the service for a number of months, the subscriber 607C finds that she really likes using the service and that it truly makes managing her finances easier. One thing that she really likes is the fact that all of her online financial transactions are tracked in one place, this includes both electronic bill payments and purchases made at retail sites. One approach may be to configure her .NET Wallet to query the financial institution at which she maintains her deposit account(s) so that her paper checks and debit/ATM card purchases can be tracked as well. Another approach may be to leverage the .NET My Financial Transactions service described above.

Outlook XP, which uses the .NET My Calendar service for data storage, interfaces seamlessly with the new .NET My Bills service. Reminders and calendar entries reflecting upcoming bills and scheduled payments show up automatically both in Outlook and wireless devices.

In further reference to FIGS. 17 through 20 it is important to understand that some personal data that is being stored in the .NET My Billing profile database 1705 is much more sensitive than other information. For example, social security number is more sensitive than name and address information and would have correspondingly higher levels of security and restricted access than other information. Of course, this applies to any stored personal data described herein. Access to any stored personal information can be tiered such that some entities are able to access move sensitive information, while other entities cannot. Further, more sensitive information can be stored separate from less sensitive information. Also, different entities can be allowed to write to stored personal information, with some entities able to write sensitive information, while other entities can only write more generic information.

In FIG. 17, it should be noted that the communication in detail 20 (from the .NET My Bills service to the electronic biller) is a push, in that the .NET My Bill service is pushing activation data to the electronic biller. This is in contrast to detail 29 of FIG. 18 where the electronic biller 602D needs further information from the subscriber 607C in order to activate an e-bill. Here the electronic biller 602D prompts the subscriber 607C for more information, and in detail 30 the information is provided by the subscriber 607C to the electronic biller 602D in response to the request.

Both the Common Enrollment and Bill Retriever Engine 756 and the Bill Discovery and Activation Engine 758 facilitate subscribers 607A-N finding available electronic bills having bills available for electronic presentment and facilitate incremental profile buildup, with the Biller Discovery and Activation Engine 758 leveraging a technical framework separate from that of a EBPSP 601, in this example, that of The Microsoft Corporation. As described above, the Common Enrollment and Bill Retriever Engine 756 matches subscriber information with Biller data that is preferably hosted by the EBPSP 601 system 700, though the biller data could, as desired, be hosted by an electronic biller 607A-N. On the other hand, in accordance with the Biller Discovery and Activation Engine 758, subscriber data is preferably matched by electronic billers with biller data that is not hosted by the EBPSP 601, though the data could be hosted by the EBPSP 601.

In the processing of the Common Enrollment and Bill Retriever Engine 756, preferably the EBPSP 601 performs the matching of subscribers to electronic billers and any additional matching information is gathered by the EBPSP 601. In the processing of the Biller Discovery and Activation Engine 768, preferably an electronic biller 602A-N performs the matching, and if additional matching information is needed, an electronic biller 602A-N preferably gathers such from a subscriber 607A-N or other source, which could be the EBPSP 601. Also, the Easy Payee Engine 764, to be discussed further below, as well as other engines and functionality described herein, could be utilized in conjunction with either of Common Enrollment and Bill Retriever Engine 756 or the Biller Discovery and Activation Engine 768.

The Common Enrollment and Bill Retriever Engine 756 is built around a single session framework, while the Biller Discovery and Activation Engine 768 contemplates multiple indirect biller-subscriber sessions. Also, in the functionality of each of engines 756 and 768 the EBPSP 601 is the central entity in providing such functionality, with a Bill Retriever user interface 1003 launched after Bill Retriever functionality 756B is invoked, while a Biller Discovery and Activation user interface is launched before Biller Discovery functionality is invoked. Of course as desired, different aspects of the Common Enrollment and Bill Retriever Engine 756 and the Biller Discovery and Activation Engine 768 could be blended in different variations than those described above.

Matching

Figure 21:
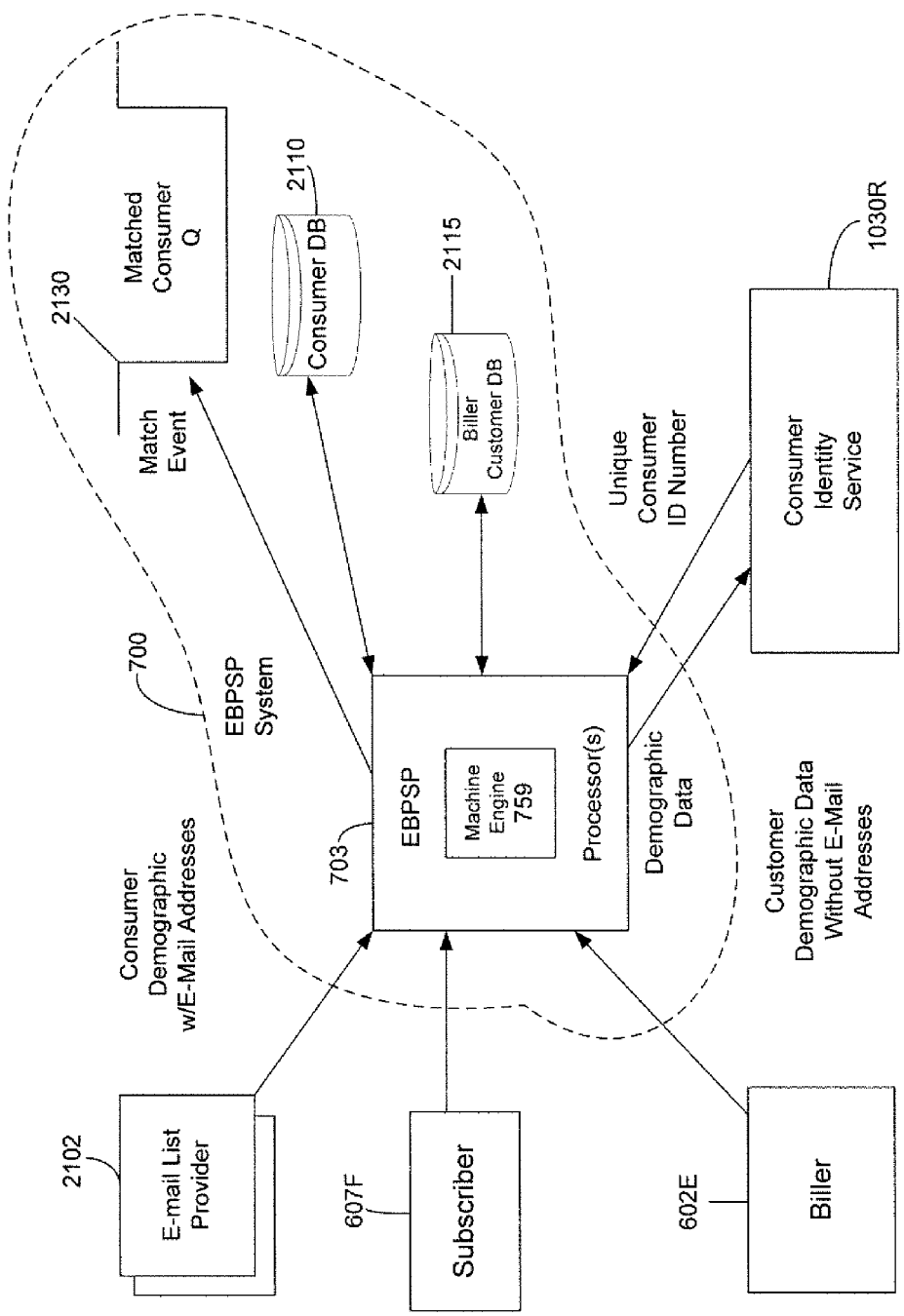
FIG. 21 is a simplified depiction of functionality of the Matching engine of FIG. 7B in accordance with certain aspects of the present invention.

FIG. 21 depicts yet another aspect of the present invention, known as the Matching Engine 759. FIG. 21 shows the EBPSP system 700, the EBPSP processor(s) 703, and the Matching Engine 759, which is a part of processor(s) 703. Also shown in FIG. 21 are one or more e-mail list providers 2102, which are third party services 611A-N, an electronic biller, in this example electronic biller 602E, a subscriber, in this example subscriber 607F, and a consumer identity service 1030R, which is also a third party service 611A-N.

In one variation of the functionality of the Matching Engine 759, the electronic biller 602E transmits to the EBPSP 601, via the network 600, a file containing biller customer demographic data without e-mail addresses. This transmission is made between communications interface(s) 812A of the electronic biller system 800A and communications interface(s) 712B of the EBPSP system 700. Separately, asynchronously, an e-mail list provider 2102 provides a clean list of e-mail addresses along with consumer demographic information to the EBPSP 601, preferably via the network 600. The Matching Engine 759 causes communications interface(s) 712B to transmit each of these lists to the consumer identity service 1030R via the network 600, perhaps as soon as either is received, or perhaps at later times, which could be determined by an electronic biller with which customer information is associated. The function of the consumer identity service 1030R is to process consumer demographic information and the customer demographic information, such as names and addresses, supplied by the EBPSP 601 and may also normalize the data. The consumer identity service 1030R returns unique consumer identifiers for each consumer based upon the processing of consumer demographic information, and unique customer identifiers for each of customer based upon the processing of the customer demographic information.

As an example, the electronic biller 602E could be Georgia Power, and information received from Georgia Power could be a bill for a John R. Smith, Jr., of Duluth, Georgia, having account No. XYZ, and owing $75.00. The EBPSP 601 later receives a list from e-mail list provider 2102 that includes information identifying an e-mail address associated with a John Smith of Flower Mound, Tex. The EBPSP processor(s) 703 transmits part of or all the received information from Georgia Power and all or part of the received information from the e-mail list provider 2102 to the consumer identity service 1030R via the network 600, utilizing communications interface(s) 712B. The consumer identity service 1050R processes the received information, based upon maintained historical information, typically addresses, to produce a unique identifier based upon the Georgia Power information and a unique identifier based upon the e-mail list provider 2102 information. The consumer identity service 1030R returns to the EBPSP 601 the unique customer and consumer identifiers to the EBPSP 601.

The Matching Engine 759 stores the information from the e-mail list provider 2102 and from the electronic biller 602E in one or more databases, each of which may be a data repository 706. For example, a consumer database 2110 may be utilized. The consumer database 2110 stores consumer information, regardless from what source the EBPSP 601 obtains that consumer information. Consumer information includes subscriber identifying information received from subscribers 607A-N as well as information obtained from an e-mail list provider 2102. The Matching Engine also stores the received unique consumer identifiers in the consumer database 2110 in association with the consumer information from which each respective unique consumer identifier is produced by the consumer identity service 1030R. This consumer database 2110 could be the subscriber profile database 1037 discussed above, however, this is not typically preferable.

The customer information received from the electronic biller 602E, which can include an account number assigned to a customer of electronic biller 602E by electronic biller 602E, is stored by the Matching Engine 759 in an electronic biller customer database 2115, which could be the database 1010 discussed above. All unique customer identifiers received from the consumer identity service are also stored in the electronic biller customer database 2115, in association with the customer information identifying the customer with which each is associated.

The Matching Engine 759 compares the unique consumer values with the unique customer values to determine if any unique consumer value matches any unique customer value. Regardless of when the lists are received, and regardless of when they are supplied to the consumer identity service 1030R, when a match is recognized by the Matching Engine 759, the Matching Engine 759 generates a match event. The Matching Engine This match event is then stored in a matched consumer queue 2130 for processing by other engines described herein. It will be appreciated that the Matching Engine 759 can be utilized in conjunction with the Common Enrollment and Bill Retriever Engine 756 and the Biller Discovery and Activation Engine 763, discussed above, to determine exact and probable matches. In such a case, the information supplied by the online consumer can be used in lieu of information in a consumer database, and/or information at the EBPSP or biller can be used in lieu of information in a biller customer database. The Messaging Engine 762, to be discussed further below, utilizes the stored match events to inform a consumer, which may be one of the subscribers 607A-N, of the availability of electronic bill presentment of bills of a matched electronic biller 602A-N.

In another variation of the functionality of the Matching Engine 759, the Matching Engine 759 is initiated at the behest of the subscriber 607F. That is, to find electronic billers for the subscriber 607F. In such a case, the Messaging Engine would not be utilized. Subscriber demographic data, obtained from the subscriber 607F and/or one or more other entities, is sent to the consumer identity service 1030R. Consumer Identity service 1030R returns a unique consumer value for subscriber 607F. At least one file containing electronic biller customer demographic data, with or without e-mail addresses, is supplied to the EBPSP 601 by either an electronic biller or another entity. This information is also sent to the consumer identity service 1030. The consumer identity service returns a plurality of unique customer values. The Matching Engine 759 compares the unique customer value of subscriber 607F with the plurality of unique customer values to detect a match. If a match is found, the subscriber can be informed of the availability electronic presentment of bills of a particular electronic biller 602A-N on which a match was found. In either variation of the functionality of the Messaging Engine 759, upon discovering a match to a subscriber or consumer, that subscriber or consumer could automatically be activated for receipt of electronic bills, or automatically be sent an electronic bill based upon either an the e-mail address obtained from an e-mail list provider, or based upon information already maintained by the EBPSP 601.

Auto Activation

Figure 22:
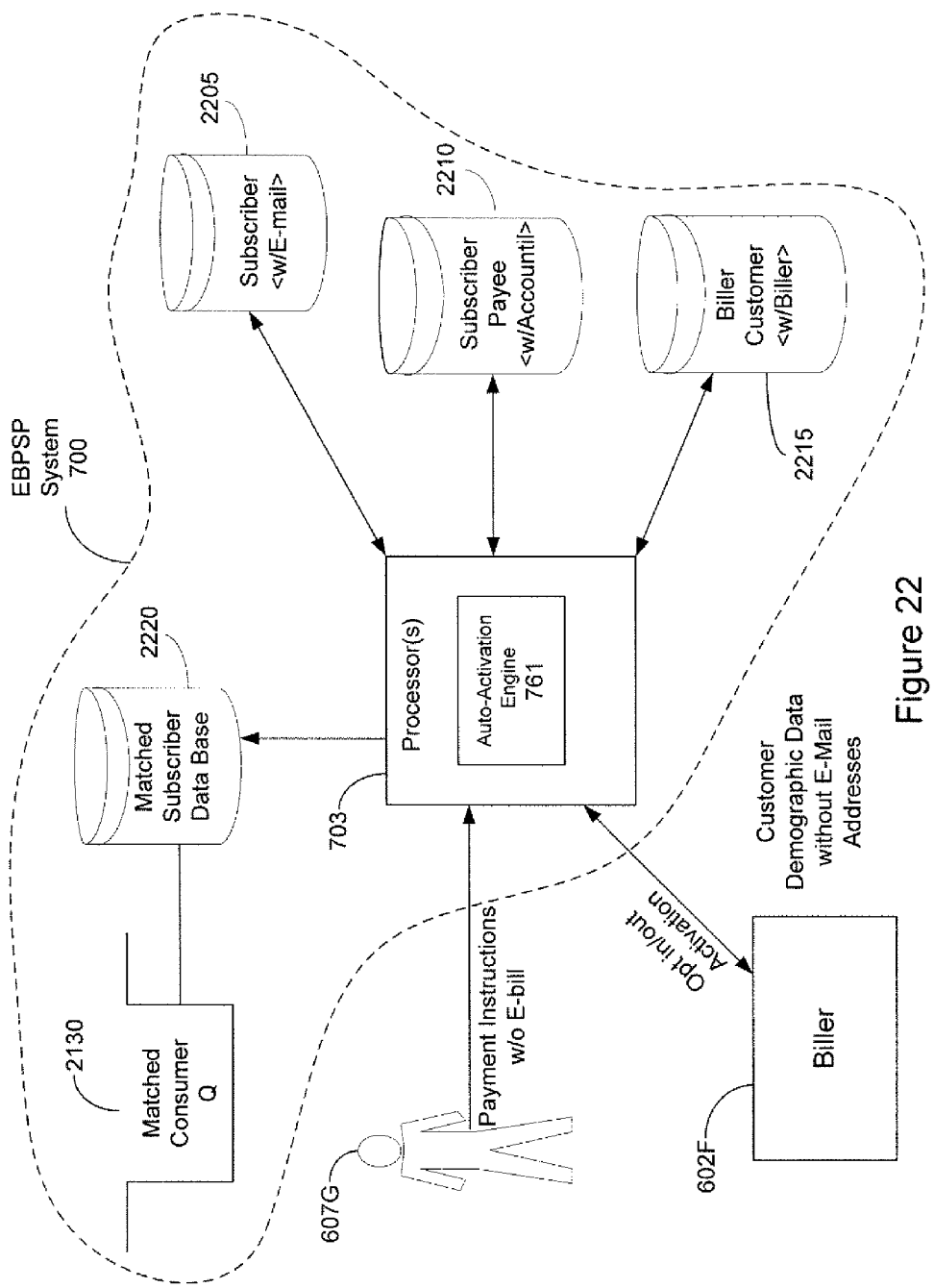
FIG. 22 is a simplified depiction of functionality of the Auto Activation engine of FIG. 7B in accordance with certain aspects of the present invention.

FIG. 22 depicts functionality of the Auto Activation Engine 761, also known as payor matching. In the example of FIG. 22 subscriber 607G directs the EBPSP 601 to pay an electronic biller, in the example electronic biller 602F. However, that payment is a manual payment instruction not based upon a received electronic bill. In other words, the subscriber 607G is paying a paper bill received from electronic biller 602F. Therefore, the electronic biller 602F in this scenario is not deriving full benefit of the services offered by the EBPSP 601 because the electronic biller 602F must still generate and present paper bills for customers of that electronic biller that do not receive electronic bills.

The electronic biller 602F provides to the EBPSP 601, via the network 600, customer demographic information, preferably along with account numbers assigned by the electronic biller 602F to its customers. This information will not have e-mail address associated with it. The Auto Activation Engine 761 stores information about enrolled subscribers in a subscriber database 2205, including e-mail addresses, which is a data repository 706. Database 2205 could be the subscriber profile database 1037 discussed above. Information indicating subscriber/payee relationships is stored in subscriber payee database 2210 by the Auto Activation Engine 761. That is, an association between the subscriber 607G and the billers he or she pays, via the EBPSP 601, including electronic biller 602F from whom electronic bills are not received, is known by the EBPSP 601. Each time subscriber 607G makes a payment, information associated with that payment, including payee name, is stored in the subscriber payee database 2210. Database 2210 could as, if desired, store information identifying set up payees of the subscriber 607G. The subscriber payee database 2210 is also referred to as a payments database.

The information received from the electronic biller 602F is stored in an electronic biller customer database 2215, which is a data repository 706, and which could be the billing database 1010 discussed above. The Auto Activation Engine 761 compares the information in the subscriber payee database 2210 with the information contained in the biller customer database 2215 to match electronic billers 602A-N to subscribers 607A-N. Based upon the information associated with the subscriber 607G manual payment to electronic biller 602F, the Auto Activation Engine 761 matches subscriber 607G with electronic biller 602F. It should be noted that this match is preferably based on the information received from the electronic biller 602F information, rather than on information retrieved from any consumer identity service, although this is not mandatory.

Information identifying the match between subscriber 607G and electronic biller 602F is stored in a matched subscriber database 2220, which also is a data repository 706, by the Auto Activation Engine 761. This stored match information is then be extracted to the matched consumer queue 2130 and used to message the subscribers 607G. This subscriber message takes the form of an opt-in or an opt-out invitation for electronic billing transmitted to the subscriber 607G via the network 600. Opt-in or opt-out activation information received from the subscriber 607G is then provided to electronic biller 602F so that the electronic biller 602F can relate subsequent payments with electronic bills, and potentially in the future cease paper billing altogether. Opt-in and opt-out Messages will be discussed further below.

Especially beneficially, because of the stored subscriber/payee relationship information 2210 a subscriber 607A-N can be matched with an electronic biller 602A-N as soon as that electronic biller provides information for storage in the electronic biller customer database 2215. Further, as new electronic billers supply information for storage in the electronic biller customer database 2215, those new electronic billers can immediately be matched to existing subscribers. Also, as should be clearly apparent, the Auto Activation Engine 761 can be utilized with both the Common Enrollment and Bill Retriever Engine 756 and the Biller Discovery and Activation Engine 758 to identify electronic billers 602A-N of those of enrolled subscribers 607A-N that have made at least one payment to an electronic biller 607A-N supplying customer identifying information to the EBPSP 601. It will also be recognized that the Auto Activation Engine is only incrementally differently than the Matching Engine.

Messaging

Figure 23:
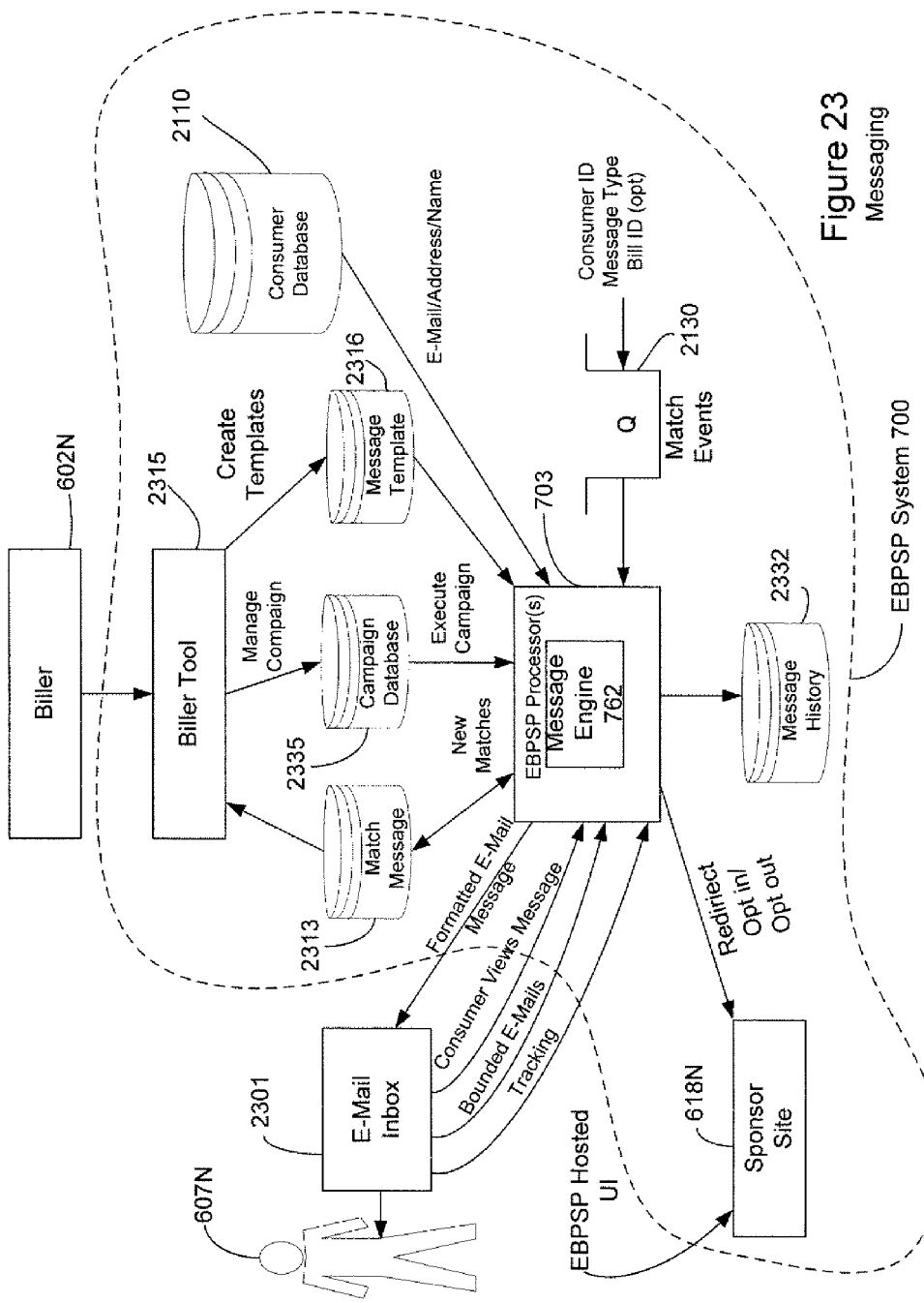
FIG. 23 is a simplified depiction of functionality of the Messaging engine of FIG. 7B in accordance with certain aspects of the present invention.

FIG. 23 depicts the functionality of the Messaging Engine 762. Shown in FIG. 23 is a subscriber, in this example subscriber 607N, who is directly interacting with an e-mail inbox 2301, the Messaging Engine 762, a biller tool 2315, an electronic biller, in this example electronic biller 602N, and perhaps a sponsor Web site, in this example sponsor 618N.

Once the Matching Engine 759 or the Auto Activation Engine 761 makes an addition to the matched consumer queue 2130, this event is processed by Message Engine 762 and stored into a match message database 2313 that maintains information about new matches. It should be noted that entries in the matched consumer queue 2130 could, if desired, be subjected to other processing than that of the Messaging Engine 762.

The electronic biller 602N, utilizing the biller tool 2315, defines message criteria. Defined are message templates that indicate the formatting of invitational messages or promotional messages. Message templates are stored in database 2316, which is a data repository 706. This includes stock text, fields that will be substituted with other information such as a subscriber's name, branding information, locations of bit maps and other images. The message template is maintained by the electronic biller 602N through biller tool 2315. The electronic biller 602N can make changes to a template at any time. A single electronic biller can maintain multiple templates.

The electronic biller 602N can also use the biller tool 2315 to review sets of messages to subscribers that have been created based upon the processing of the Matching Engine described above and are available for transmission to subscribers 607A-N. The electronic biller 602N has the ability to control the volume of messaging over time. In support of this, the EBPSP 601 provides the ability for electronic biller 602N to define criteria for marketing campaigns.

Defined criteria for marketing campaigns can consist of a start date and end date for the campaign, a total number of messages to be sent for the campaign, some indication of a geographical area that the campaign will reference such as ZIP code, number of messages per day, the time messages will be transmitted, as well as demographic information used to identify which matched subscribers will receive a message. The electronic biller 602N defines the information necessary to execute a campaign. Campaign definitions are stored in campaign database 2335 that is a data repository 706. The electronic biller 602N indicates when a campaign is ready for execution.

At the defined time for execution, the Messaging Engine 762 retrieves a campaign definition and start execution of the campaign. A campaign is executed by retrieving matched messages from the match message database 2313, campaign definition from the campaign database 2335, the appropriate message template from template database 2316, and also pulling information from the consumer database 2110, such as name, address, or other pieces of information that might be substituted into the message. The message template, match message information, and the consumer database information will all be used by the Message Engine 762 to format an e-mail message according to a defined template. The Message Engine 762 will then transmit the formatted e-mail message to the subscriber 607N via the network 600.

Several things will happen after the subscriber 607N views the e-mail message. The Message Engine 762 will be notified and will keep track of the fact that the message has been viewed, as well as keep track that a message has been sent. If the message is undeliverable, for any of several reasons such as a bad e-mail address, this will be noted in a message history 2332, which also stores other message related information, so as no attempt to use that e-mail address in the future will be made. An e-mail message could also be undeliverable simply because a subscriber's e-mail service is not available at a particular time, in which case the message will be re-tried several times until the message is deemed undeliverable. Bounced e-mails will come back to the message Engine 762 and be processed accordingly.

A transmitted message itself will contain links. The link can be, as desired, either an opt-in or opt-out link for a particular e-bill, as per electronic biller 602N definition. At any rate, as links are selected by the receiving subscriber 607N a Web browser of the subscriber 607N is directed to the Message Engine 762. The Message Engine 762 will then store an indication that a link has been followed and then re-direct the linking subscriber 607N to the appropriate EBPSP/Biller/Sponsor hosted user interface.

An opt-out invitational message is sent in order to notify the subscriber 607N that if the subscriber 607N does not request to not receive electronic bills, he or she will be activated for electronic billing and will begin to receive electronic bills of a matched electronic biller, in this example electronic biller 602N. This is executed by first transmitting the formatted e-mail with an opt-out invitation. If the receiving subscriber 607N does not respond to this message within a certain period of time, a follow-up message is sent. The number of follow-up messages can be configured on a biller-by-biller basis, as will be understood by the discussion of campaign definition above. In an opt-out campaign, if the subscriber 607N does not respond to the opt-out message, or the follow-ups, then the subscriber 607N will be activated for electronic billing. If the subscriber 607N activates an opt-out link in the message, the Message Engine 762 will note that this link has been followed and then redirect the linking subscriber 607N to a EBPSP hosted UI in order for the subscriber 607N to perform the opt-out so that he or she will not receive electronic bills.

An opt-in invitation message is sent in order to notify the subscriber 607N that electronic billing is available from a matched electronic biller. However, the subscriber 607N must actually come through an EBPSP user interface and opt-in to receive electronic billing. An opt-in invitational e-mail message is formatted to include an opt-in link. Once the message is sent to the subscriber 607N, an opt-in link must be selected for that subscriber to activate electronic bill presentment. Selection of the opt-in link will be noted by the Message Engine 762 and then the subscriber's browser will be redirected to an appropriate sponsor site, electronic biller site, or EBPSP site in order to activate electronic billing. Regardless of whether it is an opt-in or an opt-out campaign, activation results in an electronic bill preferably being immediately viewable. It should be noted that the EBPSP 601 is not limited to the use of the Messaging Engine in informing subscribers 607A-N of the availability of electronic bill presentment, or for any other type of communication with subscribers 607A-N.

Easy Payee

As discussed above with reference to FIG. 5, the current payee set up process requires a subscriber to have information that is provided on paper bills available for reference to set up billers as payees. The information required includes biller name, account number remittance center address, phone number, etc. Another aspect of the present invention makes the payee set up process faster and easier for a subscriber, subscriber 607M in this example. The Easy Payee Engine 764 identifies payees and/or billers, which may or may not be electronic billers. This functionality can also be utilized with both the Common Enrollment and Bill Retriever Engine 756 and Biller Discovery and Activation Engine 758 to identify potential electronic billers of a subscriber and even to exactly match electronic billers with a subscriber. The following discusses Easy Payee in the context of setting up payees only, but will be understood to be applicable to other situations.

The Easy Payee Engine 764 includes a Set-up Wizard that, among other functions, pre-populates payee set up pages based on information obtained from EBPSP 601 (internal) or third party data sources in on-line scenarios. These third party data sources are third party services 611A-N of FIG. 6. The Set-up Wizard user interface, which is presented during an on-line session, is designed to take advantage of high subscriber interest in EBP at the point of initial enrollment. That is, the Set-up Wizard facilitates helping subscribers to access EBP services as soon as they are enrolled. The Set-Up Wizard user interface is transmitted to the subscriber system 900 of subscriber 607M by communications interface(s) 712A via the network 600. The Set-up Wizard is received by communications interface(s) 912 and presented to the subscriber 607M by at least one user I/O 910. The Easy Payee Engine 764 can also be used as part of batch enrollment, although with a different user interface than the Set-up Wizard.

Figure 26:
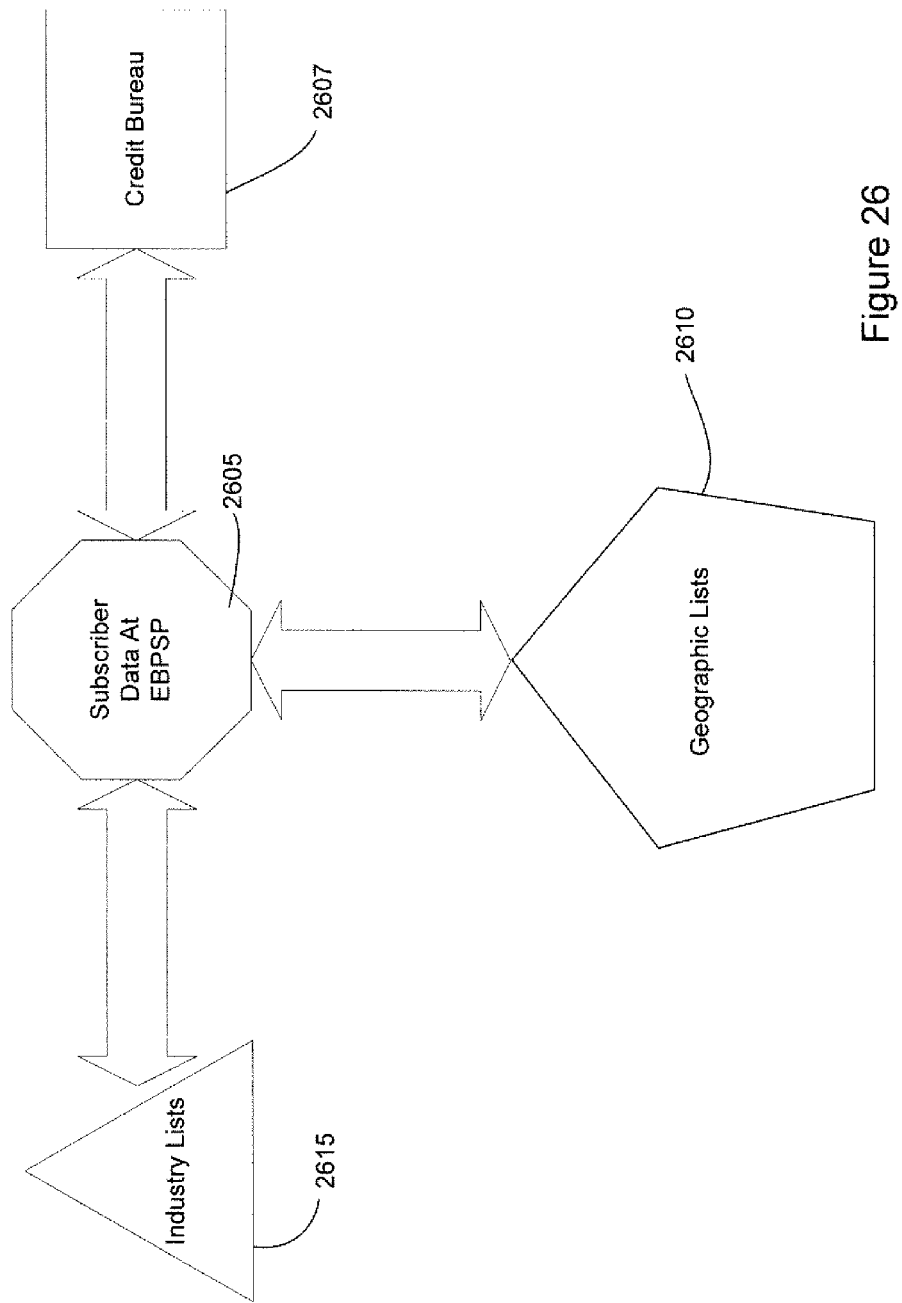
FIG. 26 is a simplified depiction of some data sources used with the Easy Payee engine of FIG. 7B in accordance with certain aspects of the present invention.

As shown in FIG. 26, the Easy Payee Engine 764 uses subscriber identifying information 2605 (name and address) to find potential billers and/or payees from several possible internal or third party data sources, including credit bureau data 2607, geographic lists 2610, and industry lists 2615, among possible data sources.

Figure 27:
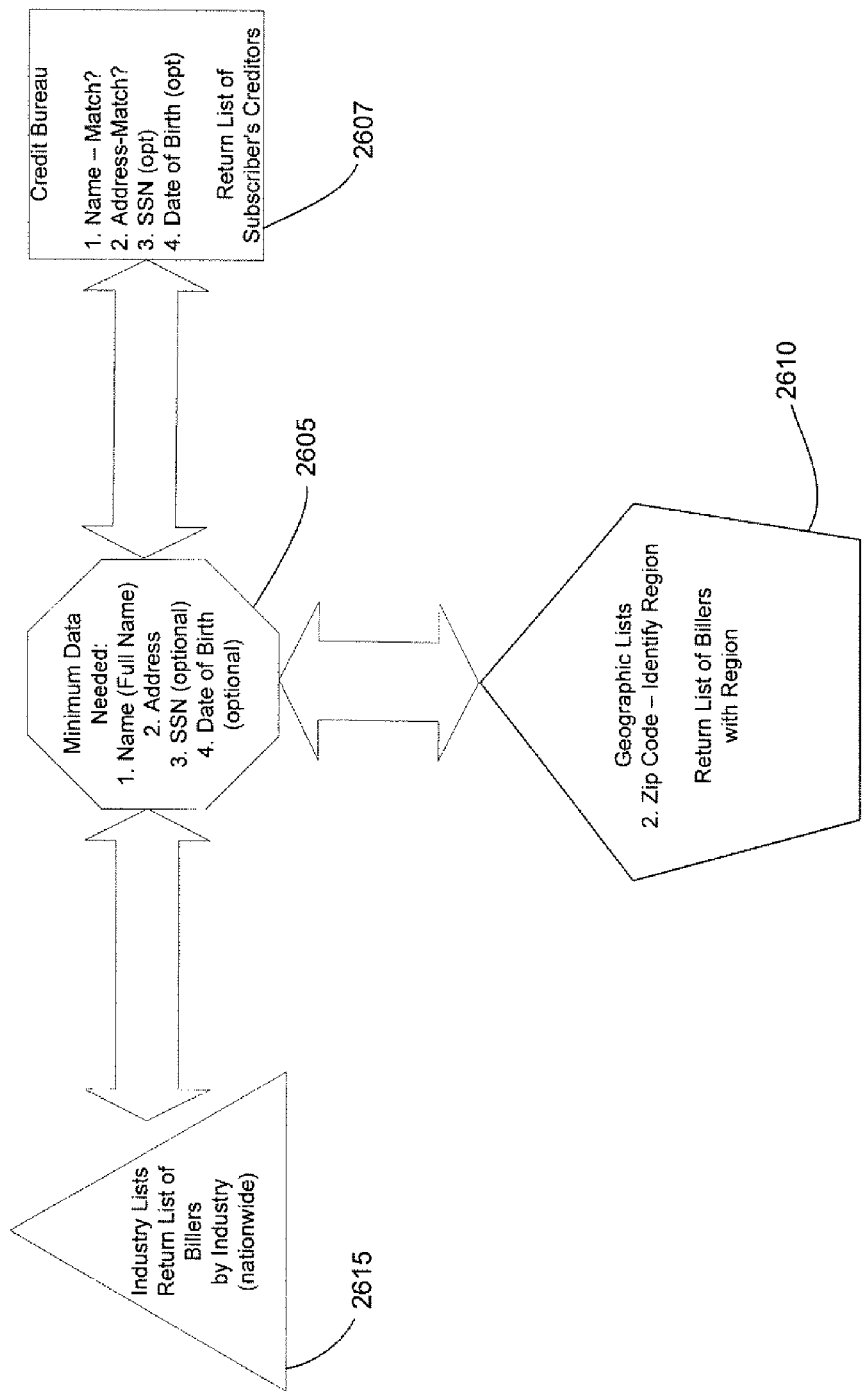
FIG. 27 is a further depiction of the use of the data sources of FIG. 26 in accordance with certain aspects of the present invention.

FIG. 27 shows subscriber data 2605 that is required to utilize some sources, and data returned by some sources. Note that data sources 2615, 2607 and 2610, as well as other data sources, can be used individually or in combination. The minimum subscriber data required by a source consists of name and address (preferably including ZIP Code), with social security number and date of birth being optional. Each of the internal or third party data sources may require a different subset of this subscriber data, or none at all.

In order to match subscriber 607M to his/her credit report utilizing source 2607, that subscriber's name and address is the minimum information needed. In the event of ambiguity, the optional data of subscriber's social security number and date of birth can be used, in addition to other information. Subscriber date of birth is usually sufficient to resolve questions of ambiguity, i.e., between John Doe, Jr. and John Doe, Sr. Once subscriber 607M is matched to a credit bureau file, the subscriber's existing payees/billers (creditors) are identified. This can be performed, as desired, by the Easy Payee Engine 764, or by the credit bureau. These creditors are typically credit-granting entities, such as mortgage lender, credit cards providers, auto loans providers, etc.

The creditor data contained in the credit bureau report can support either real time (on-line) or batch (off-line) processes for payee set up and/or electronic biller identification. In the case of an on-line session, Set-up Wizard preferably queries the subscriber 607M for confirmation of individual creditors and then sets up these as payees using information found in the credit bureau report, or even activates electronic bill presentment using information found in the credit bureau report. In the case of an off-line session, the confirmation step is deferred until the subscriber 607M initiates an on-line session via the network 600. However, payees/billers could be identified and fully or partially set up to receive payments and/or present electronic bills without subscriber 607M confirmations.

As an example of a communication with subscriber 607M upon determining a possible match from credit report information, the Set-up Wizard could query the subscriber 607M "we show that you have a mortgage with JP Morgan Chase. Is this information (account number, payment amount) correct?"

The Set-up Wizard, as desired and/or as available, can provide account numbers and payment amounts as part of this query, as this information is typically included in credit bureau report. Additionally, the subscriber may be required to confirm credit report data. Also, the Easy Payee Engine 764 could, if desired, offer to set up recurring payments (for installment loans, etc), which may require the subscriber providing funding account information if not previously provided. Because credit report information typically includes account number assigned to customers of creditors, as well as often payment address, a creditor found in a credit report can often be completely set up as a payee by the Easy Payee Engine 764, if desired. Further, if an identified creditor is a known electronic biller, that electronic bill presentment of bills of that identified creditor can be activated based solely upon information contained in a credit report.

The Easy Payee Engine 764 also creates and stores lists of companies that do business within particular geographic regions. Included in such lists can, as desired, be utility companies (power, gas, water), local telecommunications providers (cable TV, local telephone, etc.), regional retailers, regional banks, and/or other local merchants. Companies that do business nationwide will be included in industry lists, to be discussed further below. A single company can, as appropriate, appear in both geographic and industry lists.

The geographic regions can, as desired, be of varying size, including states, regions, metro areas, or cities. These regions can also, as desired, be selected based on subscriber location and company distribution to give coverage in areas where large numbers of subscribers 607A-N and companies are located. Geographic lists can also, as desired, be divided by industry. Geographic lists can be fed by both data sources internal to EBPSP system 700 and external to EBPSP system 700.

The address of subscriber 607M can, as desired, be used to select a geographic region and associated company lists, possibly through the use of subscriber ZIP code. Only the first three digits of the five-digit ZIP code might, as desired, be used, as the first digit designates a broad geographic area (i.e., zero for the Northeast) and the next two digits identify population concentrations within that broad geographic area. The final two digits identify small post offices or postal zones within larger zoned cities. This level of granularity may not be needed, but could certainly be utilized by the Easy Payee Engine 764.

Once the subscriber 607M is matched to a geographic location, Set-up Wizard presents a selection of candidate billers/payees with a presence in that location, perhaps sorted by industry, from which the subscriber 607M chooses. In one possible alternative, the subscriber 607M is matched to demographic information, based on ZIP code. This matching allows the Easy Payee Engine 764 to present candidate billers/payees that have a presence in the subscriber's area. For example, the Easy Payee Engine 764 could query the subscriber 607M "Is your electric power utility company American Electric Power (AEP)? If yes, please enter your account number. If no who is your electric power utility company (please select from the following list)?"

The Easy Payee Engine 764 also includes functionality to identify candidate billers/payees based upon a subscriber's socioeconomic status, also known as socio-demographic status. In such a case, the socioeconomic status of subscriber 607M can be inferred from the ZIP code of subscriber 607M, the credit report of subscriber 607M, or obtained from third party services 611A-N. Likewise, the socioeconomic status of a payee/biller's typical customer can be obtained from the payee/biller or from a third party service 611A-N. Based upon socioeconomic status of subscriber 607M, payees/billers typically associated with that status are identified and presented as candidate payees.

The Easy Payee Engine 764 also creates lists of companies based on industry (preferably utilizing Standard Industry Classification (SIC) codes). These industry lists could, for example, include national telecommunications providers, national retailers, major credit card companies, major banks and mortgage lenders, the lending arms of auto manufacturers, and other merchants. Companies that do business within a limited geographic region are preferably included in industry lists.

Because of the number of possible industries and related lists, an initial Set-up Wizard menu is preferably configured to query the subscriber 607M "What types of bills do you pay?" and provide a list of candidate industries, for example, Telecommunications, Retailers, Credit Card, Mortgage, and Auto Loan, from which the subscriber 607M selects. This information does not have to be gathered by the Set-up Wizard.

The subscriber 607M could, as desired, select one industry at a time, and then be prompted by Set-up Wizard to select payees/billers from a list of candidates provided by the Easy Payee Engine 764 based on available data. For example, if the subscriber 607M selects "Telecommunications", he would then be queried, "Who is your long distance phone carrier (select one from the following list: A, B, C)?"

For major credit card accounts that use a common account number scheme, a payee/biller could be identified from the subscriber's account number. In support of this functionality, the Easy Payee Engine 764 maintains a list of card issuers/ account number schemes for the credit card market. If desired, the information can be obtained from card issuers. Once the subscriber 607M selects a credit card type and enters an account number, this information will then be used to pre-populate portions of the payee set up pages, including at least the name of a card issuer. Credit cards represent a special case of the industry list.

Introduce above, the Easy Payee Engine 764 can be configured, as desired, to offer to set up recurring payments for installment loans (mortgage, auto loan or lease, etc.) and other recurring payments. The Easy Payee Engine 764 can also as desired be configured to allow for set up of partial payee records, assuming that a subscriber may not have all required information (i.e. account number) during an initial session. By saving a partial set up for a payee, the subscriber could return later and complete the missing information, prior to paying a bill. Partial set up functionality is available for all billers/payees, not just those associated with recurring payments.

Choices of available/identified payees/billers are made via pull-down windows, menus, and/or another means to allow the rapid selection of payees/billers from among multiple choices presented. The Set-up Wizard can also, as desired, partially pre-populate payee set up page, then require the subscriber 607M to confirm and/or provide additional information. For some managed payees, it is possible for the remittance center available to the EBPSP 601 to be different from the one printed on a subscriber's paper bill.

Figure 28:
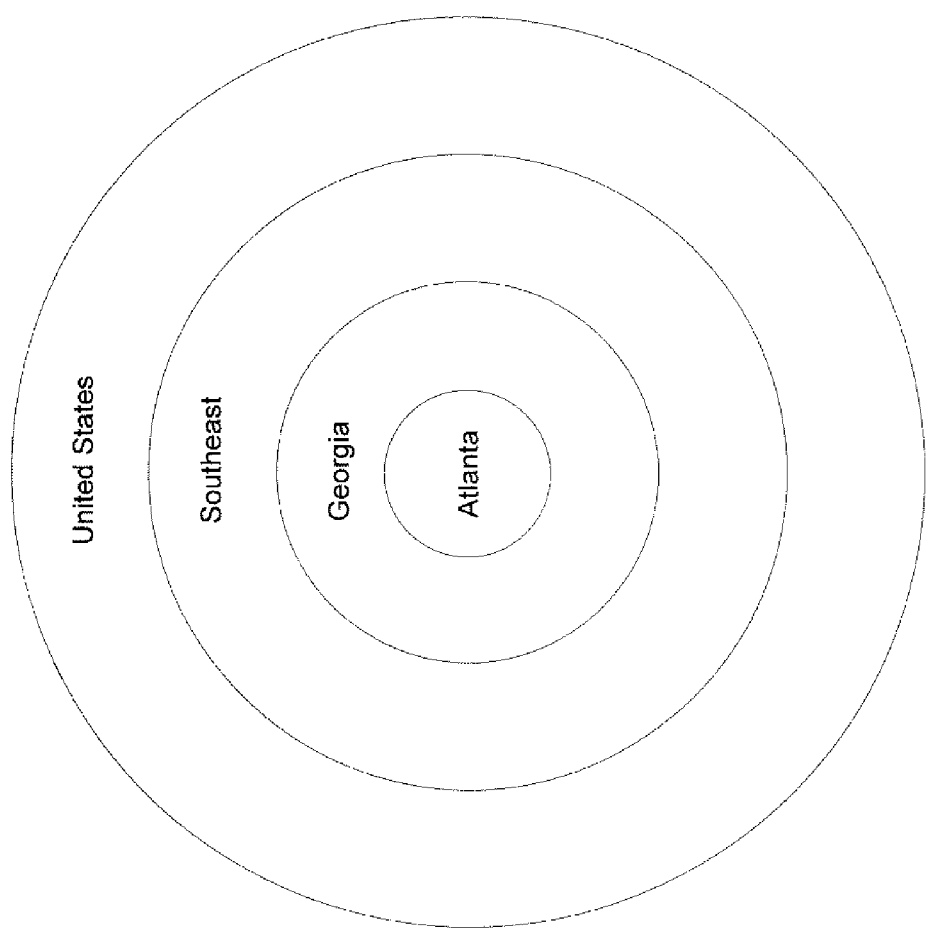
FIG. 28 is a simplified depiction of different geographic areas that can be processed by the Easy Payee engine of FIG. 7B in accordance with certain aspects of the present invention.

In the context of increasing active users, FIG. 28 shows several examples of the geographic range of individual payees/billers. An individual payee may have a geographic range within a metropolitan area, shown in FIG. 28 as metro-Atlanta, which can, as desired be further defined by ZIP codes (not shown). Another payee/biller may have a range within a state, for instance within the state of Georgia, another payee may have a range within a geographic region of the United States, for example, the southeast region, and furthermore there may be some payees that are national in scope. Additionally, some payees/billers have international scope and similar international metropolitan constraints or regional constraints as well, though international designations are not shown in FIG. 28. Interesting here is that payees/billers are categorized in terms of their geographic presence. Based upon where a given subscriber is located, the processing of the Easy Payee Engine 764 will find most, if not all, of the payees/billers that are applicable, whether they are out of the international level, national level, regional level, state level, metro level, or other level.

Figure 29:
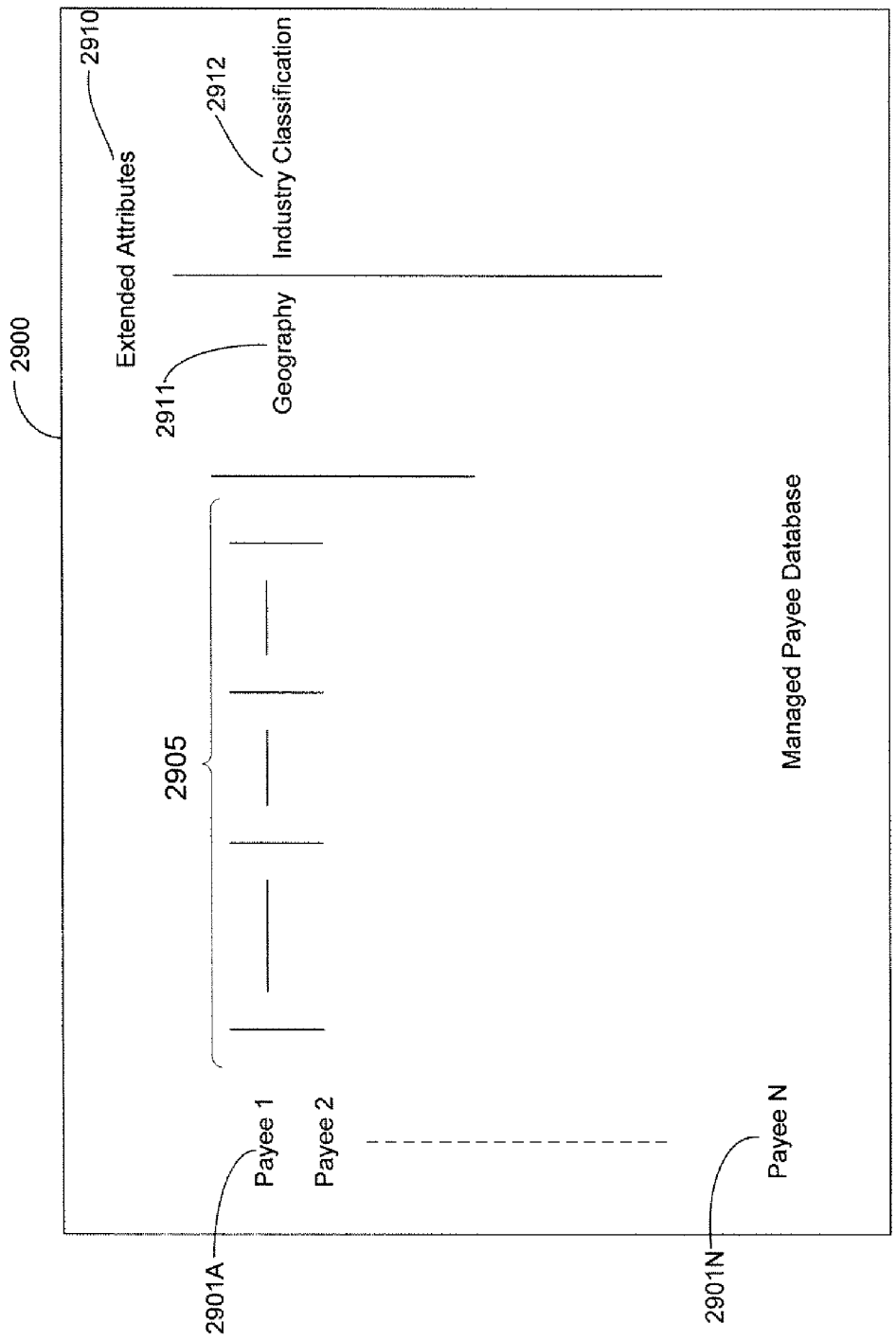
FIG. 29 is a simplified depiction of a managed payee database utilized with the Easy Payee engine of FIG. 7B in accordance with certain aspects of the present invention.

FIG. 29 also relates to Easy Payee functionality. Many EBP service providers maintain a managed payee database 2900 that has an entry or a set of entries 2901A through 2901N for every managed payee with which that EBP service provider has a relationship. These existing databases capture a number of payee attributes 2905, including name, address, preferred remittance centers, preferred ways of delivering remittance, and, if the payee is an electronic payee, deposit account information. In order to facilitate an increase in active users, the Easy Payee Engine 764 adds extended attributes 2910 in association with information associated with each of the managed payees 2901A-N shown in FIG. 29. Specifically, these include attributes associated with the geographic location 2911 of the payee, as well as industry classification 2912. Industry classifications can include, cable, gas, oil, department store, credit cards of various types, and other industry classifications. These industry classifications preferably represent Standard Industry Classification codes, but could be of another form. The geographic information could leverage information that is already maintained about the payee, for example, state or ZIP code, but it preferably includes additional new information, for example geographic information. This information can, if desired, be the authority source for the Easy Payee Engine 764 in performing either a geographic or industry search for applicability to a given enrolling subscriber. Though not shown in FIG. 29, the extended attributes 2910 can include information identifying a payee's typical customer's socio-economic status, in addition to other payee information.

In certain cases where there may be possibilities for optimized processing, the Easy Payee Engine 764 can create from this database 2900, and/or other sources, lists that are particularly optimized to make searching easier. For example, a list of payees/billers could be created that apply to the metro Atlanta area because, as for example, there may be many enrolling subscribers from that particular area. This makes the processing to identify Atlanta area payees/billers faster. It should be noted that the optimized lists could also be stored in a same data repository 706 that contains the managed payee database. Lists can also be created, as desired, of all companies within a given industry, as well as lists of companies whose customers have certain socioeconomic status(es).

Figure 30A:
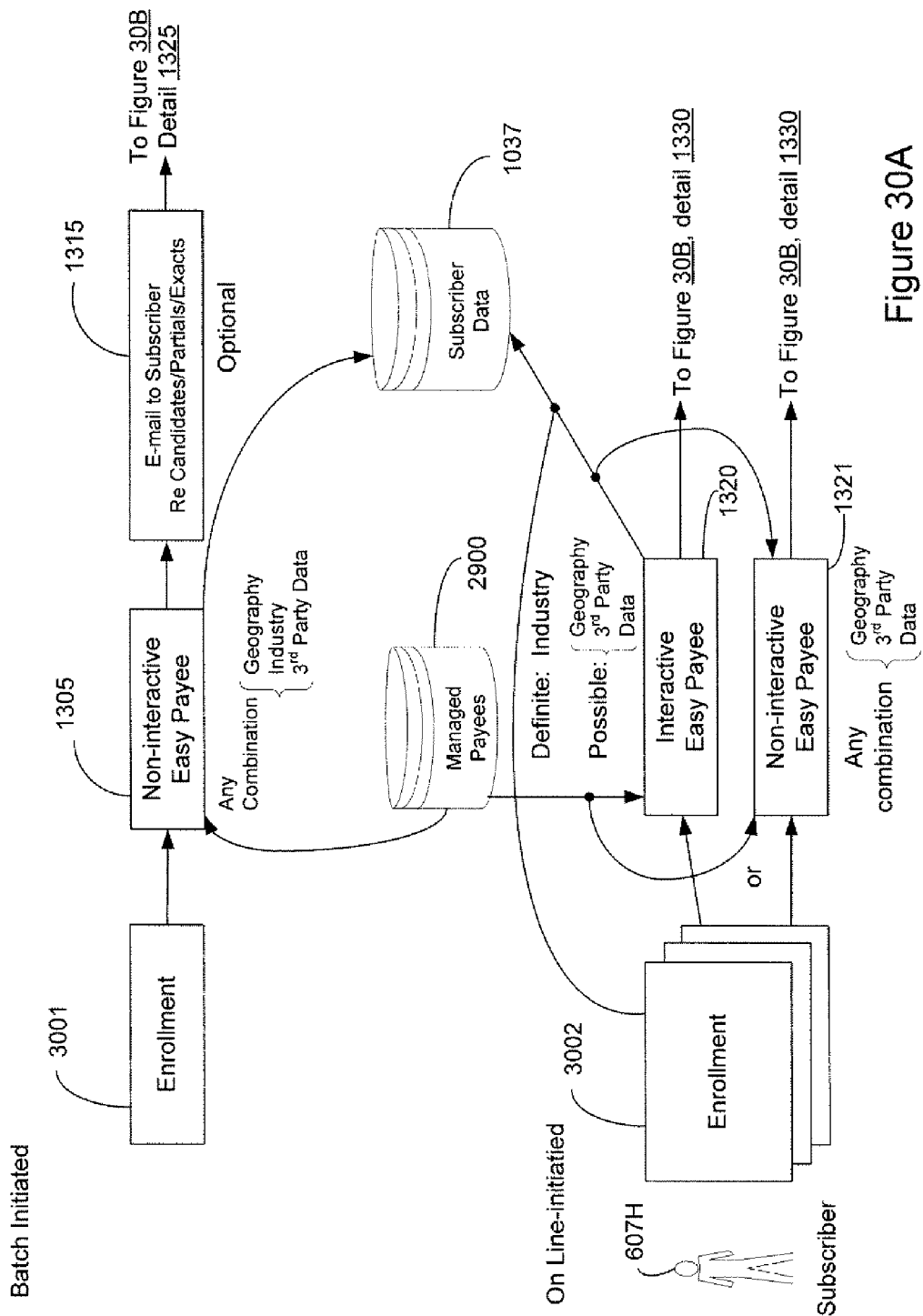
FIG. 30A is a is a simplified depiction of functionality of the Easy Payee engine of FIG. 7B in accordance with certain aspects of the present invention.

FIG. 30A shows two possible flows for Easy Payee functionality. One flow, beginning at 3001, is initiated as part of a batch process, another flow, beginning at 3002, is initiated as part of an on-line session. It should be noted that this exemplary Easy Payee functionality presupposes enrollment for a subscriber, in this example subscriber 607H, has been completed. That is, the EBPSP 601 has received information identifying subscriber 607H. In the batch flow, a completed enrollment process triggers a non-interactive execution 1305 of functionality of the Easy Payee Engine which can leverage, as desired, any combination of the four different data types discussed above: geographic data, industry classification data, socioeconomic data, and/or third party source data. Leveraging any combination of these creates a set of definitively defined payees/billers (exact matches), a set of partially set up new payees/billers, and a set of candidate payees/billers to be presented to the subscriber 607H for activation.

Easy Payee functionality preferably accesses a managed payee database 2900 or optimized lists as previously described in this process. Identified payees/billers are populated (exact matches, partially set up, and candidates) in association with information identifying the subscriber 607H in the subscriber profile database or another data repository. Optionally, completing this process may allow the triggering of an e-mail 1315 to the subscriber 607H.

FIG. 30A also shows the corresponding online initiative flow, beginning with enrollment at 3002. Here, the subscriber 607H accesses a set of presentations to complete the enrollment process. There are multiple alternatives that could follow as a result of enrollment completing successfully. In one scenario, Easy Payee functionality could be invoked with some portions being interactive 1320 with the subscriber 607H. In particular, Easy Payee functionality could request identification of categories of bills to trigger the analysis of industry classifications. This will be discussed in more detail further below. Alternatively, Easy Payee functionality could be triggered silently in the background, during an on-line session, but in a non-interactive mode 1321. In that case, processing is the same as the non-interactive Easy Payee execution 1305. In any event, ultimately a screen presentation of a list of fully set up payees/billers (exact matches), partially set up payees/billers, and candidate payees/billers is presented to the subscriber 607H. It may not be necessary to have all of these present. Also, a series of screens, each dedicated to one of exact payees/billers, partial payees/billers, and candidate payees/billers could instead be presented.

Figure 30B:
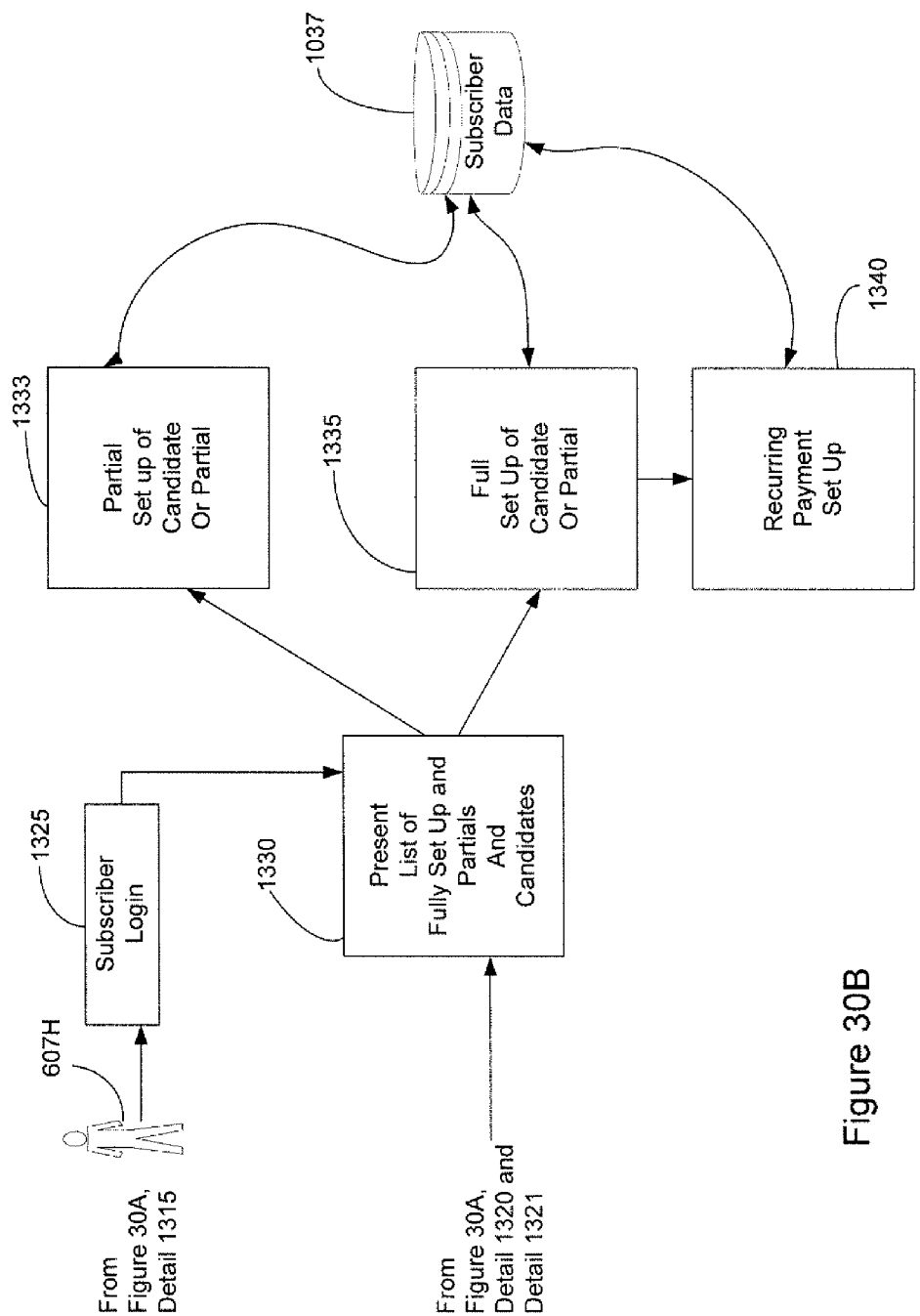
FIG. 30B is a simplified depiction of further functionality of the Easy Payee engine of FIG. 7B in accordance with certain aspects of the present invention.

Continuing with FIG. 30B, from optional detail 1315, the subscriber 607H logs onto a Web site hosted by and branded as a EBPSP 601 site 1325. Or, coming from details 1320 or 1321, the subscriber 607H continues in an already on-going session. A presentation 1330 of the list of fully set up payees/billers, partially set up payees/billers, and candidate payees/billers is made to the subscriber 607H. For the candidate payees/billers and for the partially set up payees/billers, the subscriber 607H may choose to do more partial set up at this point 1335. That is, add some necessary information, but not all. For the candidate payees/billers and the partially set up payees/billers, the subscriber 607H may choose to take them to full set up 1335. If so, these payees/billers are now usable in the context of payment and/or electronic bill presentment.

In performing this payee/biller set up, beneficially some subscriber data that has been accumulated through prior enrollment and/or prior activation could be leveraged to pre-populate some of the payee/biller data that is being requested, such that the subscriber 607H does not have to enter any more information than absolutely necessary. If a payee/biller is recognized as a type that would be a recurring payment recipient, for example a loan provider of an auto loan, a mortgage loan, Easy Payee functionality preferably recognizes a recurring payment and beneficially goes an extra step to prompt the subscriber 607H to set up a recurring payment 1340. Easy Payee functionality can partially set up a recurring payment from data obtained in a credit report. If the subscriber 607H elects to set up, or finish setting up, a recurring payment, not only has a payee been established, but also a recurring payment has been established. Easy Payee functionality can also recognize a recurring payment based upon an industry type of a particular payee, i.e. automobile lender.

It should be noted that the partially set up payees/billers and the fully set up payees/billers both are stored in association with information identifying the subscriber 607H in the subscriber profile data base 1037, or elsewhere, as well as information identifying any new recurring payments that have been established. Also, the payees/billers could be categorized, for example, by industry.

Furthermore, it should be noted that use of a combination of geographic, industry classification, socioeconomic, or third party information to filter candidates and to present candidates could be used as a front for Common Enrollment and Bill Retriever and/or Biller Discovery and Activation Engines to aid in the efficient identification of electronic billers.

FIG. 31 is an example of an initial Set-up Wizard screen 3100 that could optionally be used in the interactive Easy Payee scenario. Shown is a first query to solicit from the subscriber 607H what types of bills the subscriber 607H receives on a monthly basis 3105. This aids in leveraging industry classification information. A number of biller category types, such as mortgage, different types of credit cards, department stores, oil companies, phone, gas, electricity, and various other kinds of utility bills are shown 3110. Some of these categories may have a large number of payees, which may or may not be managed payees. The subscriber 607H selects those categories that apply to her or him, and then selects a submit button 3115 shown at the bottom of the screen.

FIG. 32A is a continuation of FIG. 31 where the subscriber 607H has selected department stores as a type of payee. A set of payees, perhaps including managed payees, that are department stores is presented. In this example, Nordstrom, Inc., Sears, Roebuck and Company, and JC Penney Corporation, Inc. are shown. The subscriber 607H selects one or more of those and activates a submit button 3202 to proceed. Note that in this example only a single industry was selected by the subscriber 607H.

In FIG. 32B a different example is shown where multiple industries are dealt with together on one screen. Geography is taken into consideration in presentation of this screen. That is, the subscriber's address information is considered to shape the set of choices presented. In this example, an Ohio subscriber location is presupposed. An electric utility and a department store are two categories which include payees in and around Ohio. The set of choices for electric utilities includes American Electric Power (AEP) and Ohio Power. For department stores, Saks Incorporated, F&R Lazarus & Company, and Nordstrom, Inc. are shown. Again, the subscriber 607H can select among the choices and activate a link 3203 to proceed.

FIG. 33A is an exemplary depiction of a screen of candidates payees based upon geographic filtering. These candidates span different industries. As shown, the presentation is not categorized by industry. No further interaction with the subscriber is undertaken to further tailor this list of payees in this example.

FIG. 33B shows the same set of candidates, but with industry classification included for easier viewing. It will be understood in a large metropolitan region there may be a large number of candidates, thus industry classification would certainly make it easier for a subscriber 607H to pinpoint payee/billers of interest. So, for example, shown is a classification of cable, with Cox Cable shown, a classification of electric/gas utility, with two possibilities, The Atlanta Gas Light Company (AGL) and The Cobb Electric Membership Corporation (Cobb EMC) shown, a classification of mortgage, with Washington Mutual shown, and a classification of department store with Rich's shown. In both FIGS. 33A and 33B, the subscriber 607H selects choices, and then selects a submit button 3302, 3303 to proceed with the interaction.

FIG. 34 is a simplified depiction of a screen 3400 showing fully set up payees 3405, partially set up payees 3410, and candidate payees 345 as a result of the functionality described above. In this example it is assumed that three mechanisms have been used. That is, leveraging third party information, leveraging of industry classification information, and leveraging of geographic information to constrain the set of candidates has been performed. Leveraging third party credit report information allows the EBPSP 601 to definitively identify and set up three payees, that is Countrywide Financial Corporation Mortgage, General Motors Acceptance Corporation (GMAC), and MBNA Corporation. These have been identified based on a credit report complete with customer account numbers and all the information necessary to complete set up for electronic payments. The subscriber 607H is informed that billers have been set up.

Unlike exact matches, the EBPSP 601 has identified, through some combination of functionality of the EBPSP 601, that it is highly likely that AEP™ is a payee for the subscriber 607H. However, the EBPSP 601 may be missing an important element, for example, the customer account number, and therefore the best that can be accomplished is a partial set up of that payee. The subscriber 607H cannot make an electronic payment to a partially set up payee. The subscriber 607H is required to supply additional information to complete the process.

Candidate payees based on industry classifications are shown as telco, gas, oil, department store, and cable. The subscriber 607H is prompted to select industry classifications of interest. Based on geographic constraints, the number of choices in each classification has been limited. In this particular example, under Telco is listed Sprint Nextel Corporation and American Information Technologies (Ameritech), under gas is listed Columbia Gas, under oil is listed BP and Shell, under department stores are listed Saks Incorporated, Nordstrom, Inc., JC Penney Corporation, Inc. and F&R Lazarus & Company. Under cable are listed Time Warner, Inc. and Cox Enterprises. In FIG. 34 the subscriber 607H can choose from among the payees presented as "partial" and as "candidate" to at least partially complete, if not fully set up selected payees. After selected any of those, a submit button 3401 is selected to proceed with set up.

FIG. 35 is an example of a partially completed payee set up screen 3500, where the EBPSP 601 has pre-populated some of the information in the payee set up screen from information the EBPSP 601 maintains or is available to the EBPSP 601. Missing from screen 3500 is at least one crucial piece of information. In this example AEP™ could not be completely set up because the EBPSP 601 does not know the customer account number for AEP™. This account number field 3505 is left blank. The subscriber must supply the missing information, at which point set up can be completed. This requires only a minimum amount of data entry by the subscriber 607H.

An alternative method of completing set up of partially set up payees, is to show a screen that just prompts for the missing pieces of information. In this alternative there would only be a prompt for the account number. The benefit of that would be that it would be less consternating to the subscriber 607H in terms of any confusion as to where pre-populated information was obtained, or, for instance, if a pre-populated payee address is different then a payee address which the subscriber knows from a relationship with the biller.

Privacy

Figure 36:
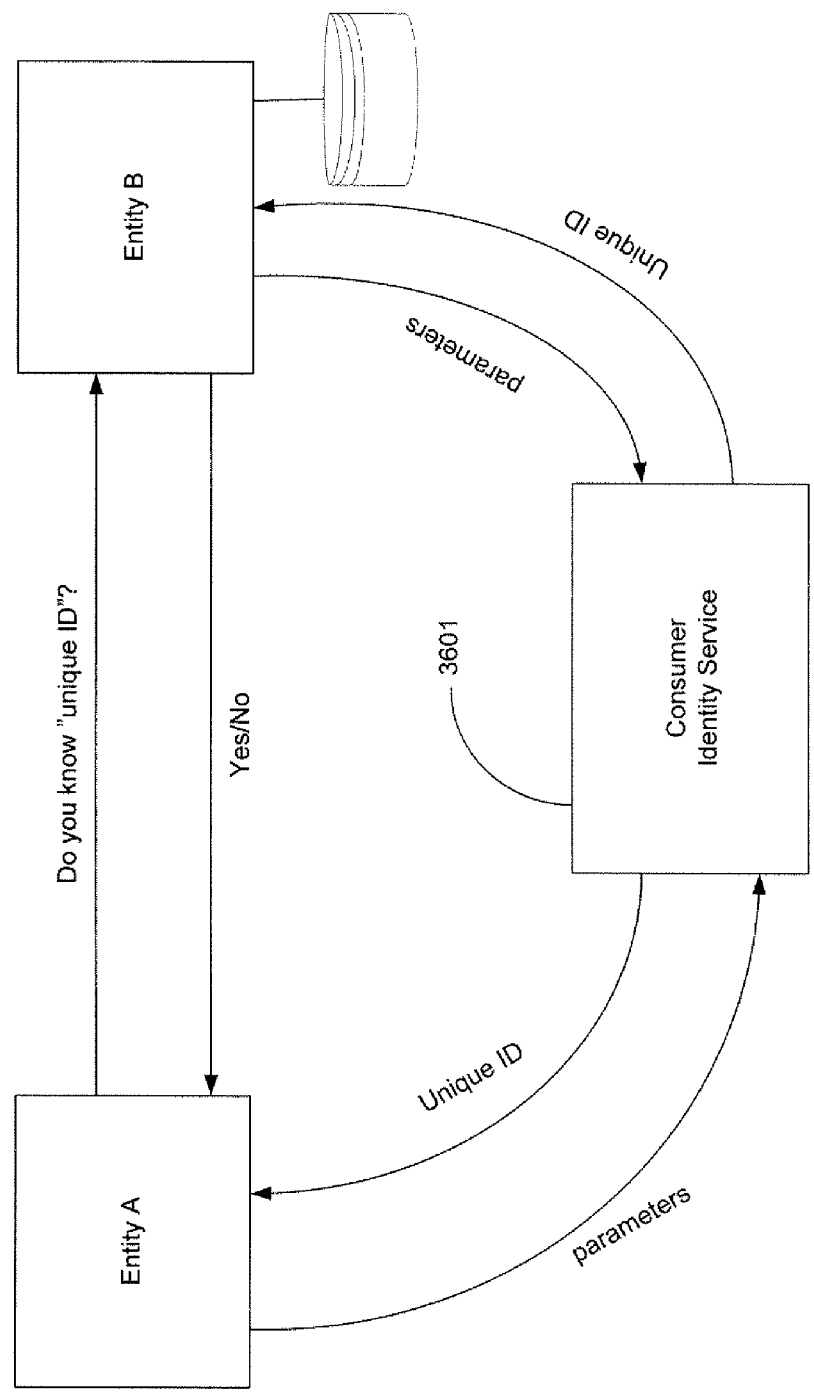
FIG. 36 is a first alternative simplified depiction of functionality of the Privacy engine of FIG. 7B in accordance with certain aspects of the present invention.
Figure 37:
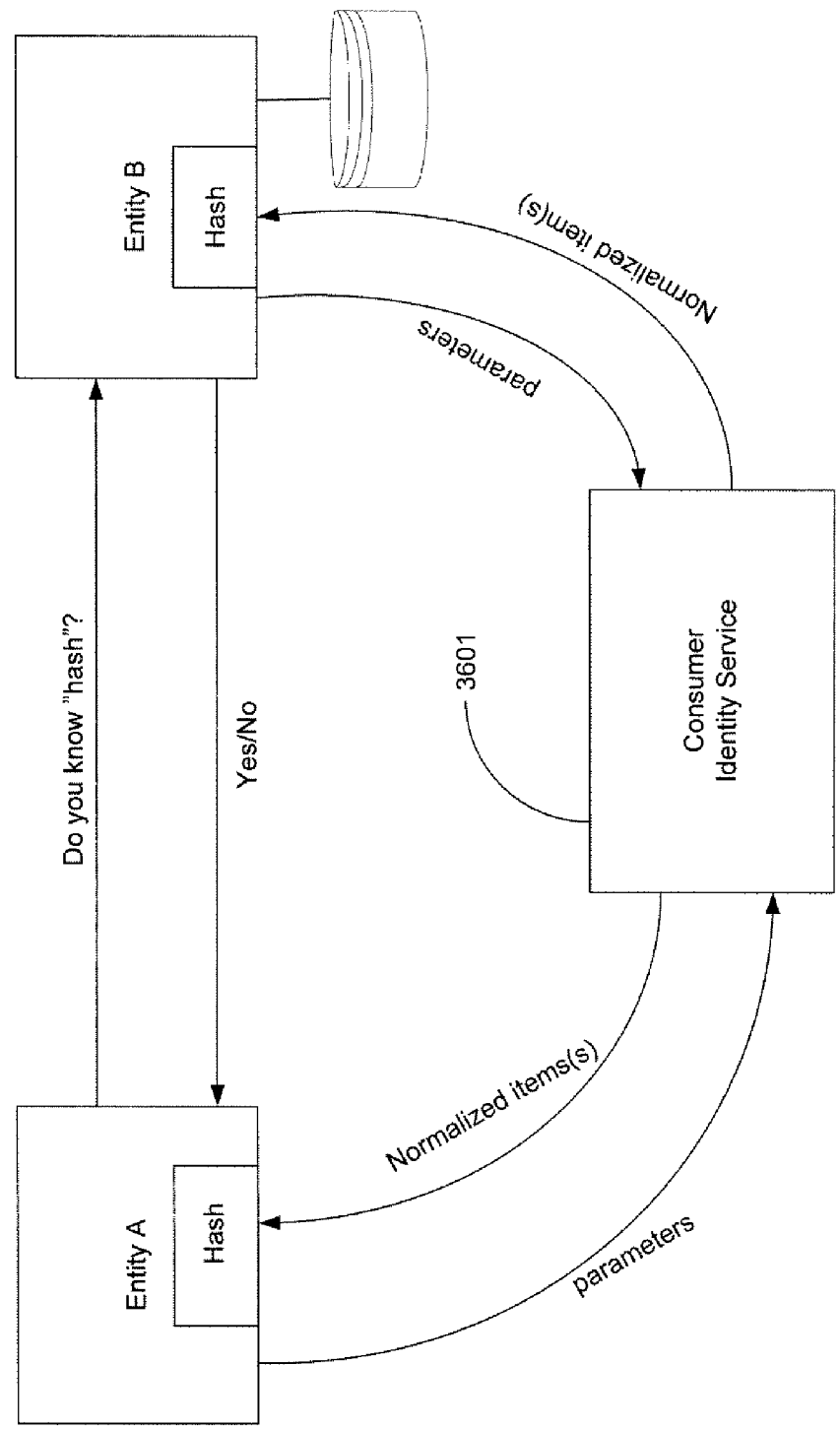
FIG. 37 is a second alternative simplified depiction of functionality of the Privacy engine of FIG. 7B in accordance with certain aspects of the present invention.
Figure 38:
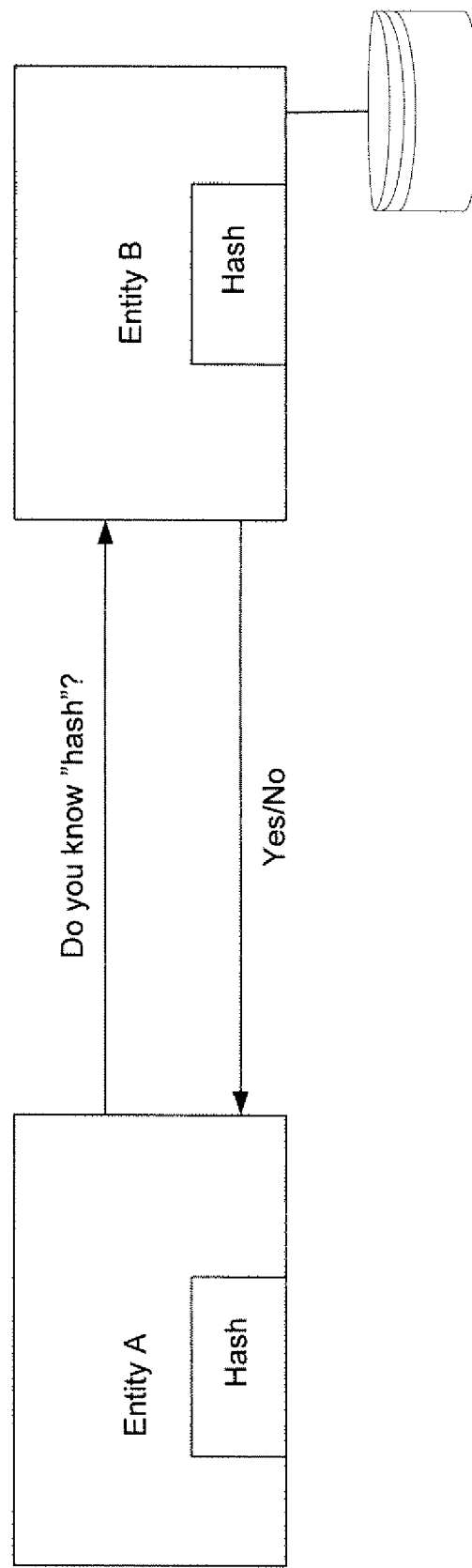
FIG. 38 is a third alternative simplified depiction of functionality of the Privacy engine of FIG. 7B in accordance with certain aspects of the present invention

FIGS. 36, 37 and 38 depict alternative operations of the Privacy Engine 765. Shown are three different approaches for one entity, entity A, to request whether another entity, entity B, knows about a given individual without revealing any information about that individual to the other entity. This has particular applicability when the EBPSP 601 requests of electronic billers 602A-N whether any given electronic biller knows about a given subscriber 607A-N, such as in the processing of the Common Enrollment and Bill Retriever Engine 765 and the Biller Discovery and Activation Engine 758, but it certainly has much broader applicability.

FIG. 36 presupposes that two entities (i.e., EBPSP 601 and an electronic biller) are each using a common consumer identity service 3601, which is a third party service 611A-N, that returns a unique ID when given parameters associated with an individual (i.e., a subscriber or the EBPSP 501 or an electronic biller's customer). The unique ID does not reveal any of the parameters. The presupposition here is that entity B, an electronic biller in this example, has, for all the individuals it knows about, received from the consumer identity service 3601 unique IDs for those individuals and has stored those ID's in association with information identifying those individuals on a database. Entity A, EBPSP 601 in this example, as it encounters a new individual, sends a set of individual identifying parameters, which may be somewhat different from entity B's, to the consumer identity service 3601. The consumer identity service 3601 returns a unique ID that matches to the same individual at entity B. Entity A then is able to present a request that asks "do you know this unique ID" to entity B. If entity B finds that unique ID on its database it can return a response of yes. Otherwise it would return a response of no, and there is nothing that it can do with that unique ID to discover information about the individual. Of course, Entity B could send unique IDs to Entity A, and then Entity A would determine if the unique ID it has obtained from the consumer identity service 3601 matches with one of the Entity B unique IDs. The Entity B IDs could be stored by Entity A for later use.

FIG. 37 depicts a similar process that also leverages the consumer identity service 3602. Again, the same consumer identity service 3601 is leveraged by both entity A and entity B. Also, entity B has pre-populated a database with a number of unique identifying values. Here, the consumer identity service 3601 returns a normalized value that is still readable, i.e., reveals parameters. For given a set of parameters, perhaps an address, perhaps a form of a social security number, the consumer identity service 3601 returns a normalized value always in a predictable format so both entities are certain of operating off the same exact form. Each entity executes a one-way hash on that normalized value. Entity B would have those normalized values which have been subjected to the one-way hash stored alongside each individual with which each respective normalized value is associated in a database, perhaps database 1037. Entity A then presents a query to entity B with the results of the one-way hash applied to the normalized value, asking "do you know this hash" and then entity B would be able to do a match against its database and return yes or no. This being a one-way hash, there is no way of being able to reverse engineer results of a one-way hash to determine information about that individual. Thus, entity B cannot determine the individual's parameter(s) from data supplied by entity A. As above, Entity B could supply the Entity B one-way hash results to Entity A for Entity A to match with the Entity A one-way hash result. Further, Entity A could store the Entity B one-way hash results for later use.

FIG. 38 is an alternative where the rules for normalization are known ahead of time to both entity A and entity B, so there is no need for use of a third party consumer identity service. For example, both entities could agree that a social security number be nine digits with no dashes in between. Each entity performs a one-way hash on such a normalized social security number. Thus, both parties would have the same unique ID generated in a predictable fashion. Again entity B would have results of a one-way hash associated with each of its individuals on its database, so when presented a query it can easily look up and see if that one-way hash result is present and return a yes or no. Again this is a one-way hash, so no reverse engineering could be used to discover information about an individual. These are three alternative mechanisms that can be used in the context of the EBPSP 601 determining if a subscriber is a customer of an electronic biller 602A-N.

It will be appreciated that the one-way hash does not have to be agreed to in advance. Entity A could communicate the rules for the one-way hash in association with matching requests. Of course, in that case entity B would not have pre-populated its database with one-way hash results in association with all the individuals. Different one-way hashes could be utilized by Entity A with different entities, or different one-way hashes could be utilized in making multiple "Do you know this hash" requests between Entity A and Entity B.

Exemplary Combined Process Flow

Figure 39A:
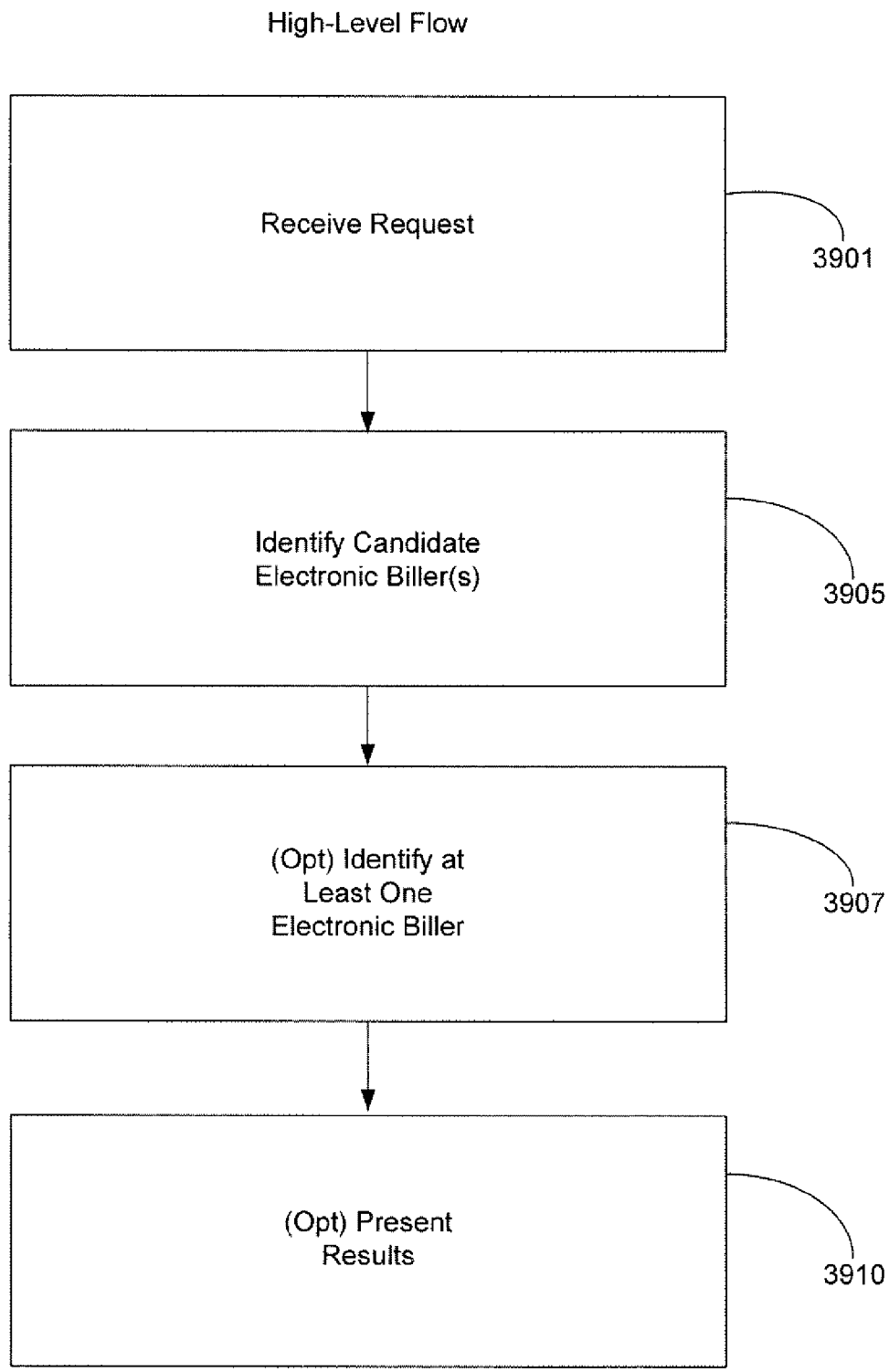
FIG. 39A is a simplified overview flow diagram of processing performed in identifying electronic billers of a consumer in accordance with certain aspects of the present invention.
Figure 39B:
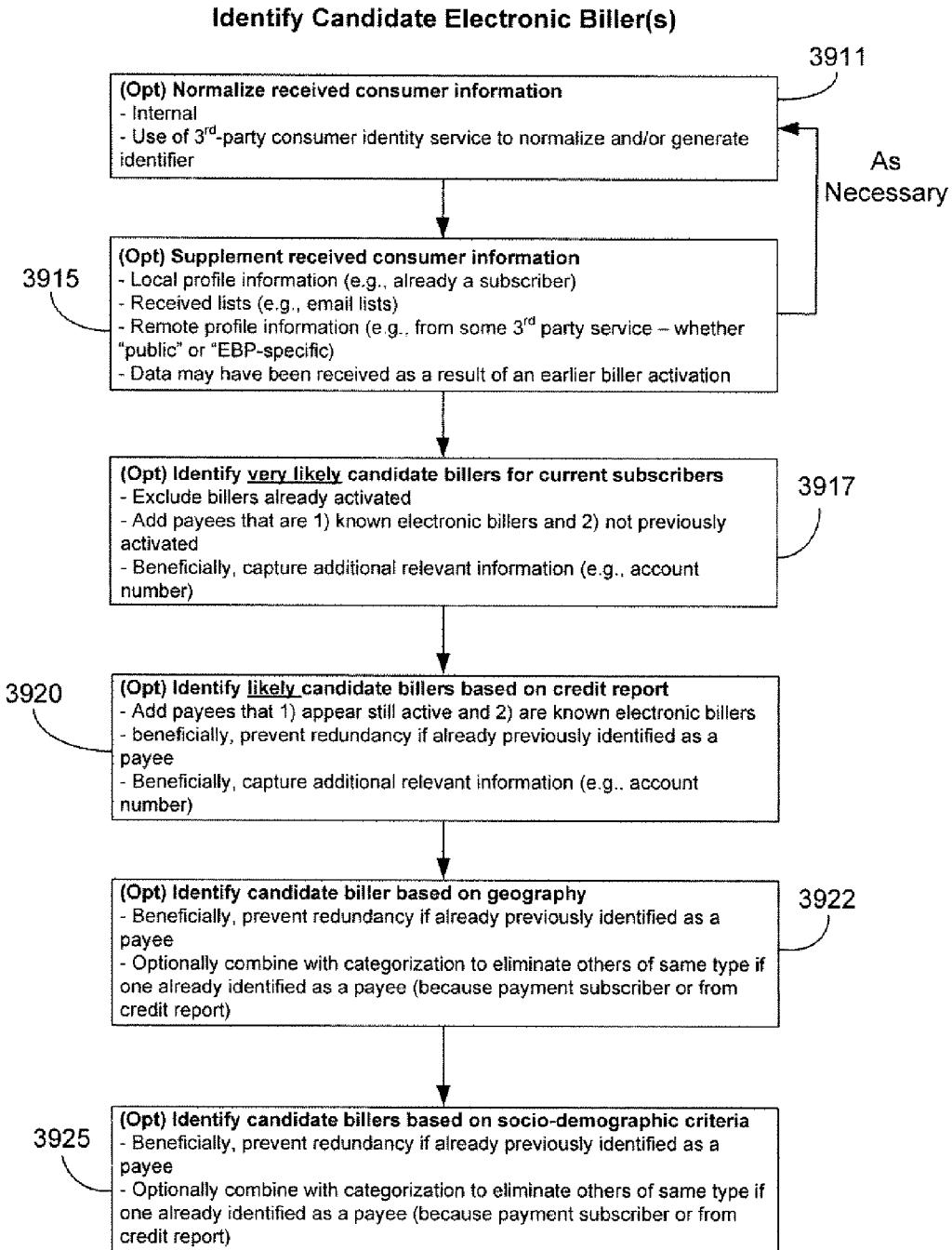
FIG. 39B is a further flow diagram of processing depicted in FIG. 39A to identify candidate electronic billers of a consumer in accordance with certain aspects of the present invention.
Figure 39C:
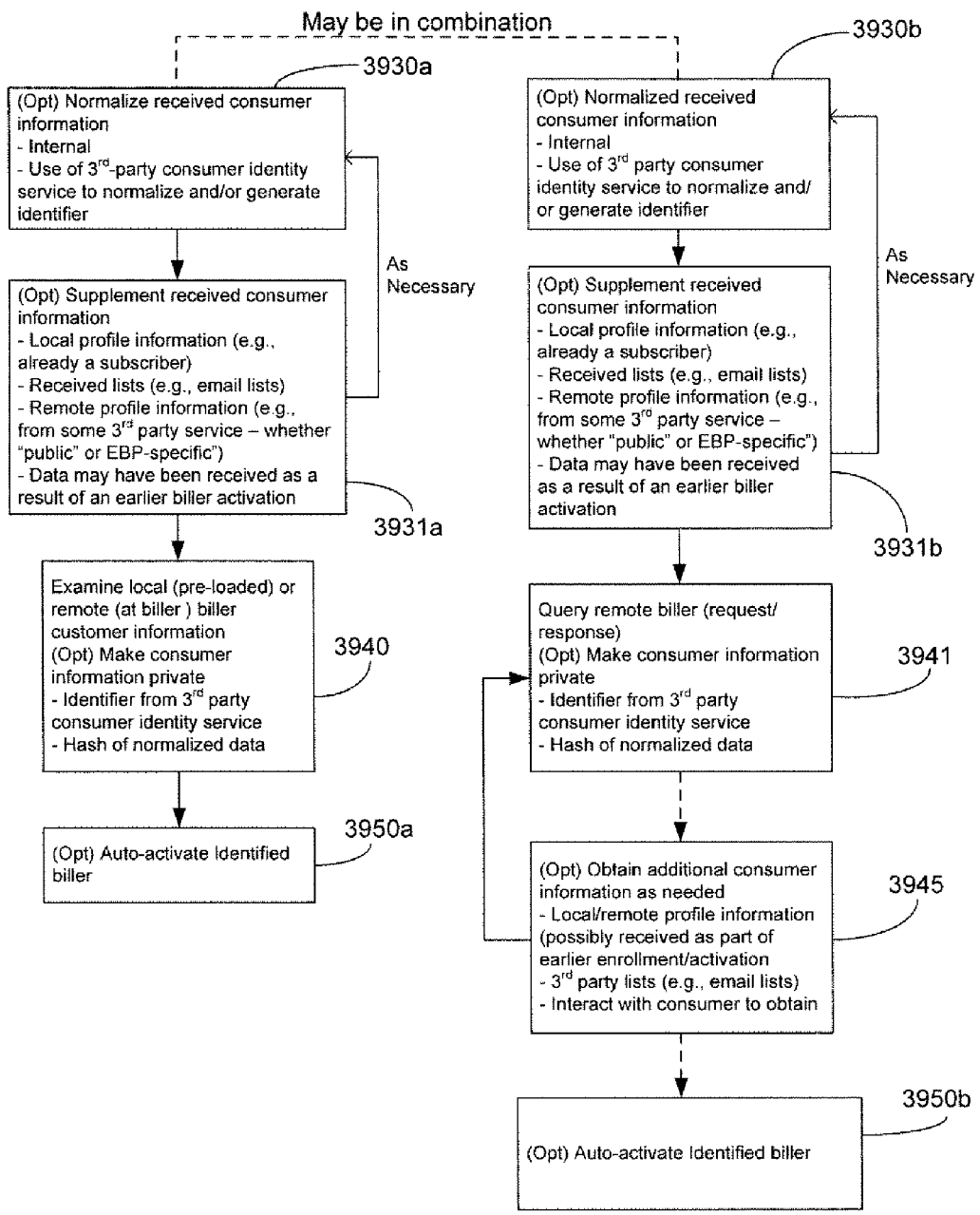
FIG. 39C is a further flow diagram of processing depicted in FIG. 39A to identify definite electronic billers of a consumer in accordance with certain aspects of the present invention.

FIG. 39*a* is a high level overview of exemplary processing of the present invention to identify electronic billers of a subscriber 607A-N, referred to as a consumer in FIGS. 39*a*-39*c*. FIGS. 39*b* and 39*c* show exemplary detailed processing to identify electronic billers which encompasses functionality of several of the Engines described above. In step 3901 of FIG. 39*a* the processor(s) 703 of the EBPSP 601 receive a request to identify billers of a subscriber through one of communications interfaces 712A and 712B via the network 600. This request could be received from the subscriber or from another entity. At a minimum, the request includes information identifying the subscriber and an instruction to find electronic billers of the subscriber. The request lacks information naming any biller of the subscriber. The request could even be received from the EBPSP 601 itself. In such a case, the request is triggered by some function of the EBPSP 601. The processor(s) 703 then, in step 3905, identify one or more candidate electronic billers. A candidate electronic biller is one of a plurality of electronic billers about whom it is determined that there is a likelihood of that candidate electronic biller being an electronic biller of the subscriber.

At step 3907 at least one electronic biller of the subscriber is identified from the candidate electronic billers as being a biller of the subscriber. This step is optional, as the processor (s) 703 may not be able to definitively identify an electronic biller for all subscribers. Also, the request may be a request to only identify candidate electronic billers of the subscriber. Thus, no processing might take place beyond identifying candidate electronic billers of the subscriber.

Results are optionally presented in step 3910. That is, results, either of candidate electronic billers of the subscriber or determined electronic billers of the subscriber are presented. In those instances in which no candidate or definite electronic billers are identified the presentation includes information indicating that no candidate electronic billers were identified, or that no definitive electronic billers were identified.

FIG. 39*b* shows exemplary processing in identifying candidate electronic billers of the subscriber. It will be understood that while different functionality to identify candidates are shown in a certain order in FIG. 39*b*, the different functionalities may be employed in alternate orders. Further, two or more of the functionalities may be employed in parallel, or perhaps one or more of the functionalities may not be utilized at all. Also, some functionality may not be able to be utilized in finding electronic billers of all subscribers. Accordingly, each step in FIG. 39*b* is labeled as optional. Additionally, other functionality described herein may be utilized in identifying candidate electronic billers, though not depicted in FIG. 39*b*.

At step 3911 the received subscriber information is optionally normalized. Normalization can consist of merely placing the subscriber identifying information in a standard format, or may include a transformation of the subscriber identifying information into an unique subscriber identifier which on its face does not reveal the subscriber's identity. The normalization can be performed by the EBPSP 601 alone, or can be performed by a third party service, such as a consumer identity service. Further, subscriber identifying information may be normalized according to one or more of multiple normalization rules.

The received subscriber identifying information can also optionally be supplemented with additional subscriber identifying information, as shown in step 3915. This supplemental subscriber information can also be normalized, as necessary. It should be noted that supplemental information may be obtained subsequent to attempting to identify at least one candidate electronic biller, or prior to attempting to identify any candidate electronic biller. The supplemental information can be obtained from any one, or any combination, of several sources. This includes information stored by the EBPSP 601 in a data repository 706, such as from enrollment or activation of any electronic biller, information obtained from third parties services such as e-mail list providers and consumer identity services, and information obtained from Web services data repositories such as the .NET Profile database 1510 or the .NET Passport database 1507, or any other Web services database described herein.

At step 3917 very likely candidate electronic billers are identified. This step can only be performed for those subscribers to which the EBPSP 601 has provided a payment service. That is, for those subscribers that the EBPSP 601 has made at least one payment. In this step the EBPSP 601 utilizes payment data stored in a data repository 706. The EBPSP 601 accesses an EBPSP data repository, based upon subscriber identifying data, and determines if any payment data is stored in association with data identifying the subscriber. Payment data can include information identifying payees of payments the EBPSP 601 has completed on behalf of the subscriber, as well as data indicating payees that the subscriber has indicated that he or she may pay.

The EBPSP 601 extracts any found payee data, and preferably excludes any payee data identifying billers from whom the subscriber is already receiving electronic bills. This extracted payee data is then preferably processed to determine those of the identified payees that are known to electronically present bills. The payees that are known electronic billers are then designated as candidate electronic billers. The stored payment data may include other information associated with the payment, such as an account number issued by a payee. If so, preferably this other information is extracted to be utilized in determining definitive electronic billers of the subscriber.

At step 3920 likely candidate electronic billers of the subscriber are identified. This step can only be performed for those subscribers for which the EBPSP 601 can obtain a credit report. The EBPSP 601 processes the credit report to identify creditors of the subscriber. This processing can include identifying those creditors that are current creditors of the subscriber, not past creditors. The EBPSP 601 extracts identified creditor data, preferably excluding any creditor data identifying billers from whom the subscriber is already receiving electronic bills or payees identified in step 3917, if performed. The extracted creditor data is then preferably processed to determine those of the identified creditors that are known electronic billers. The creditors that are known electronic billers are then designated as candidate electronic billers. Similar to above, any information associated with a particular creditor, such as account identifying data, is also preferably extracted from the credit report to be utilized in determining definitive electronic billers of the subscriber.

At step 3922 candidate electronic billers are identified based upon geography. This processing includes identifying a location of the subscriber. A subscriber's identified location could be as granular as the subscriber's ZIP code. Or, the subscriber's identified location could be a broader geographic area, such as city, county, state and/or region, in addition to any other geographic area. The information upon which subscriber's location is determined is based upon a residency location if the subscriber is an individual, and a place of business if the subscriber is an organization. The information upon which the subscriber's location is determined may be included in the received subscriber information, or may be supplemental subscriber identifying information.

After the subscriber's location is identified, the EBPSP 601 determines those known electronic billers that do business in and around the identified subscriber location. These determined known electronic billers are then identified as candidate electronic billers. As above, electronic billers from whom the subscriber is already receiving electronic bills are preferably excluded, as well as any candidate electronic billers identified in steps 3917 and 3920, if performed. Also, optionally, others of the determined known electronic billers can be excluded based upon an industry classification of a candidate electronic biller in view of an industry classification of an electronic biller from which the subscriber already receives electronic bills. For example, if a telephone service provider of the subscriber is known to present electronic bills to the subscriber, other telephone service providers in the subscriber's geographic location may be excluded from being a candidate electronic biller.

At step 3925 candidate electronic billers are identified based upon the socio-demographic status of the subscriber. This includes identifying the subscriber's socio-demographic status. This may be performed by a third party service, such as a consumer identity service, or may be performed by the EBPSP 601 based on information maintained by the EBPSP 601, based upon information obtained from a third party service, or based upon a combination of EBPSP 601 information and third party service information. Socio-demographic status can be determined based upon a subscriber's ZIP code, based upon a subscriber's credit report, or based upon other information. Those of known electronic billers having customers which have the subscriber's socio-demographic status are identified as candidate electronic billers. Socio-demographic status of an electronic biller's customers can be provided by the electronic biller, can be obtained from a third party service, or can be determined by the EBPSP 601. As above, billers that are known to already provide electronic bills to the subscriber are preferably excluded from being candidate electronic bills, as well as any candidate electronic billers identified in any of steps 3917, 3920, and 3922, if performed. And, also as above, electronic billers can be excluded based upon industry classification. At the conclusion of step 3925 a list of candidate electronic billers has been assembled.

FIG. 39c shows exemplary processing in identifying definite electronic billers of the subscriber from the assembled list of candidate electronic billers. As with identifying candidate electronic billers, it will be understood that different functionality in identifying definite electronic billers of the subscriber can be used in different orders and combinations and that the processing depicted in FIG. 39c and described below is merely exemplary. Accordingly, each step in FIG. 39b is labeled as optional. Also, other functionality described herein may be utilized in identifying definite electronic billers of the subscriber, though not depicted in FIG. 39c or described below.

As will be recognized from the discussion herein, identifying a definite electronic biller of the subscriber can be entirely performed by the EBPSP 601, or can be performed in concert with an electronic biller. As such, FIG. 39c depicts both alternatives, with EBPSP-only processing beginning with step 3930a and with EBPSP-biller processing beginning with step 3930b.

Steps 3930a and 3930b depict optional normalizing of subscriber identifying information, similar as described above in relation to step 3911 of FIG. 39b. The normalizing of steps 3930a and 3930b can be performed if normalizing was not performed in step 3911. Also, the normalizing of steps 3930a and 3930b could be performed in addition to the normalizing of step 3911. In such a case, the subscriber identifying information could be normalized to a different form than that resulting from the normalization of step 3911. Further, it will be appreciated that subscriber identifying information can be normalized to different forms when determining if different candidate electronic billers are electronic billers of the subscriber. And, no normalizing at all might be performed.

Steps 3931a and 3931b depict optional addition of supplemental subscriber identifying information to the received subscriber identifying information, similar as discussed above in relation to step 3915 of FIG. 39b. The processing of steps 3931a and 3931b may be performed if the processing of step 3915 was not performed. Or, the processing of steps 3931a and 3931b may be performed in addition to performance of step 3915. In such a case, different supplemental information than that added in step 3915 can be added to the subscriber identifying information. Also, different supplemental information can be added dependent upon the identity of a candidate electronic biller. And, of course, no supplemental information might be added.

In step 3940 the EBPSP 601 processor(s) 703 determine if a candidate electronic biller is an electronic biller of the subscriber. This includes determining if the subscriber identifying information, perhaps supplemented, is the same as information associated with a candidate electronic biller. That is, subscriber information is matched with candidate electronic biller information. The candidate electronic biller information can be a list of that biller's customers. Such a list could include any type of customer identifying information, such as customer name, address, phone number, account number with the biller, social security number, date of birth, mother's maiden name, or any other information identifying a customer that may be known to a biller. The candidate electronic biller information can also be billing information issued by a biller. This can take the form of bills ready for electronic presentment, or can take the form of information typically contained in bills, such as customer name, address, and account number with a biller.

Candidate electronic biller information can reside in a data repository 706, or can reside at a candidate biller. If the information resides in a data repository 706, the processor(s) 703 merely have to access the local data repository to obtain the information. If the information resides at a candidate electronic biller, the processor(s) 703 either access the information via a network 600, or request a candidate biller to supply information as necessary. When the candidate electronic biller information resides at a candidate, in EBPSP-only processing, the candidate electronic biller does not make a determination as to if a subscriber is a customer. Rather, the candidate merely allows the EBPSP 601 access to the information, or transmits the information upon request.

Optionally, the candidate electronic biller information can be masked prior to providing it to the EBPSP 601, or prior to allowing the EBPSP 601 access to it. The masked candidate electronic biller information could take the form of a plurality of unique identifiers, each based upon information identifying a single customer of the candidate electronic biller. The unique identifiers could be obtained from a consumer identity service, or could be the result of applying a one-way hash to information associated with each customer of the candidate electronic biller. If the candidate electronic biller information is masked, the subscriber information would also have to be masked in the same fashion, i.e., according to a same algorithm/one-way hash, in order to make the match.

In step 3941, in which a candidate electronic biller performs the processing to determine if a subscriber is a customer of that electronic biller, the EBPSP 601 transmits the subscriber identifying information to the candidate electronic biller. The candidate electronic biller then compares the received subscriber identifying information with information the candidate electronic biller maintains about its customers. Results of the candidate electronic biller's comparison is then preferably transmitted back to the EBPSP 601. Also, a result indicating that a candidate electronic biller is a biller of a subscriber could be transmitted by an electronic biller directly to a subscriber.

Optionally, the information transmitted to the candidate electronic biller can be masked, as described above. Here, the EBPSP 601 would either apply a one-way hash to the subscriber information, apply another type algorithm to the subscriber information, or obtain a unique identifier from a consumer identity service, prior to transmitting the masked subscriber identifying information to the candidate electronic biller. It will be recognized that when a one-way hash is utilized, either when the EBPSP 601 or a candidate electronic biller makes a determination as to a definite match between a subscriber and candidate electronic biller, different one-way hashes can be utilized with different candidate electronic billers. Of course, the candidate electronic biller also has to mask the candidate electronic biller data in order to perform the match.

Optionally, as shown in step 3945, a candidate electronic biller can obtain additional specific information identifying the subscriber if the candidate electronic biller cannot determine that the subscriber is a customer. This can include a request back to the EBPSP 601 by the candidate electronic biller for the EBPSP 601 to provide the additional information, or the candidate electronic biller can itself obtain the information.

If the candidate electronic biller requests the EBPSP 601 to supply the additional information, the EBPSP 601 can obtain the information from various sources. If the requested information is stored by the EBPSP 601 in data repository 706, the requested information is merely retrieved and transmitted to the candidate electronic biller. However, if the information is not stored by the EBPSP 601, the EBPSP 601 can obtain the information directly from the subscriber, can obtain the information from a third party service, such as an e-mail list provider, or from a Web services data repository.

If the candidate electronic biller obtains the additional information, the information could be obtained directly from the subscriber if the candidate electronic biller believes that the subscriber may be a customer and has enough information to contact the subscriber, perhaps based upon the subscriber identifying information supplied by the EBPSP 601, but needs additional information to make a definitive determination. Also, the additional information could be obtained from a third party service, or from a Web services data repository.

Also optionally, as shown in steps 3950*a* and 3950*b*, upon determining that candidate electronic biller is a biller of the subscriber, electronic bill presentment for the subscriber for bills issued by the determined electronic biller can be activated without informing the subscriber. That is, the subscriber can be automatically activated for presentment of electronic bills from this biller. In such a case, the subscriber would begin to receive electronically presented bills without having to participate in an activation session.

The present invention is not to be limited in scope by the specific embodiments described herein. Indeed, various modifications of the present invention in addition to those described herein, will be apparent to those of skill in the art from the foregoing description and accompanying drawings. Thus, such modifications are intended to fall within the scope of the appended claims.

What is claimed is:

1. A method, comprising:

receiving, at a service provider, a request to identify one or more billers having bills available for electronic presentment, the received request including information identifying the consumer and excluding information identifying any billers of the consumer; and determining, by the service provider in response to the received request and from a plurality of billers having bills available for electronic presentment, one or more determined billers of the consumer and one or more candidate billers of the consumer, the consumer having not previously requested the service provider to present bills of the one or more determined billers or the one or more candidate billers; and transmitting information identifying the one or more determined billers and information identifying in the one or more candidate billers, wherein the information identifying the one or more determined billers and the information identifying the one or more candidate billers is displayed to one of the consumer or an entity acting on behalf of the consumer, and wherein the information identifying the one or more determined billers is displayed separate from the information identifying the one or more candidate billers.

2. The method of claim 1, wherein the information identifying the consumer is first information identifying the consumer, the one or more determined billers are first determined billers, and further comprising:

transmitting, subsequent to receiving the request to identify billers having bills available for electronic presentment, a request for second information identifying the consumer;

receiving the second information identifying the consumer responsive to the transmitted request for the second information, determining, by the service provider based at least in part on the received second information and from the plurality of billers having bills available for electronic presentment, one or more additional determined billers different than first determined billers that are billers of the consumer, transmitting information identifying the one or more additional determined billers.

3. The method of claim 1, wherein the request is received responsive to the consumer activating a Hyper-link included in a Web page representing an entity other than any of the plurality of billers having bills available for electronic presentment.

4. The method of claim 1, wherein the received request includes information identifying types of billers with which the consumer has a relationship, the information identifying the types of billers excluding information identifying any billers of the consumer.

5. The method of claim 1, wherein the information identifying the consumer is first information identifying the consumer, and further comprising:

transmitting, subsequent to receiving the request to identify billers having bills available for electronic presentment, a request for second information identifying the consumer; and receiving the second information identifying the consumer responsive to the transmitted request for the second information, wherein determining the one or more determined billers comprises determining a correspondence between at least a portion of biller customer identifying information and one of at least a portion of the first information or at least a portion of the second information.

6. The method of claim 1, wherein:

the request is received during a communications session; and the information is transmitted during the communications session.

7. The method of claim 1, wherein determining one or more candidate billers of the consumer comprises identifying a potential relationship between each of the one or more candidate billers and the consumer, the relationship between each of the one or more candidate billers and the consumer being indeterminate.

8. The method of claim 1, wherein the request to identify one or more billers having bills available for electronic presentment is received during an enrollment process of the consumer with the service provider.

9. The method of claim 1, wherein:

the one or more candidate billers comprise a plurality of candidate billers, each of the plurality of candidate billers being associated with a business type; and information identifying those of the plurality of candidate billers associated with a same business type is displayed together.

10. The method of claim 1, wherein the request is a first request, and further comprising:

receiving a second request to activate the electronic presentment of bills of at least one biller of the one or more determined billers or the one or more candidate billers; and activating, in response to the received second request, the electronic presentment of bills of the at least one biller;

wherein the activation is based at least in part on previously received information identifying the consumer.

11. The method of claim 1, further comprising:

accessing, by the service provider, at least one database containing biller customer identifying information associated with one or more of the plurality of billers having bills available for electronic presentment, wherein determining the one or more determined billers comprises identifying a correspondence between at least a portion of the received information identifying the consumer and at least a portion of the accessed biller customer identifying information.

12. A system, comprising:

a communications interface configured (i) to receive a request on behalf of a consumer for a service provider to identify one or more billers having bills available for electronic presentment, the request including information identifying the consumer and excluding information identifying any billers of the consumer, and (ii) to transmit information identifying electronic billers; and a processor associated with the service provider configured (i) to determine, in response to the received request and from a plurality of billers having bills available for electronic presentment, one or more billers determined to be billers of the consumer and one or more candidate billers of the consumer, the consumer having not previously requested the service provider to present bills of the one or more determined billers or the one or more candidate billers, and (ii) to cause the communications interface to transmit information identifying the one or more determined billers and information identifying the one or more candidate billers, wherein the information identifying the one or more determined billers and the information identifying the one or more candidate billers is displayed to one of the consumer or an entity acting on behalf of the consumer, and wherein the information identifying the one or more determined billers is displayed separate from the information identifying the one or more candidate billers.

13. The system of claim 12, wherein:

the information identifying the consumer is first information identifying the consumer, the one or more determined billers are first determined billers, billers, the communications interface is further configured to transmit a request for second information identifying the consumer subsequent to receiving the request to identify one or more billers having bills available for electronic presentment, and to receive the second information identifying the consumer responsive to the transmitted request for the second information, and the processor is further configured to determine, based at least in part on the received second information and from the plurality of billers having bills available for electronic presentment, one or more additional determined billers different than the first determined billers that are also billers of the consumer, and to cause the communications interface to transmit information identifying the one or more additional determined billers.

14. The system of claim 12, wherein the request is received responsive to activation of a Hyper-link included in a Web page representing an entity other than any of the plurality of billers having bills available for electronic presentment.

15. The system of claim 12, wherein the received request includes information identifying types of billers with which the consumer has a relationship, the information identifying the types of billers excluding information identifying any billers of the consumer.

16. The system of claim 12, wherein:
the information identifying the consumer is first information identifying the consumer,
the communications interface is further configured (i) to transmit, subsequent to receiving the request to identify billers having bills available for electronic presentment, a request for second information identifying the consumer, and (ii) to receive the second information identifying the consumer responsive to the transmitted request for the second information,
the processor is further configured to (i) direct the communications interface to transmit the request for the second information, and
the determination of the one or more determined billers comprises a determination of a correspondence between at least a portion of biller customer identifying information and one of at least a portion of the first information or at least a portion of the second information.

17. The system of claim 12, wherein the communications interface is further configured to receive the request and transmit the information identifying the one or more determined billers and the one or more candidate during a single communications session.

18. The system of claim 12, wherein the processor is further configured to determine the one or more candidate billers of the consumer by identifying a potential relationship between each of the one or more candidate billers and the consumer, the relationship between each of the one or more candidate billers and the consumer being indeterminate.

19. The system of claim 12, wherein the request to identify one or more billers having bills available for electronic presentment is received during an enrollment process of the consumer with the service provider.

20. The system of claim 12, wherein:
the one or more candidate billers comprise a plurality of candidate billers, each of the plurality of candidate billers being associated with a business type, and
information identifying those of the plurality of candidate billers associated with a same business type is displayed together.

21. The system of claim 12, wherein:
the request is a first request,
the communications interface is further configured to receive a second request on behalf of the consumer to activate the electronic presentment of bills of at least one biller of the one or more determined billers or the one or more candidate billers, and
the processor is further configured to activate, in response to the received second request and based at least in part on previously received information identifying the consumer, the electronic presentment of bills of the at least one biller.

22. The system of claim 12, wherein the processor determines the one or more determined billers by (i) accessing at least one database containing biller customer identifying information associated with one or more of the plurality of billers having bills available for electronic presentment and (ii) determining a correspondence between at least a portion of the received information identifying the consumer and at least a portion of the accessed biller customer identifying information.

23. A system, comprising:
means for receiving, at a service provider, a request to identify one or more billers having bills available for electronic presentment, the received request including information identifying the consumer and excluding information identifying any billers of the consumer; and
means for determining, by the service provider in response to the received request and from a plurality of billers having bills available for electronic presentment, one or more determined billers of the consumer and one or more candidate billers of the consumer, the consumer having not previously requested the service provider to present bills of the one or more determined billers or the one or more candidate billers; and
means for transmitting information identifying the one or more determined billers and information identifying the one or more candidate billers,
wherein the information identifying the one or more determined billers and the information identifying the one or more candidate billers is displayed to one of the consumer or an entity acting on behalf of the consumer, and
wherein the information identifying the one or more determined billers is displayed separate from the information identifying the one or more candidate billers.

* * * * *

UNITED STATES PATENT AND TRADEMARK OFFICE
CERTIFICATE OF CORRECTION

| | | |
|---|---|---|
| PATENT NO. | : 7,395,243 B1 | Page 1 of 1 |
| APPLICATION NO. | : 10/285662 | |
| DATED | : July 1, 2008 | |
| INVENTOR(S) | : Zielke et al. | |

It is certified that error appears in the above-identified patent and that said Letters Patent is hereby corrected as shown below:

Column 62, Line 55 - Remove "in"

Column 64, Line 50 - Remove second occurrence of "billers,"

Signed and Sealed this

Sixteenth Day of September, 2008

JON W. DUDAS
*Director of the United States Patent and Trademark Office*